(12) United States Patent
Lee

(10) Patent No.: US 10,519,858 B2
(45) Date of Patent: Dec. 31, 2019

(54) ENGINE, ROTARY DEVICE, POWER GENERATOR, POWER GENERATION SYSTEM, AND METHODS OF MAKING AND USING THE SAME

(71) Applicant: Brent Wei-Teh Lee, Saratoga, CA (US)

(72) Inventor: Brent Wei-Teh Lee, Saratoga, CA (US)

(*) Notice: Subject to any disclaimer, the term of this patent is extended or adjusted under 35 U.S.C. 154(b) by 0 days.

(21) Appl. No.: 15/641,974

(22) Filed: Jul. 5, 2017

(65) Prior Publication Data
US 2018/0023410 A1    Jan. 25, 2018

Related U.S. Application Data

(60) Provisional application No. 62/494,045, filed on Jul. 22, 2016, provisional application No. 62/493,958, (Continued)

(51) Int. Cl.
*F01D 1/32* (2006.01)
*F02C 3/16* (2006.01)
(Continued)

(52) U.S. Cl.
CPC .............. *F02C 3/165* (2013.01); *F01D 1/32* (2013.01); *F01D 5/02* (2013.01); *F01D 13/02* (2013.01);
(Continued)

(58) Field of Classification Search
None
See application file for complete search history.

(56) References Cited

U.S. PATENT DOCUMENTS

| 305,575 A | * | 9/1884 | Culver | F03B 3/08 |
|---|---|---|---|---|
| | | | | 415/188 |
| 469,404 A | * | 2/1892 | Irish | F03B 3/08 |
| | | | | 415/82 |

(Continued)

FOREIGN PATENT DOCUMENTS

WO    2013063115 A1    5/2013

OTHER PUBLICATIONS

Howard E. Purdum et al.; "Reaction Turbine and Hybrid Impulse Reaction Turbine"; Bibliographic Data of WO2013063115 (A1); May 2, 2013; http://worldwide.espacenet.com.
(Continued)

*Primary Examiner* — Carlos A Rivera
*Assistant Examiner* — Theodore C Ribadeneyra
(74) *Attorney, Agent, or Firm* — Andrew D. Fortney; Central California IP Group, P.C.

(57) ABSTRACT

An engine, a rotary device, a power generation system, and methods of manufacturing and using the same are disclosed. The engine includes a detonation and/or combustion chamber configured to detonate a fuel and rotate around a central rotary shaft extending from the detonation and/or combustion chamber, a fuel supply inlet configured to provide the fuel to the detonation and/or combustion chamber, at least two rotating arms extending radially from the detonation and/or combustion chamber and configured to exhaust detonation gases from detonating the fuel in the detonation and/or combustion chamber and provide a rotational thrust and/or force, the rotating arms having inner and outer walls and a nozzle at a distal end thereof, the nozzle being at or having an angle configured to provide the rotational thrust and/or force, and a plurality of cooling coils between the inner and outer walls. Alternatively, the rotary device may include a rotary disc.

21 Claims, 33 Drawing Sheets

Related U.S. Application Data filed on Jul. 22, 2016, provisional application No. 62/496,497, filed on Oct. 18, 2016, provisional application No. 62/498,156, filed on Dec. 16, 2016, provisional application No. 62/499,503, filed on Jan. 25, 2017, provisional application No. 62/600,591, filed on Feb. 23, 2017.

(51) Int. Cl.

| | | |
|---|---|---|
| *F02C 5/04* | (2006.01) | |
| *F02C 7/16* | (2006.01) | |
| *F02C 7/22* | (2006.01) | |
| *F02C 7/36* | (2006.01) | |
| *F01D 5/02* | (2006.01) | |
| *F01D 13/02* | (2006.01) | |
| *F02K 7/00* | (2006.01) | |

(52) U.S. Cl.
CPC ............... *F02C 5/04* (2013.01); *F02C 7/16* (2013.01); *F02C 7/22* (2013.01); *F02C 7/36* (2013.01); *F02K 7/005* (2013.01); *F05D 2220/32* (2013.01); *F05D 2220/76* (2013.01); *F05D 2240/242* (2013.01); *F05D 2240/35* (2013.01); *F05D 2260/207* (2013.01); *F05D 2260/40* (2013.01); *Y02T 50/671* (2013.01); *Y02T 50/675* (2013.01)

(56) References Cited

U.S. PATENT DOCUMENTS

| | | | | |
|---|---|---|---|---|
| 523,734 | A * | 7/1894 | Shaw | F23R 3/286 60/39.11 |
| 824,113 | A * | 6/1906 | Groshon | F01D 1/32 415/82 |
| 890,392 | A * | 6/1908 | Adams | F01D 1/32 415/80 |
| 935,046 | A * | 9/1909 | McLaren | F01D 1/32 415/80 |
| 1,110,302 | A * | 9/1914 | Flatau | F01D 1/30 415/154.1 |
| 2,569,997 | A * | 10/1951 | Kollsman | F01D 1/32 415/117 |
| 2,768,808 | A | 10/1956 | Worre | |
| 2,945,670 | A * | 7/1960 | Caddell | F02C 7/00 415/115 |
| 3,026,088 | A * | 3/1962 | Green | F01D 1/026 415/124.1 |
| 3,032,988 | A * | 5/1962 | Kleckner | F01D 1/32 415/80 |
| 3,282,560 | A * | 11/1966 | Kleckner | F01D 1/32 415/80 |
| 4,178,125 | A * | 12/1979 | Dauvergne | F01D 1/32 415/80 |
| 4,302,683 | A * | 11/1981 | Burton | F02C 3/165 290/4 R |
| 4,332,520 | A * | 6/1982 | House | F01D 1/32 415/63 |
| 4,741,154 | A * | 5/1988 | Eidelman | F02C 3/165 415/80 |
| 4,768,344 | A | 9/1988 | Stojicic | |
| 5,236,349 | A * | 8/1993 | Fabris | F01D 1/22 210/188 |
| 5,494,401 | A * | 2/1996 | Varadan | E21B 4/02 415/229 |
| 5,525,034 | A * | 6/1996 | Hays | B01D 17/00 415/80 |
| 6,533,539 | B1 * | 3/2003 | Johnson | F01D 1/32 415/80 |
| 6,565,310 | B1 * | 5/2003 | Davidow | F01D 1/18 415/80 |
| 6,997,674 | B1 * | 2/2006 | Johnson | F01D 1/32 415/104 |
| 2012/0009055 | A1 * | 1/2012 | Kim | F01D 1/22 415/80 |
| 2013/0318974 | A1 | 12/2013 | Kim | |
| 2014/0248124 | A1 | 9/2014 | Kim et al. | |
| 2016/0245085 | A1 * | 8/2016 | Lim | F01D 1/32 |

OTHER PUBLICATIONS

Extended European Search Report dated Apr. 5, 2018; European Patent Application No. EP17182475.8; 11 pgs.; European Patent Office, Munich, Germany.

* cited by examiner

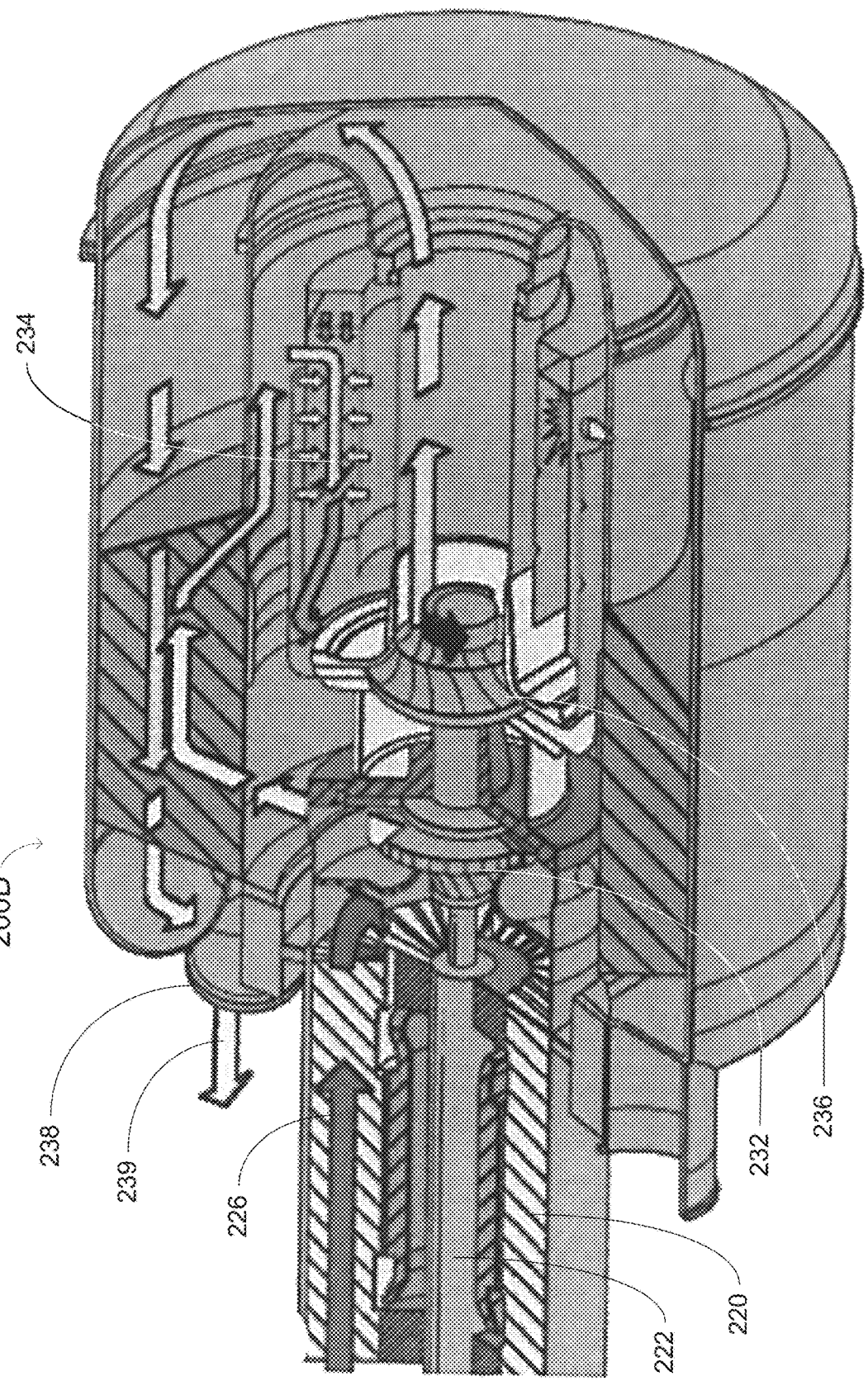

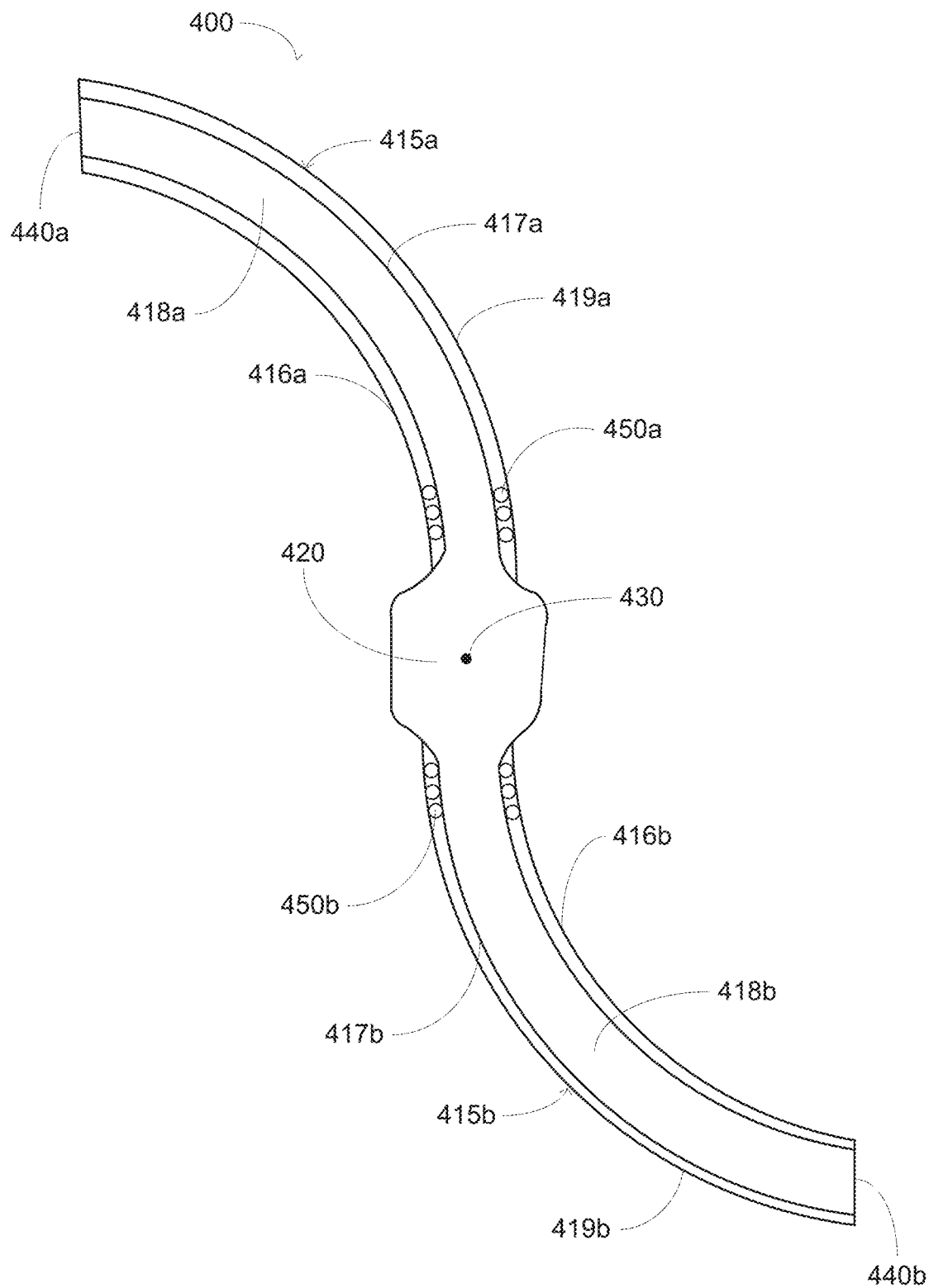

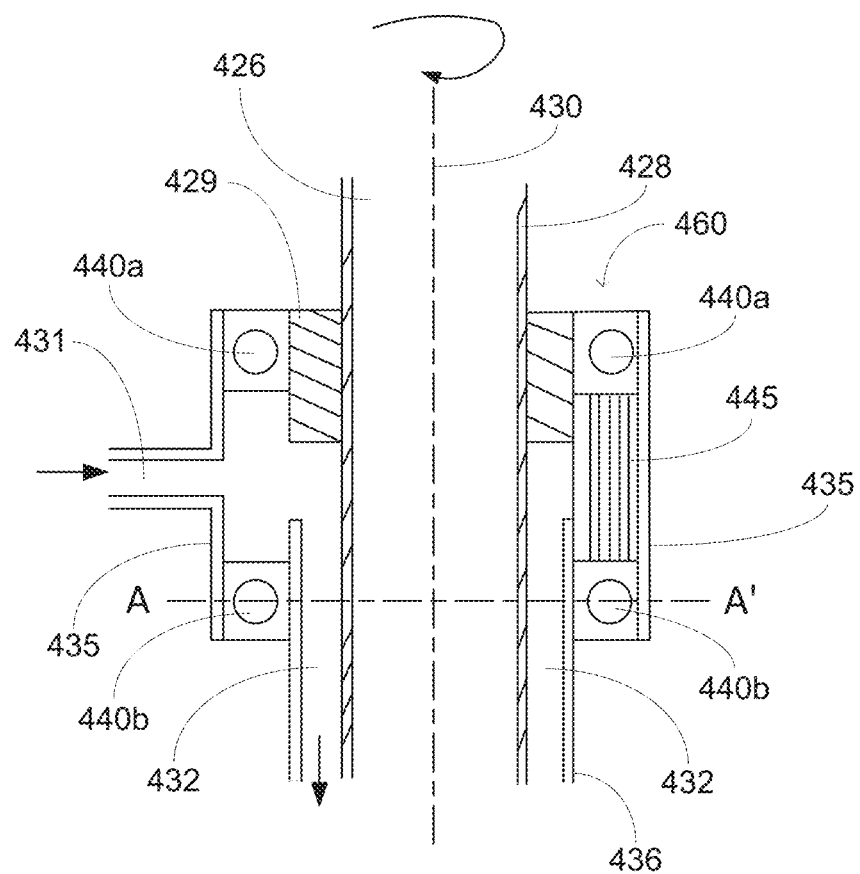
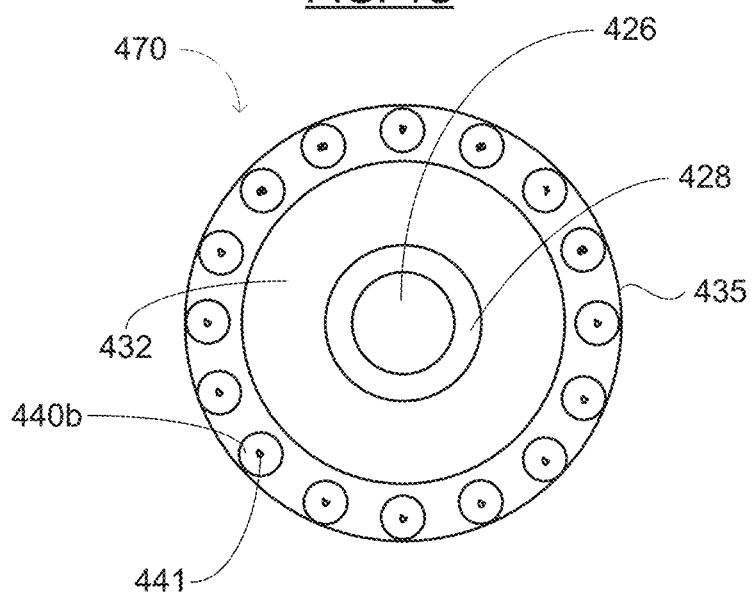

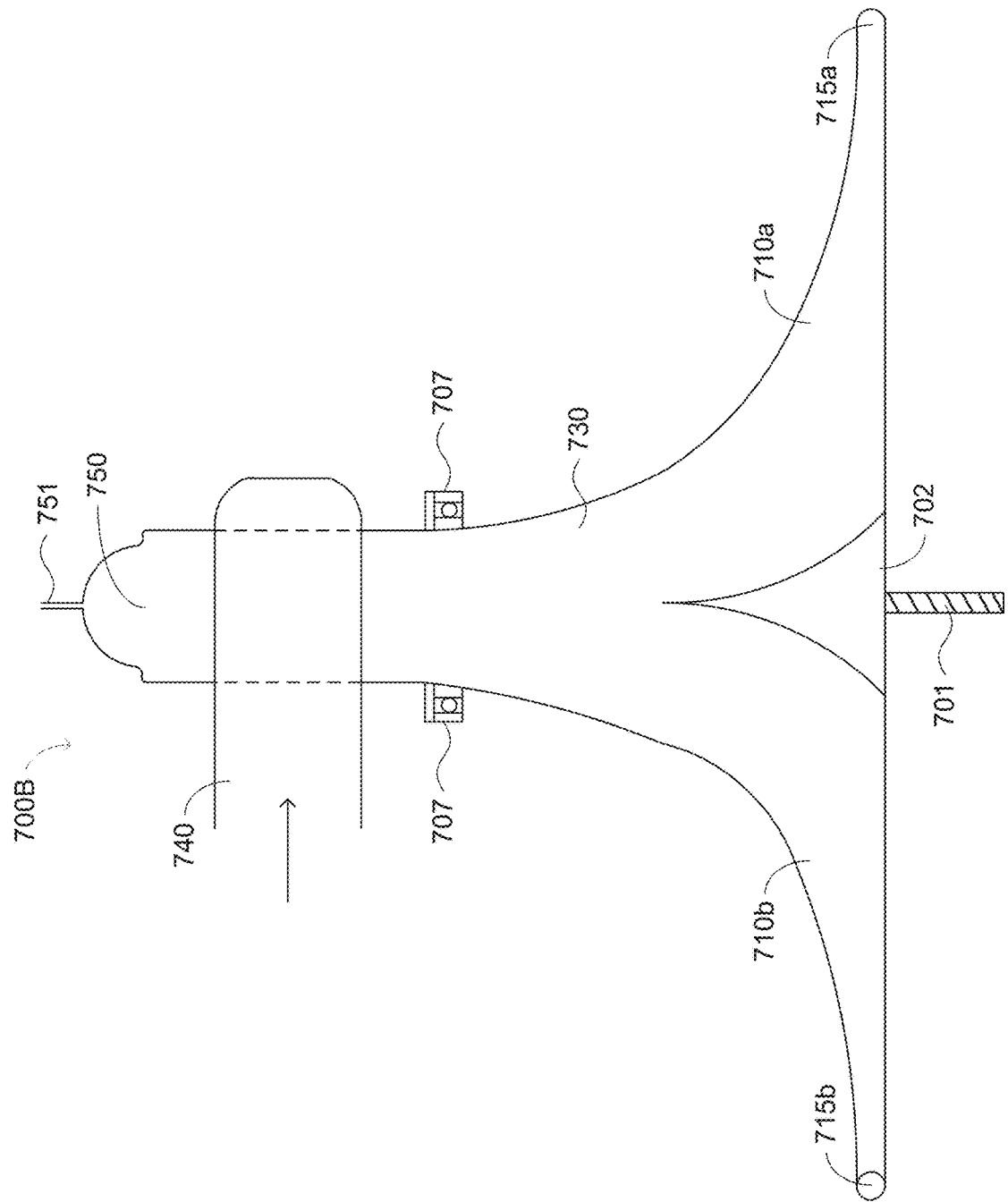

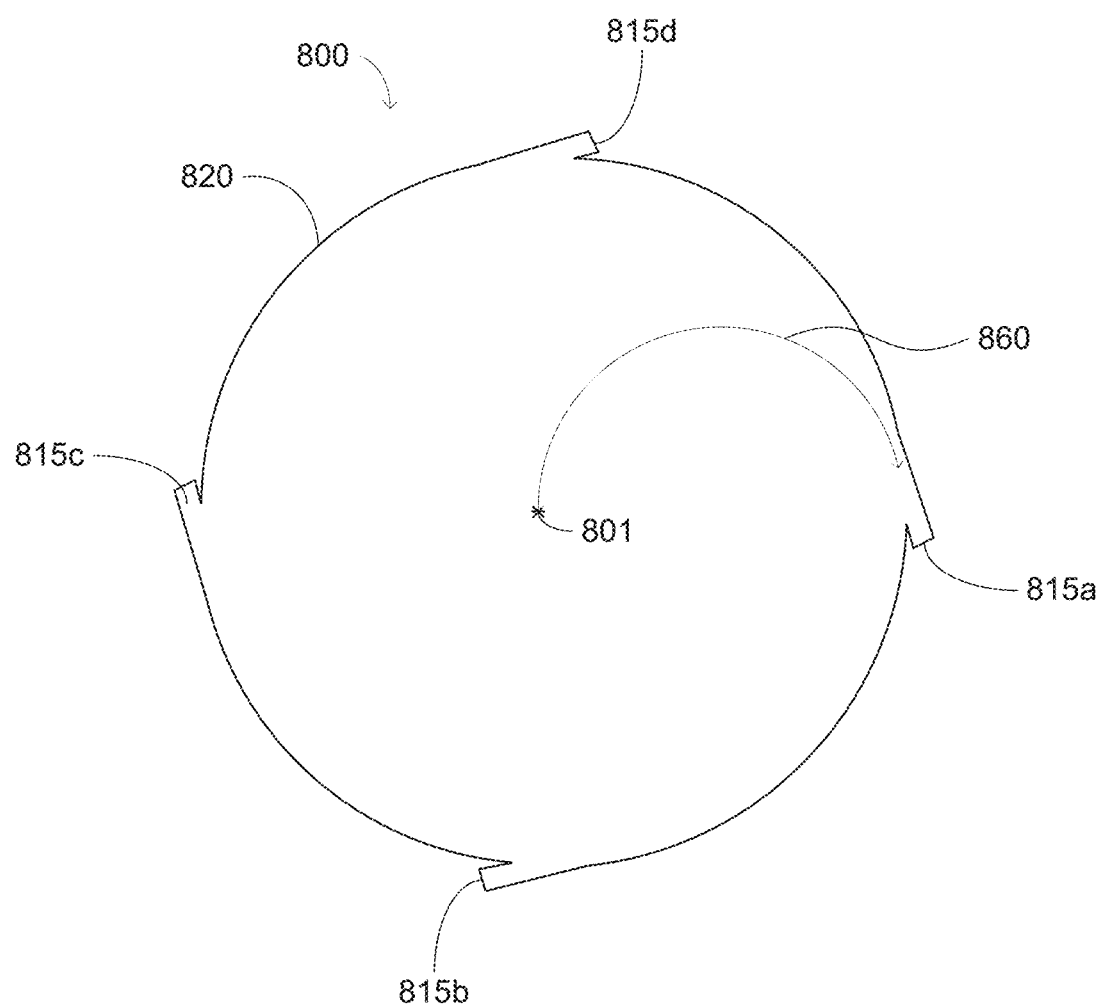

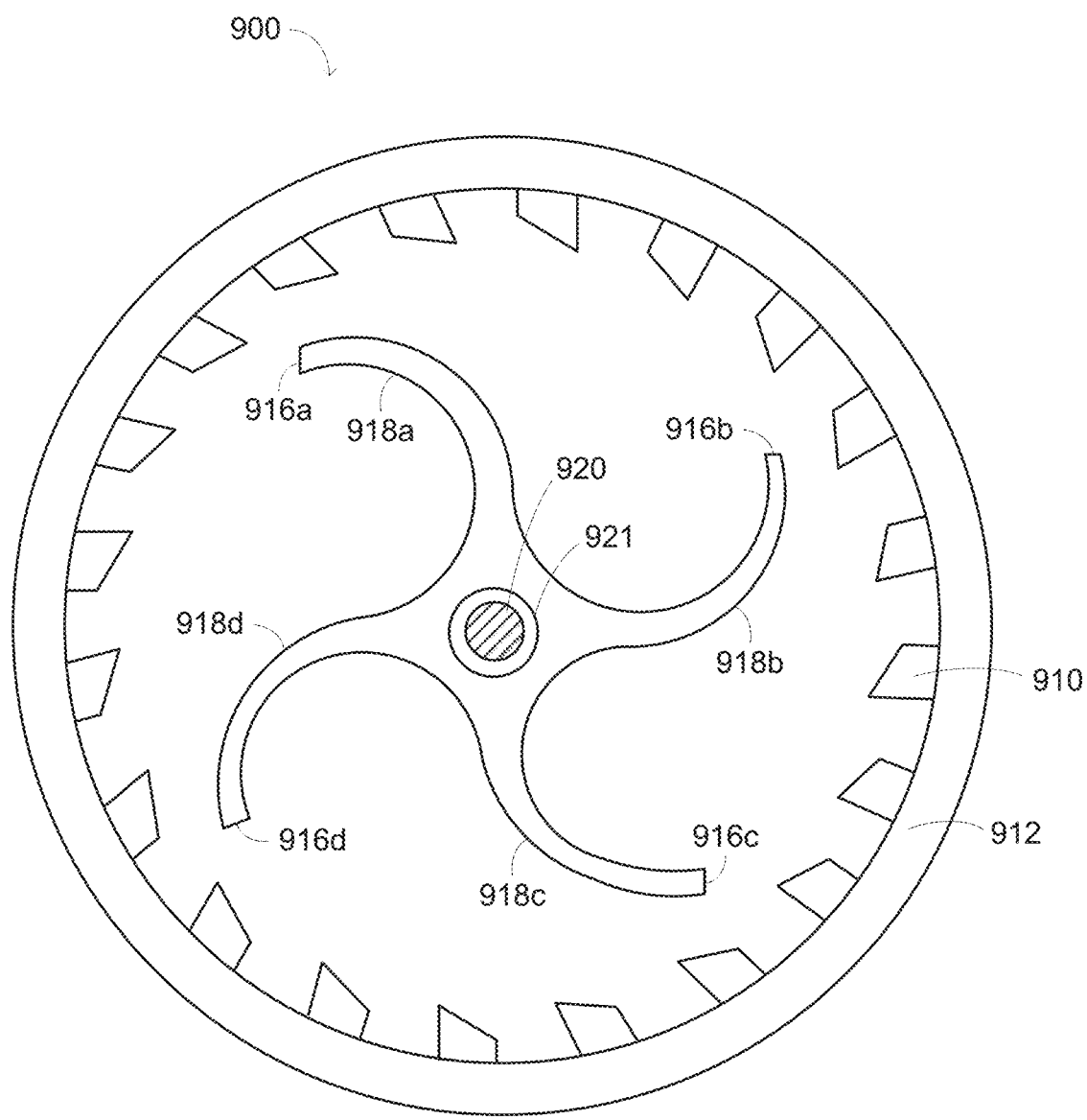

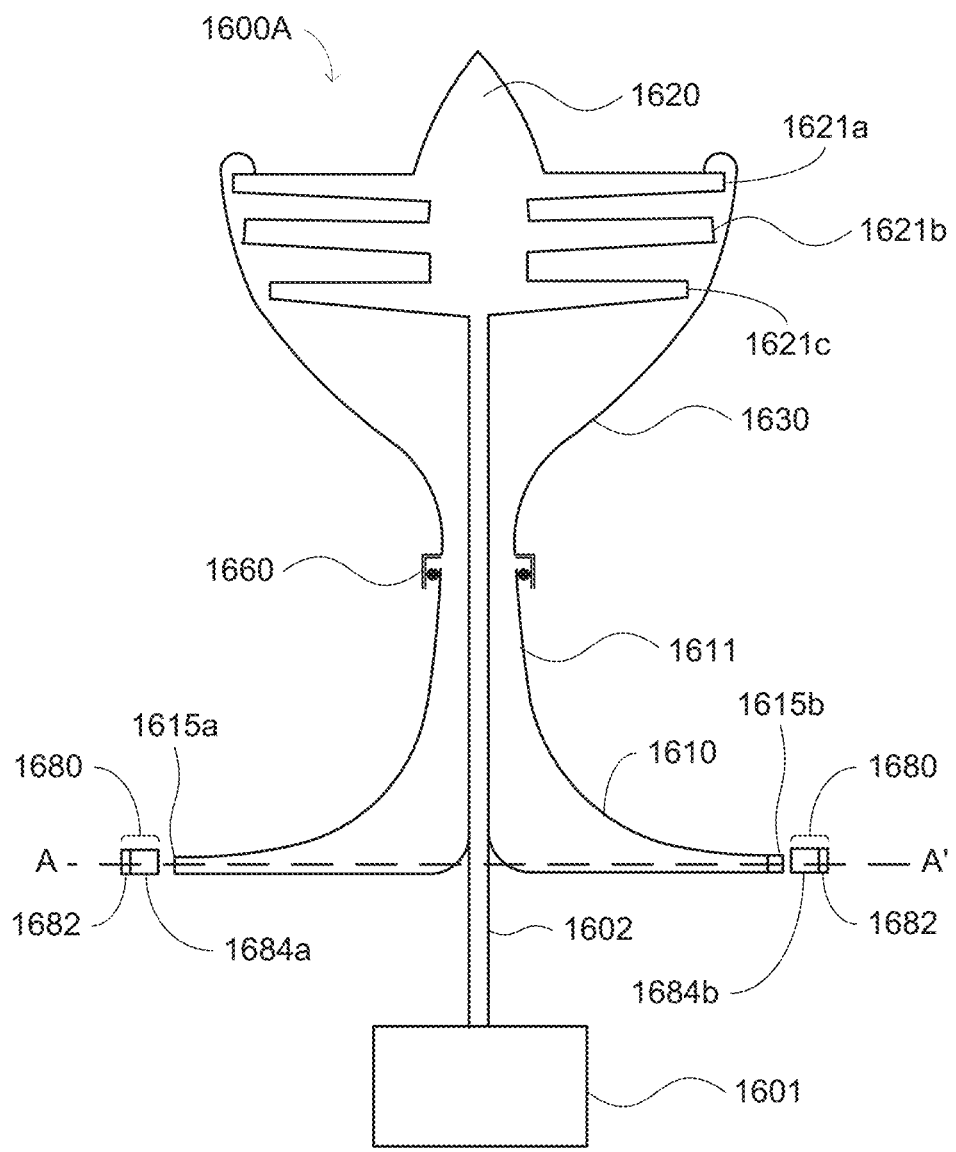

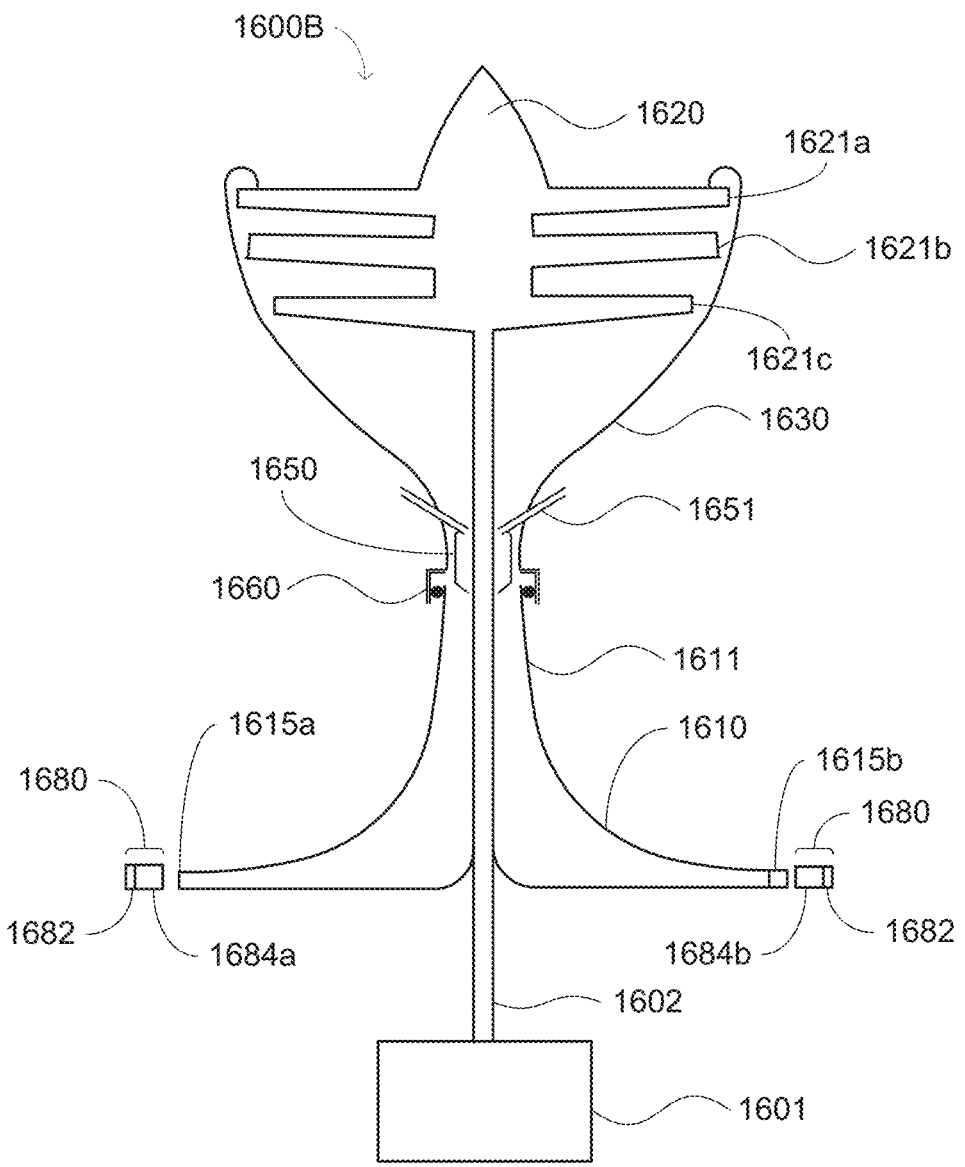

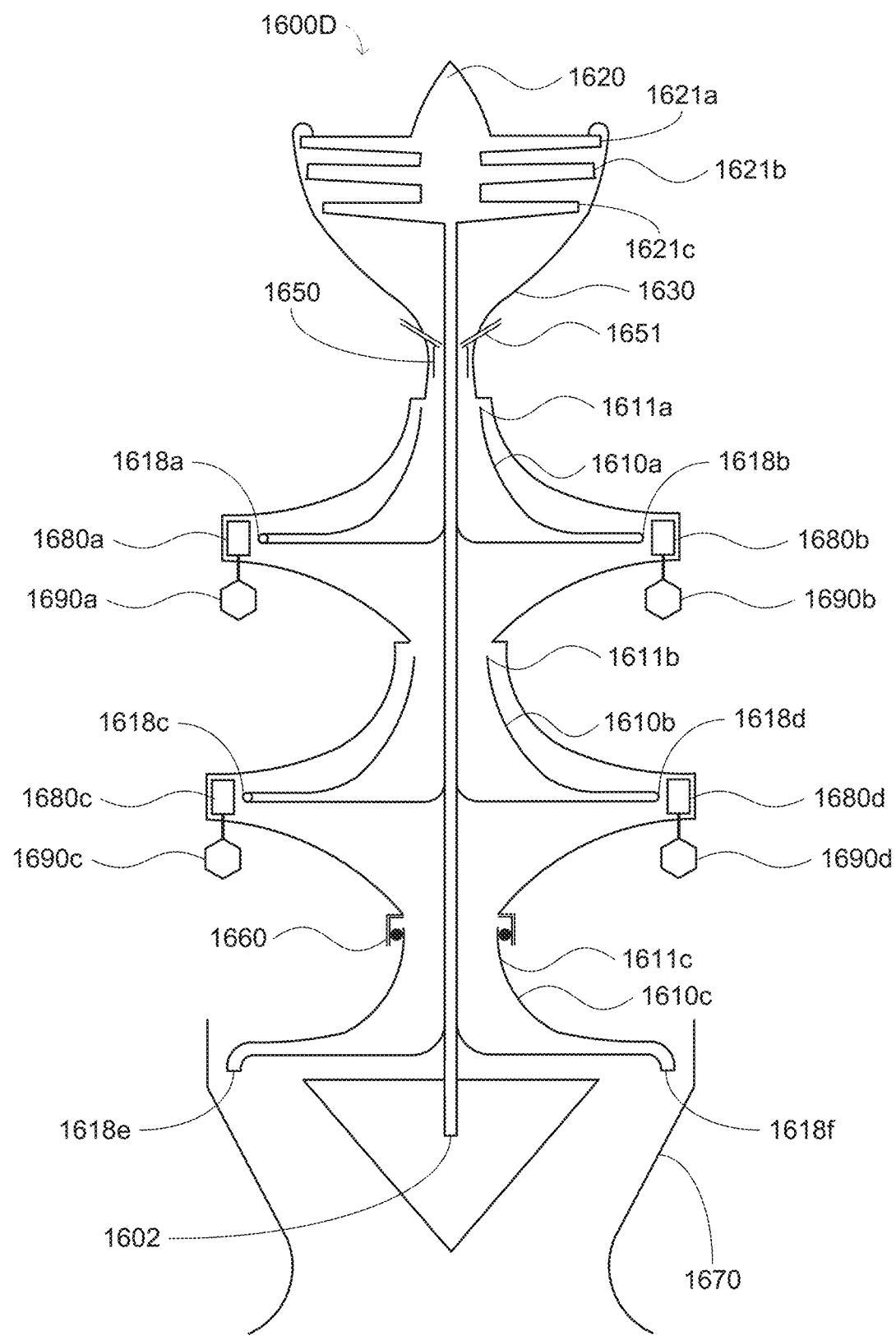

ENGINE, ROTARY DEVICE, POWER GENERATOR, POWER GENERATION SYSTEM, AND METHODS OF MAKING AND USING THE SAME

CROSS REFERENCE TO RELATED APPLICATION

This application claims the benefit of U.S. Provisional Patent Application Nos. 62/494,045 filed on Jul. 22, 2016, 62/493,958 filed on Jul. 22, 2016, 62/496,497 filed on Oct. 18, 2016, 62/498,156 filed on Dec. 16, 2016, 62/499,503 filed on Jan. 25, 2017, and 62/600,591 filed on Feb. 23, 2017, and which are incorporated herein by reference as if fully set forth herein. In addition, this application may be related to U.S. patent application Ser. No. 15/641,760 filed on Jul. 5, 2017, and which is incorporated herein by reference as if fully set forth herein.

FIELD OF THE INVENTION

The present invention generally relates to the fields of rotary devices and detonation and/or combustion engines. More specifically, embodiments of the present invention pertain to (i) a novel rotating pulse detonation and/or combustion engine having cooling coils, (ii) a novel rotary disc fluid transporter or engine, and (iii) a two-part rotary device including a plurality of radial arms or a rotary or rotary disc with nozzles expelling a fluid and a wheel or rim having an inner circumference with a plurality of buckets or cups thereon configured to receive the expelled fluid, a power generation system including one or more of the engines or devices, and methods of manufacturing and using the same.

DISCUSSION OF THE BACKGROUND

Most conventional power generation involves engines and/or motors. However, these technologies generally require combustible material (e.g., fuel, oil and/or coal) and expensive equipment (e.g., in terms of purchase price and maintenance costs). In addition, such material and equipment may consume a lot of space, requiring use of a large amount of ground area or real estate and driving up costs. Furthermore, these technologies may cause air and noise pollution and global warming. As a result, there is a need for more efficient and more reliable technologies for propelling vehicles and producing energy and/or electricity.

In conventional jet engines, air is compressed and slowed down by compressors, then mixed with fuel before entering a combustion chamber. The hot products of the combustion reaction then drive turbines, which have a common axis with the compressors. The hot products converge through a nozzle and accelerate out of the nozzle, thereby producing a forward-moving force. The net thrust of a jet engine is a result of pressure and momentum changes within the engine. Some of these changes produce forward forces, and some produce rearward or backward forces. The major rearward forces are due to the energy used to drive the turbines. Therefore, a fraction of the energy is left for jet engine thrust.

Pulsed jet engines, pulse detonation engines, and other similar types of engines have the simplicity and efficiency of combustion engines, at least in principle. Such engines have drawn attention over the last 70 years. Generally, in conventional pulsed engines and detonation engines, one pipe extends from the combustion chamber, which causes a recoiled shock wave when the fuel is detonated.

Pulsed jet engines are used today in drone aircraft, flying control line mode aircraft, radio-controlled aircraft, fog generators, and industrial drying and home heating equipment. The pulse detonation engine (PDE) marks a new approach towards non-continuous jet engines and promises higher fuel efficiency compared to turbofan jet engines, at least at very high speeds. Currently, Pratt & Whitney and General Electric have active pulse detonation engine research programs. Most pulse detonation engine research programs use pulsed jet engines for testing ideas early in the design phase. Boeing has a proprietary pulse jet engine technology called Pulse Ejector Thrust Augmenter (PETA). These engines are relatively difficult to integrate into commercial manned aircraft designs because of noise and vibration, although they excel on smaller-scale unmanned vehicles. Although pulse detonation engines have been considered for propulsion for over 70 years, practical pulse detonation engines have yet not been put into high volume production.

Generally, turbine engines have been used to propel vehicles (e.g., jets) and to generate industrial electrical power and central power. Typically, a turbine engine includes a compressor, a combustor, and a turbine in a sequential arrangement. Influent air is compressed to a high pressure in the compressor and is fed at a high speed and pressure into the combustor, where the air is mixed with a fuel and combusted to produce a hot, pressurized stream of gas that is passed into the turbine section, where the gas expands and drives a turbine. The turbine converts the energy (e.g., entropy and/or enthalpy) of the gas into mechanical work that drives the compressor and optionally other devices coupled to the gas turbine.

Although recent technology advancements have enabled the use of smaller, lighter gas turbines that are more efficient and less polluting than other engine types (e.g., combustion engines), the efficiency of gas turbines can be improved. For example, conventional natural gas-fired turbine generators convert only between 25 and 35 percent of the natural gas heating value to useable electricity. In addition, conventional engines carry a heavy load of fuel and oxidizers. Conventional engines general require specific types of fuel. Also, the combustion chamber and joints to the rotating arms in conventional rotating pulse engines may become very hot.

Furthermore, conventional turbines for hydro power, such as Pelton wheels, may be used to generate power and/or thrust. FIG. 1A shows a conventional Pelton wheel 100 for a turbine engine. The Pelton wheel 100 of FIG. 1A includes a rim 101, a plurality of spokes 150 that connect a central axis or shaft 120, and a plurality of buckets 102 on the rim 101. The central axis or shaft may be connected to sprocket or axle holders 140. Fluid (F) dispensed from a pipe 110 contacts the plurality of buckets 102 to spin the central axle or shaft 120 of the wheel 100, transferring the mechanical energy to and the wheel 100 and the axle or shaft 120 to generate power and/or thrust.

FIG. 1B shows a conventional bucket 102 of the Pelton wheel of FIG. 1A. The bucket 102 has a back portion 115 that attaches the bucket 102 to the rim 101 of FIG. 1A. The bucket 102 also has a front portion 116 that collects or receives the fluid. The front portion 116 of the bucket 102 has a curved bottom c-c. As shown in FIG. 1B, the bottom c-c include two curves that meet in an apex d. However, a high-speed stream of fluid shooting out from a nozzle (e.g., 112 in FIG. 1A) in a radial direction may not be the most effective or efficient use of conventional Pelton wheels.

Thus, a need exists for more efficient and/or more adaptable turbine technologies for propelling vehicles and producing energy and/or electricity.

Typically, a propeller spinning in air or water may be pushed or pulled in one direction depending on the rotation direction and angle of the blade(s) 201a-b on an axle 202, as shown in FIG. 2A. A "T" shaped polyvinyl chloride (PVC) or metal pipe 203, 204 as shown in FIG. 2B may be referred to as a transporter because air or water may be expelled outward when the T-shaped pipe spins in either direction. A self-amplifying chain reaction may occur when the pressure of the fluid inside the transporter forces fluid to exit the transporter in a particular direction (see, e.g., U.S. patent application Ser. No. 15/227,846, filed on Aug. 3, 2016.

Generally, net thrust is the sum of a forward force and a rearward force (see, e.g., *Aircraft Gas Turbine Engine Technology*, Irwin E. Treager, $3^{rd}$ edition). FIG. 2C shows ground thrust, forward thrust 210 and rearward thrust 220 of an axial-flow jet engine 200A having a compressor 230, a diffuser 240, a combustion chamber 250, a turbine 260, a tail pipe 270 and nozzle 280. The contribution of each component towards the forward and rearward forces is listed in Table 1 below (see, *Aircraft Gas Turbine Engine Technology*, Irwin E. Treager, $3^{rd}$ edition, pg. 144-145).

|  | Forward | Rearward |
| --- | --- | --- |
| Compressor= | 19,100 |  |
| Diffuser= | 2650 |  |
| Combustion chambers= | 32,000 |  |
| Turbine= |  | −39,250 |
| Exhaust duct= | 3750 |  |
| Exhaust nozzle= |  | −6270 |
|  | 57,500 −45,520 | −45,520 |
|  | 11,980 |  |

As shown in Table 1, a significant amount of rearward force or thrust 220 is contributed to the turbine 160. A net thrust of 11,980 lbs. is produced, which is a fraction of the kinetic energy consumed by the turbine. Thus, replacing the conventional turbine with a more efficient engine will advantageously increase the proportion of forward force or thrust (and thus the net thrust) in various types of engines, which in turn will increase the speed of an aircraft equipped with such an engine.

Generally, conventional turbines operate in a range of around or about 10,000 RPM, creating a relatively strong centrifugal field or force. For example, FIGS. 2D-F are diagrams showing various conventional jet engines and gas turbines. FIG. 2D shows a conventional jet engine 200B having an air inlet 220, a compressor 230, a combustion chamber 240, a turbine 250, and a nozzle 260 that expels the exhaust 290. Intake air 225 enters the air inlet 220, passes through the compressor 230, and is expanded in the combustion chamber 240. The expanding gas turns the turbine 250, and exhaust exits through the nozzle 270. Typically, the jet engine 200B has a cold section 211 and a hot section 212. The cold section 211 includes the air inlet 220 and the compressor 230. The hot section 212 includes the combustion chamber 240, the turbine 250, and the nozzle 260. FIG. 2E shows another conventional jet/engine 200C, similar to the engines 200A and 200B shown in FIGS. 2C-D. The conventional jet/engine 200D includes a compressor 221, a shaft 222, a combustion chamber 223, a turbine 224, and a nozzle 225. The compressor 221 may include a centrifugal impeller, as shown in FIG. 2E.

Furthermore, FIG. 2F shows a conventional gas engine 200F that includes an intake valve or inlet 220 for intake of fuel and air 226, a shaft 222, a compressor 232, a combustion chamber 234, a turbine 236, and an exhaust valve 238, through which exhaust 239 is released into the atmosphere.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a novel detonation and/or combustion engine, a rotary device, a power generator and/or power generation system, and methods of manufacturing and using the same. The present invention provides an engine that advantageously uses rotating arms or a rotary disc, cooling coils and/or plurality of buckets or cups on a wheel or cylinder to generate a rotational driving force for a motor and/or device. As a result, the present engine and/or rotary device may be more efficient and may have less wear and tear than conventional combustion engines or rotary devices, and may have fewer parts subject to such wear and tear. Furthermore, the present engine and/or rotary device can advantageously utilize an expelled fluid (e.g., exhaust detonation gases) to drive a turbine unit, which may increase the net thrust (e.g., of the engine or rotary device).

In one aspect, the present invention relates to an engine that includes a detonation and/or combustion chamber configured to detonate a fuel and rotate around a central rotary shaft extending from the detonation and/or combustion chamber, a fuel supply inlet configured to provide the fuel to the detonation and/or combustion chamber, and at least two rotating arms extending radially from the detonation and/or combustion chamber and configured to exhaust detonation gases from detonating the fuel in the detonation and/or combustion chamber and provide a rotational thrust and/or force. Each of the rotating arms has inner and outer walls and a nozzle at a distal end thereof. The nozzle has or is at an angle configured to provide the rotational thrust and/or force. The engine further includes a plurality of cooling coils between the inner and outer walls of the radial arms.

In various embodiments of the present invention, the inner wall of each radial arm extends from the detonation and/or combustion chamber and may have a cylindrical or a curved tubular shape. In addition, the outer wall may have a cylindrical or a curved tubular shape that matches or follows the shape of the inner wall. Each of the inner and outer walls may include or comprise a metal sheet, a metal foil, or a ceramic structure. The inner wall may be configured to optimize a cooling function, and the outer wall may be configured to optimize an aerodynamic function (e.g., of the radial arm[s]).

In exemplary embodiments of the present invention, the cooling coils may wrap around the inner wall and may be adjacent to (e.g., at an end of the radial arm nearest to) the detonation and/or combustion chamber. The cooling coils may comprise steel, aluminum or copper. The cooling coils may include one or more openings between the inner and outer walls. For example, the openings may be at the ends of the cooling coils distal from the detonation and/or combustion chamber. The cooling coils may be configured to carry a fluid (e.g., water) through the cooling coils. Each of the cooling coils may be configured to vaporize the fluid and expel a vapor or gas through the nozzle.

In some embodiments of the present invention, the engine may include a monitoring and/or controlling device configured to monitor and/or control the fluid flowing through the cooling coils. In other embodiments of the present invention, the engine may also include a mechanical work unit configured to receive at least part of the rotational thrust and/or force. The mechanical work unit may include a generator, a motor, a pump, or a turbine. In further embodiments, the mechanical work unit may further include a housing configured to enclose and/or protect the generator, motor, pump or turbine (which may comprise a turbine wheel).

In various embodiments of the present invention, the engine may further comprise one or more wheels or cylinders, in which each wheel has a plurality of buckets or cups on an inner or outer circumference thereof. The buckets or cups may be configured to receive the fluid expelled from the nozzles. In some embodiments, when the buckets or cups are on the inner circumference of the wheel, the wheel may include a transmission gear on the outer circumference. The transmission gear is configured to engage with one or more external generator configured to drive an external generator or work unit. In some embodiments of the present invention, the engine may further comprise one or more aerodynamic surfaces on or over the rotating arms.

Another aspect of the present invention relates to an engine including a detonation and/or combustion chamber configured to detonate a fuel and expand a gas, a supply inlet configured to provide the fuel and the gas to the detonation and/or combustion chamber; and a first rotary disc joined to a central axle or shaft and configured to rotate around the central axle or shaft, the rotary disc having (i) an inlet configured to receive the detonated fuel and expanded gas and (ii) a plurality of nozzles at a distal edge thereof, the nozzles being oriented to expel the detonated fuel and expanded gas in a predetermined direction.

The present engine may further include a wheel or cylinder that has a plurality of buckets or cups on an inner or outer circumference thereof. The plurality of buckets or cups are configured to receive the fluid expelled from the nozzles. When the buckets or cups are on the inner circumference, the wheel may further comprises a transmission gear on the outer circumference, in which the transmission gear is configured to engage with one or more external gears configured to drive an external generator or work unit.

In some embodiments of the present invention, a plurality of generators may receive rotational energy or torque from a plurality of the wheels or cylinders. In further embodiments of the present invention, the engine may comprise a second rotary disc joined or affixed to the central axle or shaft and adjacent to the first rotary disc. The second rotary disc may have a plurality of nozzles at a distal edge thereof and is configured to rotate around the central axle or shaft and receive the expelled detonated fuel and expanded gas from the first rotary disc. In some embodiments, of the present invention, the rotary disc(s) may comprise a plurality of dividers. In various embodiments, the engine may comprise a compressor at or near the supply input, in which the compressor is configured to compress at least the gas provided to the denotation and/or combustion chamber. In addition, the compressor may include one or more fans joined or affixed to the central axle or shaft.

Another aspect of the present invention includes a method of converting a fuel and an optional gas or vapor into mechanical energy, including introducing the fuel into a detonation and/or combustion chamber through a fuel supply inlet, detonating the fuel in the detonation and/or combustion chamber, and exhausting detonation gas(es) through a plurality of rotating arms or a rotary disc extending radially from the detonation and/or combustion chamber. Each of the rotating arms has inner and outer walls and a nozzle at a distal end thereof. The rotary disc has a plurality of nozzles at a distal end or edge thereof. When the detonation gas(es) are exhausted through the rotating arms, the method further comprises introducing a fluid into a cooling coil between each of the inner and outer walls, vaporizing the fluid to form a gas or vapor, and expelling the gas or vapor from the nozzles. The exhausted detonation gas(es) and (when present) expelled gas or vapor rotate the rotating arms or the rotary disc to generate a rotational thrust and/or force. The method also comprises converting the rotational thrust and/or force into the mechanical work or energy.

In various embodiments, the fuel and the gas or vapor may be converted into mechanical energy, and the detonation gas(es) may be exhausted through the plurality of rotating arms, introducing the fluid into the cooling coil, vaporizing the fluid to form the gas or vapor, expelling the gas or vapor from the nozzle, and rotating the rotating arms from the exhausted detonation gas(es) and the expelled gas or vapor. In addition, gas or vapor may be expelled from the nozzles into a plurality of buckets on an outer circumference of a wheel. In exemplary embodiments, rotational forces may be converted to a plurality of generators.

Another aspect of the present invention includes a rotary device having a first central axle or shaft, an inlet configured to receive at least one fluid, and a first rotary disc in fluid communication with the inlet, configured to rotate around the first central axle or shaft, the rotary disc having a plurality of nozzles at a distal edge thereof. The nozzles are oriented to expel the fluid in a predetermined direction.

In various embodiments of the present invention, the rotary disc extends radially from the inlet, and the inlet may include a hole or opening at or near the top and/or center of the inlet. In some embodiments, the inlet may extend to the center of the disc and may be configured to enable rotation of the disc. The rotary disc may comprise two plates or discs having a space therebetween, and is configured to rotate around the first central axle or shaft. The disc (or the plates of the disc) may be sealingly secured directly or indirectly to each other at the circumference of the disc (or plates), and the disc may further include a plurality of bolt-and-nut or other fasteners configured to secure the plates or disc together. The plates or discs may be welded to each other or to a ring, cylinder or other structure at the circumference of the plates or discs. In some embodiments, the rotary disc may include at least four nozzles. In other or further embodiments, the rotary disc-based rotary device may further include a plurality of bucket or cups on an inner or outer circumference of a wheel or cylinder, configured to receive the fluid expelled from the nozzles.

In various embodiments of the present invention, the wheel may include a transmission gear on the inner or outer circumference opposite of the circumference having the buckets or cups. The transmission gear is configured to engage with one or more external gears (e.g., complementary gears) configured to drive an external generator or work unit. In various embodiments of the present invention, a plurality of generators may receive a rotational energy or torque from the plurality of wheels or cylinders.

In some embodiments of the present invention, the rotary device may include a compressor at or in front of the inlet. The compressor is configured to compress the fluid (e.g., air) in the inlet and/or the rotary disc. In addition, the compressor may include one or more fans that are joined or affixed to the first central axle or shaft. In some embodiments, the rotary disc comprises a plurality of dividers. In further embodiments of the present invention, an engine or jet may include the rotary device of the present invention and at least one additional rotary disc in series with the first rotary disc.

In various embodiments, the rotary device may convert movement of a fluid into mechanical work or energy by introducing the fluid into the rotary disc through the inlet, moving the fluid to the edge of the rotary disc, expelling the fluid through the nozzles, rotating the rotary disc from the expelled fluid to generate a rotational thrust and/or force; and converting the rotational thrust and/or force into the mechanical work or energy.

A further aspect of the present invention includes a rotary device, including a first central axle or shaft, an inlet configured to receive at least one fluid, a plurality of radial arms in fluid communication with the inlet, a plurality of buckets or cups on an inner or outer circumference of a wheel or cylinder, and a second axle or shaft connected directly or indirectly to the wheel or cylinder. The radial arms are configured to rotate around the first central axle or shaft. Each rotating arm has a nozzle at a distal end thereof and an arc between the inlet and the nozzle. The radial arms extend radially from the first central axle or shaft at least in part, and are configured to rotate when the fluid enters the inlet and passes through the radial arms and/or when a first rotational force is applied to the first central axle or shaft. The buckets or cups are configured to receive the fluid expelled from the nozzles. The second axle or shaft is configured to receive a second rotational force from the wheel or cylinder.

In exemplary embodiments of the present invention, each of the radial arms may include a curved tubular arm. The fluid may flow through the nozzles at an angle perpendicular or substantially perpendicular to an opening in each of the buckets or cups. In various embodiments, the buckets or cups are equally spaced from each other by 360°/n, where n equals a number of the buckets. In further embodiments, the device may include at least one gear on the outer circumference of the wheel or cylinder, in which the gear is configured to drive at least one generator. In some embodiments, the device may further include a mechanical work unit configured to (i) receive a second rotational force from the second axle or shaft or (ii) apply the first rotational force to the first axle or shaft. In some embodiments of the present invention, the rotary device may comprise one or more aerodynamic surfaces on or over the radial arms.

An even further aspect of the present invention relates to a method of converting energy that includes receiving a flowing fluid in an inlet, passing the fluid from the inlet through a plurality of radial arms or a rotary disc, and expelling the fluid through a nozzle at a distal end of each radial arm to rotate the radial arms or through a plurality of nozzles at a distal edge of the rotary disc, the fluid being expelled into a plurality of buckets or cups on an inner or outer circumference of a wheel or cylinder. The inlet is in fluid communication with the radial arms or rotary disc. Each nozzle has an opening facing away from a direction of rotation of the radial arms or rotary disc. Rotation of the radial arms or rotary disc applies a first rotational force to a first central axle or shaft to which the radial arms or rotary disc are connected or coupled or results from the first rotational force being applied to the first central axle or shaft. The wheel or cylinder applies a second rotational force to a second axle or shaft. The method further includes converting the first and second rotational forces into mechanical work or electrical energy.

The present engine advantageously increases the efficiency of pulse detonation engines by using latent heat from exhaust gases to heat a fluid in the cooling coils and cause the heated gas or vapor (e.g., steam) to rush out of the nozzles, increasing the amount of thrust and increasing the power of the engine (relative to an engine in which the cooling fluid is cooled conventionally, such as by using a radiator) without increasing the amount of fuel introduced into the combustion chamber. As a result, the present engine produces less pollution and reduces global warming per unit volume or weight of fuel consumed. The present engine (which, in exemplary embodiments, may be termed a "rotating pulse detonation engine" [RPDE], an acoustic-type pulse engine) is advantageously relatively simple. Furthermore, since there are few or no moving parts to wear out, the present invention is relatively easy to maintain and simple to construct. The present engine has an excellent balance of cost and function, and is based on a simple design that performs relatively well and at relatively low or minimal cost. The present engine is not sensitive to debris and runs on a variety of different types of fuels. The present rotating pulse detonation engine (RPDE) can be easily scaled up or down, and can be arranged in one or more stages and/or in an array.

The present rotary device advantageously captures kinetic energy from fluid thrust out of nozzles of rotating arms or rotary disc, increasing the effectiveness and efficiency of the device. Such a device may be used in rotating pulse detonation engines and other engines to advantageously enhance the power and/or efficiency thereof. These and other advantages of the present invention will become readily apparent from the detailed description of various embodiments below.

BRIEF DESCRIPTION OF THE DRAWINGS

FIGS. 2D-F are diagrams showing various conventional jet and/or gas engines and/or turbines.

FIG. 4A is a cross-sectional view of an exemplary detonation chamber and exemplary rotating arms with cooling coils according to one or more embodiments of the present invention.

FIGS. 4B-C show an exemplary fluid inlet configured to provide a fluid to the exemplary cooling coils in FIG. 4A.

FIGS. 7A-B are diagrams showing another exemplary rotary device according to one or more alternative embodiments of the present invention.

FIG. 8 is a cross-section of the exemplary rotary device of FIGS. 7A-B, showing the trajectory fluid flow according to one or more embodiments of the present invention.

FIG. 9 is a diagram showing a further exemplary rotary device according to one or more embodiments of the present invention.

FIGS. 16A-E are diagrams showing (i) another rotary device and (ii) pulse detonation engines including the device according to embodiments of the present invention.

DETAILED DESCRIPTION

Figure 1A:
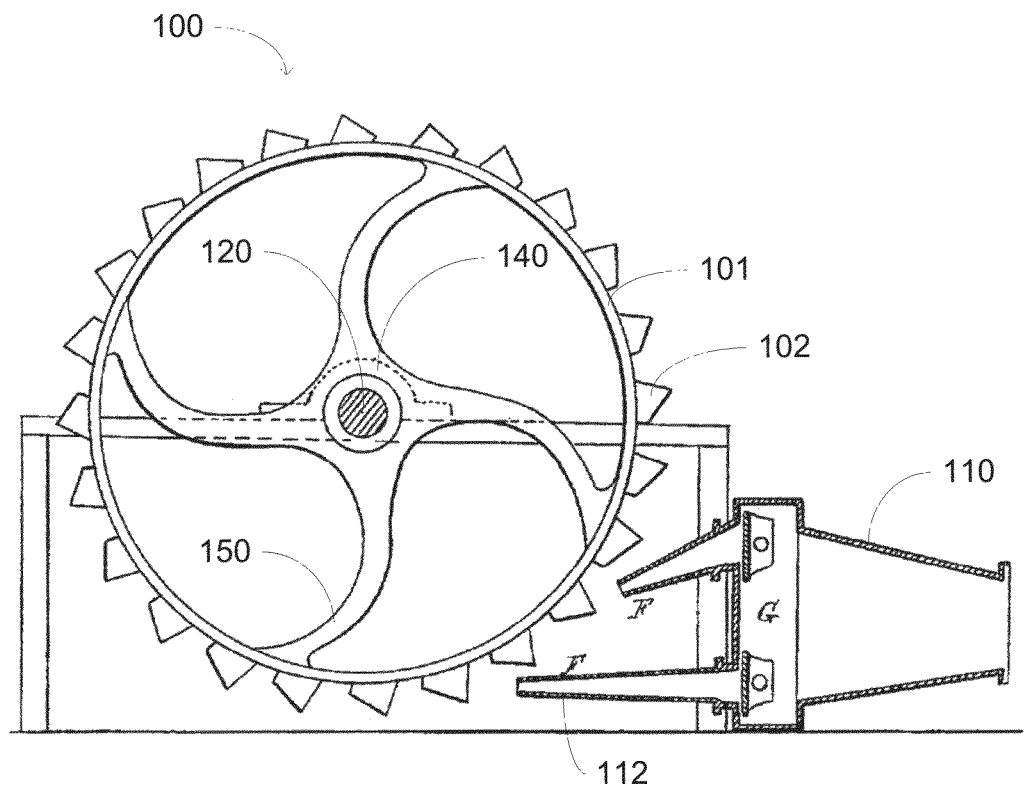
FIG. 1A is a cross-sectional view of a conventional Pelton wheel.
Figure 1B:
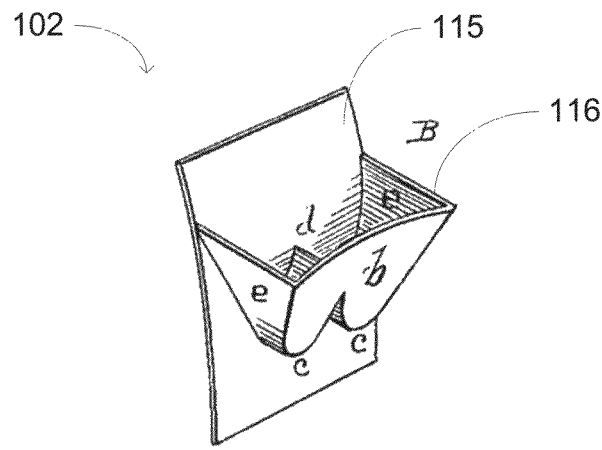
FIG. 1B is a perspective view of a conventional Pelton wheel bucket.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Embodiments of the present invention relate to an engine (e.g., a rotating pulse detonation engine), a rotary device, a power generator or power generation system, and methods of making and using the same. The present engine and rotary device are advantageously simpler and easier to manufacture and repair then conventional engines and devices, as it can have as few as two moving parts (the central rotating shaft and either [i] the combined rotating arms and detonation combustion chamber or manifold or [ii] the rotary disc). Furthermore, in the present engine, once the fuel is ignited, subsequent pulsed detonations can auto-ignite, simplifying the ignition mechanism and/or system. As a result, the present engine, rotary device and method(s) can contribute a relatively high proportion of the rotational thrust to rotational torque. The present engine and device can be scaled up or down easily, and can use a wide variety of fluids and/or fuels. With further optimization, the efficiency of the present engine, device and method(s) can continue to be improved, making the potential for applications and use of the present engine or rotary device nearly limitless.

An Exemplary Engine

Figure 3A:
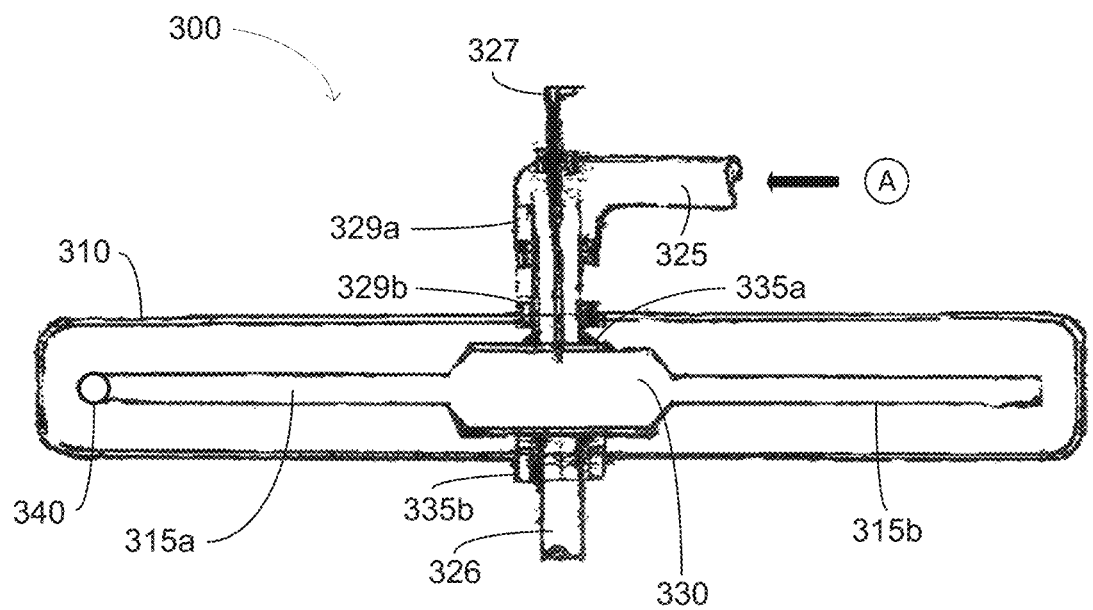
FIG. 3A is a cross-sectional view of an exemplary engine according to one or more embodiments of the present invention.
Figure 3B:
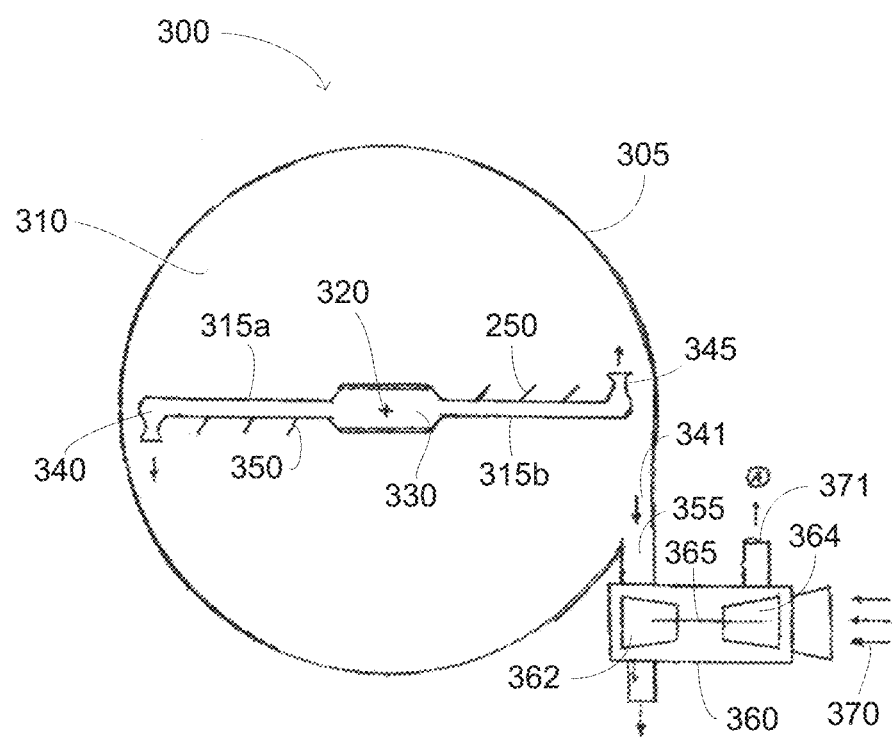
FIG. 3B is a top-down view of the exemplary engine of FIG. 3A.

FIGS. 3A-3B show an exemplary engine 300 according to embodiments of the present invention. The engine 300 generally comprises a housing 310, a central rotary shaft 326, a detonation and/or combustion chamber 330 having first and second rotational arms 315*a* and 315*b*, at least one fuel supply inlet 327, at least one air supply channel 325, at least two (2) exhaust nozzles 340 and 345, an optional exhaust duct 355, and an optional mechanical work unit 360. The exhaust nozzles 340 and 345 direct exhaust (i.e., detonation gases) in a particular direction to move the rotating arms 315*a-b* forward similar to a rocket engine, but movement of the rotating arms 315*a-b* is constrained (e.g., in a fixed orbit around the central rotary shaft 326). The detonation gases exiting the exhaust nozzles 340 and 345 turn the arms 315*a-b* and the chamber 330 on the central rotary shaft 326 to create a rotational force that can be delivered directly or indirectly by the shaft 326 to drive or power a motor, for aircraft or other vehicles, for generating electricity, or for any other purpose for which engines that create or generate rotational force can be used.

Figure 2A:
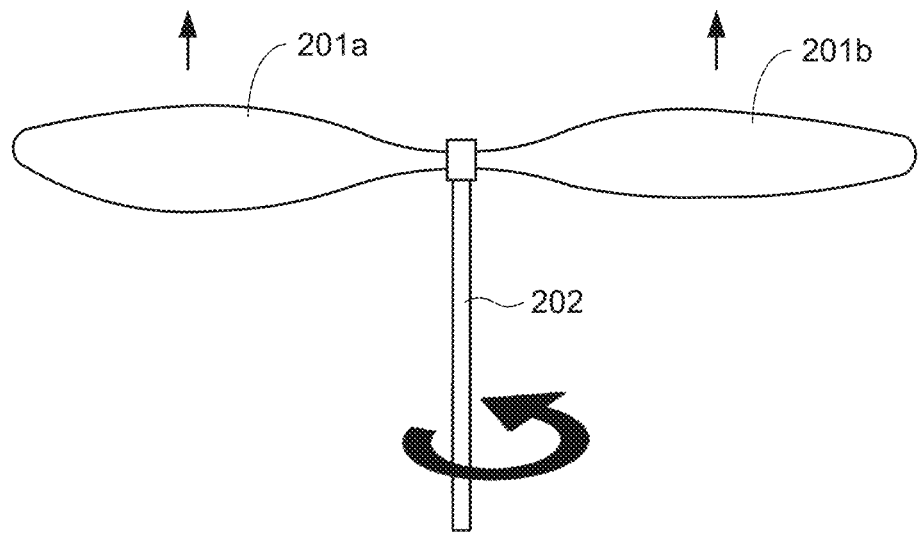
FIGS. 2A-B are perspective views of a conventional propeller and transporter.
Figure 2B:
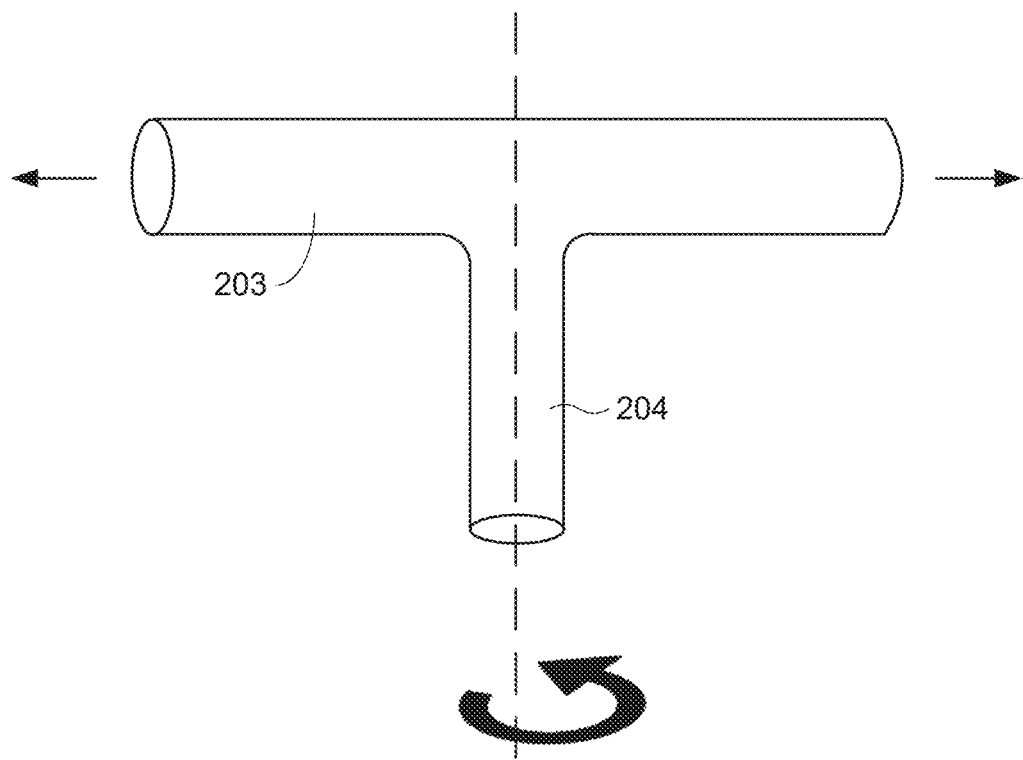
Figure 2C:
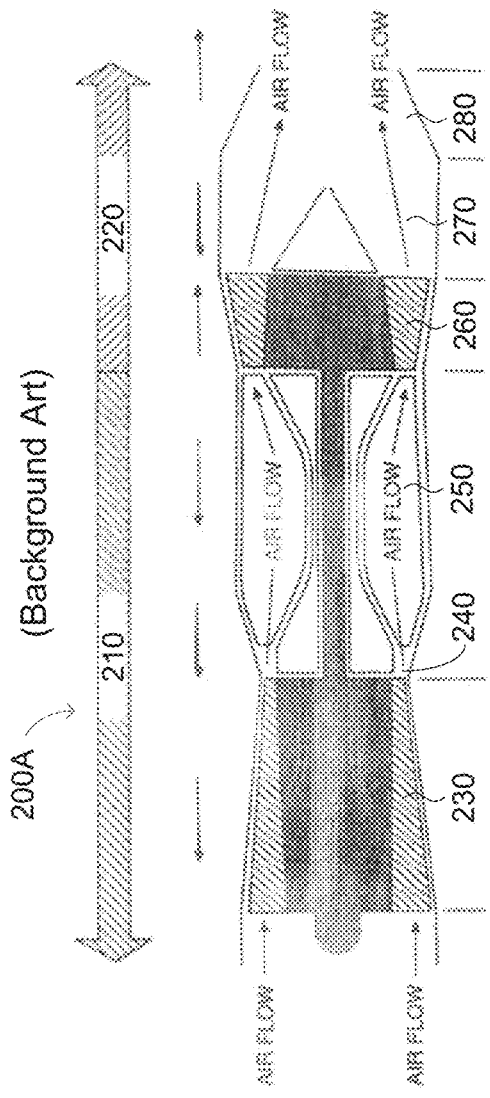
FIG. 2C is a diagram showing the various thrust components of a conventional jet engine.
Figure 2D:
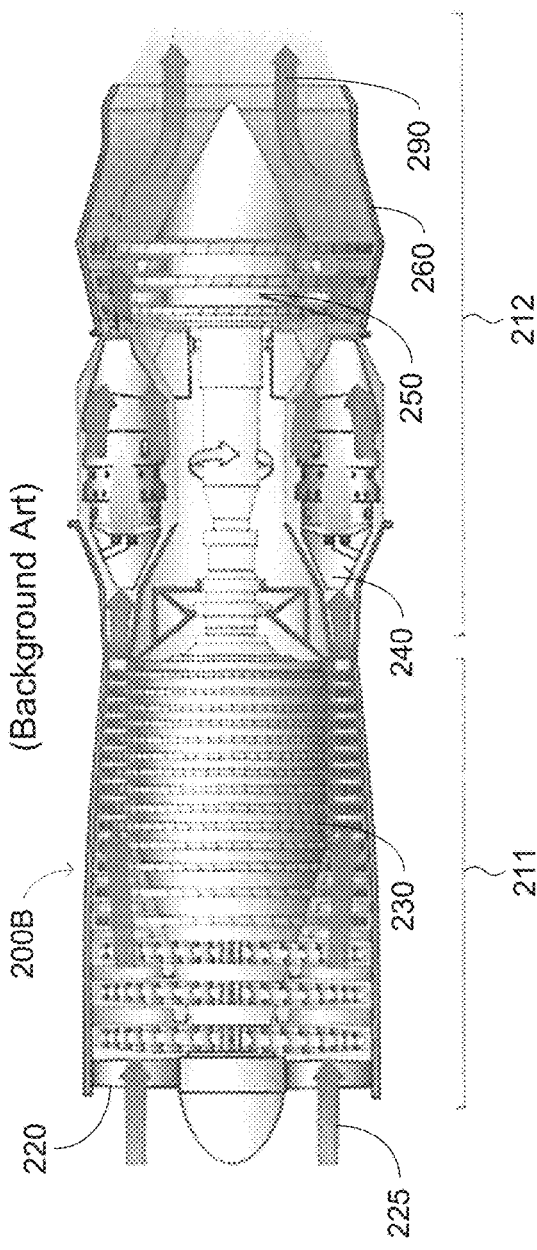
Figure 2E:
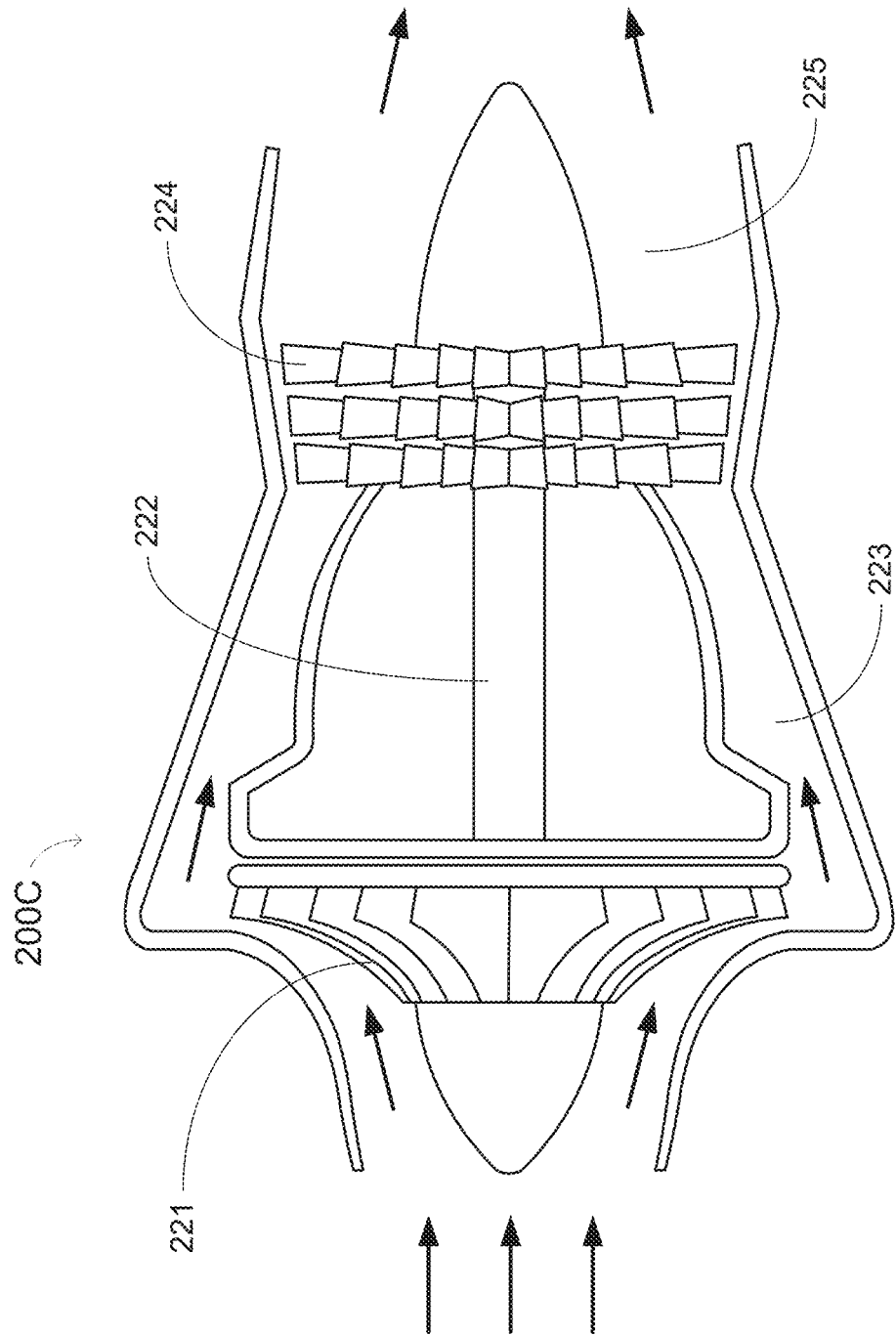

FIG. 3A is a cross-sectional view of the engine 300 in FIG. 3B. The housing 310, which may have a disc shape or other shape (e.g., oval or square, hexagonal, octahedral, rectangular, or other regular or irregular polygon) when viewed from the top or bottom, may comprise a wall with at least one opening 341 therein (see FIG. 2B) to an exhaust duct or port 355. The dimensions (e.g., circumference) of the housing may vary depending on the dimensions of the exhaust nozzles 340 and 345, the chamber 330, and the rotating arms 315a-b. Generally, the housing 310 has a shape configured to allow rotation of the arms 315a-b and the exhaust nozzles 340, 345.

In some embodiments, the housing 310 may have an insulation layer on the inner and/or outer surface of the housing 310 (or between walls of a multi-walled housing. Typically, the insulation layer is a thermo-insulative material. Other various insulative materials may also be used for the insulation layer, such as polyurethane foam, expanded polystyrene, expanded perlite, fiberglass, and/or cork. The housing 310 may be further equipped with an air nozzle (not shown) for introducing additional air around and/or into the chamber 330, for cooling the chamber 330, driving detonation gases and/or particles through an exhaust duct (e.g., 355 of FIG. 3B), etc.

The central rotary shaft 326 (FIG. 3A) is positioned along a central axis 320 (FIG. 3B) of the detonation and/or combustion chamber 330. In some embodiments, the central rotary shaft 326 extends through the lower or rear-facing surface of the housing 310, and in other embodiments, the central rotary shaft 326 extends through both the upper/front-facing and lower/rear-facing surfaces of the housing 310. The central rotary shaft 326 may be connected or joined to a coaxial rod or cable (not shown) at one end, and one or more gears, wheels or fans may be connected to and/or driven by the rod or cable at another end (i.e., an opposite end of the rod or cable).

In exemplary embodiments, the air supply channel 325 receives compressed air and directs the compressed air to the detonation and/or combustion chamber 330. In various embodiments, the air supply channel 325 may include seals 329a-b configured to maintain an airtight supply of air, fuel or both through the housing 310 to the detonation and/or combustion chamber 330, and bearings 335a-b that allow certain parts to rotate (e.g., the central shaft 326 and chamber 330), while other parts stay fixed. Preferably, there are at least two sets of bearings 335a-b having a ring-shaped or toroidal cross-section located around the detonation and/or combustion chamber 330 and the central shaft 326, respectively, as shown in FIG. 3A.

A generator, a motor, a pump, a turbine or other mechanical device may be configured to receive the rotational force from the central rotary shaft 326. Alternatively, the mechanical device may receive another form of mechanical energy converted from the rotational force, such as a cam follower in a cam that is driven by a gear that receives the rotational force. When the mechanical device is a generator, the other forms of mechanical energy received by the generator are generally indirect. For example, the central rotary shaft 326 may drive a belt that, in turn, drives a wheel in the generator. Alternatively, the central rotary shaft 326 may drive a wheel or other mechanism that, in turn, drives a piston, cam, or other mechanism that can generate work, power, or electricity.

The fuel inlet 327 and air supply and/or distribution channel 325 advantageously supply fuel and air (A) to the detonation and/or combustion chamber 330. In some embodiments, the fuel inlet 327 and air channel 325 may include a single conduit or path that supplies a mixture of the fuel and air (A) to the detonation and/or combustion chamber 330. In some embodiments of the present invention, the engine 300 may include an ignition device (not shown in FIGS. 3A-B) that ignites or detonates the fuel in the detonation and/or combustion chamber 330, and an ignition cable or wire to the ignition device. The ignition device may comprise an electrical igniter (e.g., a spark generator or spark plug) or other form of ignition device known in the art, including, but not limited to, a high-temperature wire (e.g., a tungsten or stainless steel filament). The ignition device may be configured for initial ignition of the fuel. After one or more detonations (e.g., detonation pulses or cycles), the fuel may auto-ignite in the chamber 330 (e.g., due to residual heat in the chamber and introduction of sufficient compressed air for the fuel to combust or detonate).

The engine 300 has at least one combustion chamber 330. Alternatively, the engine 300 may have a plurality of combustion chambers 330. The chamber 330 is configured to receive the fuel and air from the fuel supply conduit 327 and the air channel 325. Typically, the fuel supply conduit 327 is adjacent (e.g., joined) to or coaxial with the air supply conduit 325, and may include a pin or valve (not shown) to introduce the fuel into the detonation and/or combustion chamber 330. The air supply conduit 325 may include a similar or identical pin or valve (not shown) to introduce the compressed air into the detonation and/or combustion chamber 330 at the proper time in the detonation cycle (or pulse). The combustion chamber 330 may include inner and outer walls (not shown). Typically, in such a configuration, the outer wall of the detonation and/or combustion chamber 330 is solid, and the inner wall of the detonation and/or combustion chamber 330 has a plurality of openings configured to result in a particular air flow in the detonation and/or combustion chamber 330, to reduce noise and/or emission of particulate detonation products, etc. In some embodiments, the outer wall may of the detonation and/or combustion chamber 330 has no openings other than at the rotating arms 315a-b.

As shown in FIG. 3A, the exemplary engine 300 has rotating arms 315a and 315b that extend from the detonation and/or combustion chamber 330 and that spin or rotate around the axis 320. The rotating arms 315a-b may be welded and/or connected by bolts, clamps, screws, etc. to the detonation and/or combustion chamber 330, or formed integrally with the chamber 330. In the engine 300, the rotating arms 315a-b may be relatively long (i.e., longer than the combustion chamber 330, by 2×, 3×, or more) to retain sufficient hot gas within the combustion chamber 330 to ignite the fuel entering the detonation and/or combustion chamber 330 for the next detonation/combustion pulse. Dimensions of the detonation and/or combustion chamber 330 and the rotating arms 315a-b can be optimized for a certain pulse frequency, rotation rate, etc., and it is within the ability of one skilled in the art to determine such dimensions. For example, the detonation and/or combustion chamber 330 may have a diameter or a height and/or width greater than each of the rotating arms 315a-b (e.g., by 1.5×, 2× or more) for the same purpose and/or to "tune" the detonation pulses to a particular, predetermined or desired frequency. The centrifugal effect of the spinning or rotating arms 315a-b advantageously provides additional speed to the hot gas rushing out of the nozzles 340 and 345, thereby increasing the torque and/or the rotary force generated by the central rotating shaft 326.

In various embodiments, the nozzles 340 and 345 can have any of a variety of shapes, including, but not limited to, circular, oval, curved, constricted, flared, combinations thereof, etc. The nozzles 340 and 345 may also represent or be in the form of an augmenter, which may have an annular, concentric, or ring-like shape. Generally, the number of nozzles is equal to the number of rotating arms 315a-b.

FIG. 3B is a top-down view of the engine 300 in FIG. 3A. The exemplary engine 300 includes at least one exhaust duct, vent or port 355 that extends from the housing 310. The exhaust duct 355 may be configured to direct exhaust 341 from the housing 310 to a mechanical work unit (e.g., a generator, a motor, a pump, or a turbine unit) 360. The mechanical work unit 360 receives at least part of the rotational thrust and/or force. In some embodiments, a reflector (not shown) may be at the end of the exhaust duct 355 to direct the thrust from the housing 310 to the turbine unit 360. Thus, the detonation exhaust gases may be channeled or directed to a location or stage of the engine where the exhaust gases can perform work (e.g., in the turbine unit 360, that may include one or more turbines 362 and at least one compressor 364).

In some embodiments, each of the rotating arms 315a and 315b may be thermally insulated to prevent energy loss, and may have one or more fins 350 thereon. The fins 350 may be on opposite and/or trailing surfaces of the rotating arms 315a-b. The fins 350 may be at an angle with respect to a vertical or horizontal plane (e.g., defined by the rotating arms 315a-b), or may be curved (e.g., along a circular arc defined at least in part by the rotational path of the arms 315a-b).

Preferably, the engine 300 has an even number of rotating arms 315a-b (e.g., 2, 4, 6, 8, etc.) and the same number of exhaust nozzles. However, the number of rotating arms 315a-b and the number of exhaust nozzles 340, 345 may be 3, 5, 9, or any other positive integer by which 360 can be divided to give an integer or a regular fraction. Evenly-spaced, identical rotating arms (e.g., 315a, 315b) may increase the efficiency and balance of the engine 300.

In exemplary embodiments, each rotating arm 315a-b includes an exhaust nozzle 340 or 345. Each of the exhaust nozzles 340 and 345 may be permanently or detachably connected to a corresponding rotating arm 315a or 315b. The ratio of exhaust nozzles to rotating arms is generally 1:1, but is not limited thereto. For example, multiple exhaust nozzles (e.g., 2 or more) can be positioned at and/or affixed to the end of each rotating arm. Exhaust nozzles may be attached to the rotating arm by various methods, including, but not limited to, welding, shrink fitting, gluing, screwing/threading, and/or compression fitting.

Each exhaust nozzle 340 or 345 is configured to exhaust detonation gases from detonating the fuel in the detonation and/or combustion chamber 330 and provide a rotation thrust and/or force to rotate the rotating arms 315a-b and the central rotary shaft 326 around the central axis 320. The exhaust nozzles 340 and 345 have an angle of about 60° to 120° relative to a line at which the corresponding rotating arm 315a-b extends from the detonation and/or combustion chamber 330 to provide the rotational thrust and/or force. The nozzle may be coplanar with the corresponding rotating arm and the detonation and/or combustion chamber 330. In some examples, the exhaust nozzles 340 and 345 are at an angle of 90° or about 90° relative to an imaginary straight line between the rotation axis to the nozzle opening or the line at which the corresponding rotating arm 315a-b extends from the detonation and/or combustion chamber 330.

After detonation/combustion of the fuel, the exhaust gases first go through one of the rotating arms 340 or 345, and then turn at approximately a 90° angle before exiting the nozzle 340, 345. Applying Newton's Third Law of Motion, the engine 300 will generate radial acceleration motion which provides power to drive other devices. A rotation unit (e.g., the rotary shaft 326, the combustion chamber 330, and the arms 315a-b) may be enclosed in a drum-like compartment (e.g., housing 310) with one or more outlets or openings 355. The exhaust gases in the housing 310 can be pushed out of the housing by the fins 350 attached to the rotating arms 315a, 315b. The housing 310 may also function to suppress the noise of detonation/combustion (e.g., serve as noise quencher).

As shown in FIG. 3B, the mechanical work unit may include a turbine unit 360 located at a separate location or compartment external to the housing (e.g., a body of a jet), but that can still generate compressed air (A) to be supplied to the engine 300. The turbine unit 360 includes a turbine 362 and a compressor 364 connected to the turbine 362 via a rod or shaft 365. In some embodiments, the turbine 362 includes one or more rotary fans rotatably fixed to the rod or shaft 365, which in turn provides a spinning force that drives one or more fans, pumps or pistons in the compressor 364. The compressor 364 draws external air 370 from outside the engine, compresses the air at a relatively high pressure, and forces the compressed air through a conduit 371. Having the turbine unit 360 outside of the housing 310 eliminates the burden of the turbine/compressor pair 362, 364 being in the same housing as the engine 300 (which may be advantageous, e.g., in jet engines, where the high temperatures and lack of space can adversely affect mechanical parts therein), and provides the benefit of a compressed air supply (A) that is supplied to the combustion chamber from the turbine unit 360 via the conduit or duct 371. The net thrust in the present system may thus be increased.

FIG. 4A is a diagram showing an exemplary engine 400 according to one or more embodiments of the present invention, and FIGS. 4B-C show an exemplary fluid inlet that provides fluid to the cooling coils 450 in the engine 400 of FIG. 4A.

The exemplary engine 400 in FIG. 4A includes a detonation and/or combustion chamber 420, at least two rotating arms 415a and 415b extending from opposing sides and/or ends of the detonation and/or combustion chamber 420, and a plurality of cooling coils 450. The engine 400 has a central rotary shaft 430 extending from the center of a surface of the detonation and/or combustion chamber 420.

In various embodiments, the rotating arms 415a and 415b may have a double wall. The double wall of the rotating arm 415a includes an inner wall 417a and an outer wall 416a, and the double wall of the rotating arm 415b includes an inner wall 417b and an outer wall 416b. The arms 415a-b and/or each of the inner and outer walls 416a-b and 417a-b may be curved or rounded and may have a cylindrical or a curved tubular shape. Furthermore, the material of the inner and outer walls 417a, 417b and 416a, 416b may include a metal and/or a ceramic. Generally, the inner walls 417a, 417b extend from the detonation and/or combustion chamber 420 and may be configured to optimize cooling the corresponding rotating arm 415a, 415b. The outer walls 416a, 416b may extend from an outer surface of the detonation and/or combustion chamber 420 and may be configured to optimize an aerodynamic function of or for the corresponding rotating arm 415a, 415b.

In exemplary embodiments, a first cooling coil 450a is between the inner wall 417a and the outer walls 416a, and a second coiling coil 450b is between the inner wall 417b and the outer wall 416b. Typically, each of the cooling coils 450a-b have a surface that directly contacts an outer surface of the inner wall 417a, 417b. The cooling coils 450a-b generally wrap around the outer surface of the inner walls 417a, 417b. The coils 450a-b may contact an inner surface of the outer wall 416a, 416b. The cooling coils 450a-b may have a cylindrical shape, but are not limited thereto. In various embodiments, the cooling coils 450a-b are adjacent or approximate to the detonation and/or combustion chamber 420, so the cooling coils 450a-b may draw heat from the locations and/or regions of the rotating arms 415a, 415b that tend to have the most heat. Typically, the cooling coils 450a-b may comprise steel, aluminum, copper, or another thermally conductive metal or other material, but are not limited thereto.

In internal combustion engines, a cooling fluid (e.g., a coolant such as water or a water-ethylene glycol or water-propylene glycol mixture) is circulated. However, to generate steam (which can be used as an additional propellant), the cooling coils 450a-b may have one or more openings between the inner and outer walls 417a-b, 416a-b, respectively. In some embodiments, the openings may be at the ends of the cooling coils 450a-b at a location distal from the detonation and/or combustion chamber 420. The double wall structure of the rotating arms 415a-b utilizes the energy from the steam. For example, the cooling coils 450a-b carry the cooling fluid and then vaporize the cooling fluid. Subsequently, the cooling fluid is expelled as a vapor or gas through the nozzles 440a-b. Thus, due to phase change expansion, thermal expansion and centrifugal force, the vaporized cooling fluid (e.g., steam) rushes out of the nozzles 440a-b. As a result, the combination of thrusts from the hot/expanding combustion gases exiting an inner opening or circumference 418a-b defined by the inner wall 417a-b and from the expanding cooling fluid exiting an outer opening or circumference defined by the outer wall 416a-b may substantially increase the power of the engine 400 relative to an engine that cools and recirculates the cooling fluid.

In some embodiments, one or more monitoring instruments (e.g., a flow meter) may monitor the fluid that flows to and/or through the cooling coils. In addition, one or more control devices may control the flow rate of the cooling fluid (e.g., water). Many options may be available to optimize engine performance using different flow rate combinations of the combustion or detonation gases within the inner walls 417a-b and the cooling gases within the outer walls 416a-b.

FIGS. 4B-C show an exemplary cooling fluid inlet according to one or more embodiments of the present invention. The exemplary cooling fluid inlet 460 of FIG. 4B has a fluid inlet 431 and a fluid conduit 432. The cooling fluid inlet 460 is configured to provide the cooling coils 450a-b of FIG. 4A with fluid (e.g., water). Generally, the cooling fluid inlet 460 surrounds and/or is adjacent to a central fuel and air inlet 426 that rotates around a central axis 430 (also see axis 430 in FIG. 4A). The cooling fluid enters the fluid inlet 431 (see FIG. 4B) and exits the fluid outlet 432, providing the cooling coils 450a-b with fluid (typically through a manifold [not shown]). Typically, the fluid outlet 432 is parallel or substantially parallel to (e.g., concentric with) the central fuel and air inlet or conduit 426 that introduces fuel and air to the detonation/combustion chamber 420 (see FIG. 4A).

In addition, the cooling fluid inlet 460 may include bearings 440a-b to allow certain parts (e.g., a rotary fuel and air conduit 428 and the cooling fluid conduit 436 of FIG. 4B) to rotate, while other parts stay fixed. As shown in FIG. 4B, a spacer 429 having the same or substantially the same thickness of the fluid outlet 432 and the cooling fluid conduit 436 may be fixed to the fuel and air conduit 428 to enable bearing 440a to be identical or substantially identical to bearing 440b. Preferably, there are at least two sets of bearings 440a-b in a ring or toroid around the central fuel and air inlet or conduit 426.

FIG. 4C is a cross-section of the cooling fluid inlet 460 of FIG. 4B along the line A-A'. Generally, the cooling fluid inlet 460 surrounds the central fuel and air inlet or conduit 426. The cooling fluid outlet 432 is concentric with the central fuel and air inlet or conduit 426. Typically, the cooling fluid conduit 436 is also concentric with the central fuel and air inlet or conduit 426. Bearings 440b surround the central inlet or conduit 426 and are housed within the housing 435 of the cooling fluid inlet 460.

The present engine advantageously achieves maximum fuel efficiency and minimal generation and transportation of solid particles through the exhaust, thereby enabling an increase in or maximal use of thrust from the exhaust gases leaving the detonation and/or combustion chamber(s) and the gases or vapor leaving the rotating arms, and a reduction in pollutants introduced into the environment.

Overall, the present engine is relatively simple and inexpensive to manufacture. In addition, high-precision components may not be necessary when manufacturing the present engine. Furthermore, the present engine advantageously results in relatively high efficiency and/or improved engine performance. Alternative fuels (e.g., ammonium nitrate powder, ammonia gas, hydrazine, etc.) as well as carbon-based materials such as propane, methane, natural gas, gasoline, diesel or jet fuel, cellulose powder (wood powder or sawdust), etc., can be used in the present engine. Therefore, the present engine is environmentally friendly, and adaptable for use in the power generation industry, in vehicles, etc.

An Exemplary Rotary Device

Figure 5A:
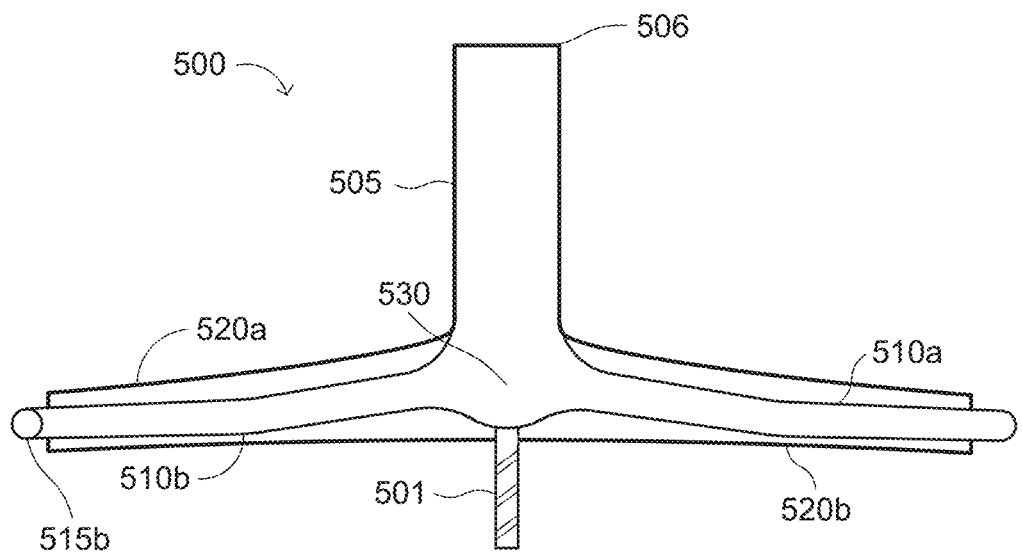
FIGS. 5A-B are diagrams showing an exemplary engine according to one or more alternative embodiments of the present invention.
Figure 5B:
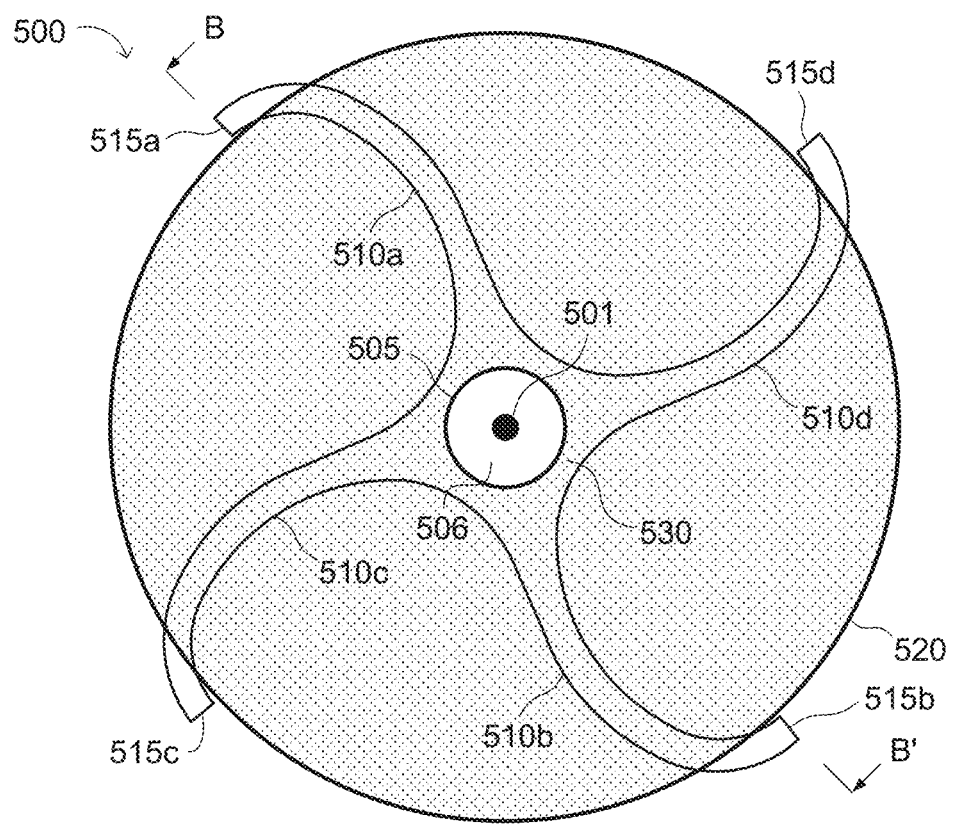

FIGS. 5A-5B show an exemplary rotary device (e.g., rotary jet) 500 according to one or more embodiments of the present invention. The rotary device 500 generally comprises a central axle or shaft 501, an inlet (e.g., a fluid inlet) 505 configured to receive at least one fluid (e.g., a flowable fluid), a plurality of radial arms (e.g., rotation arms) 510a-d extending radially from the inlet 505, and a nozzle 515a-d at a distal end of each rotating arm 510a-d. The radial arms 510a-d have an arc between the inlet 505 and the nozzle 515a-d, and the radial arms 510a-d are configured to rotate when the fluid enters the inlet 505 and passes through the arms 510a-d, or when a rotational force is applied to the central axle or shaft 501. Each rotating arm 510a-b may be curved or rounded, and may have a tubular or substantially tubular cross-section. In addition, each nozzle 515a-d has an opening that faces away from the direction of rotation of the radial arms 510a-d.

FIG. 5A is a cross-sectional view of the exemplary rotary device 500 along the line B-B' in FIG. 5B. The central axle or shaft 501 is positioned along a central axis of the rotary device 500 and thus may define a rotation axis for the radial arms 510a-d. In some embodiments, the central axle or shaft 501 extends through a lower or rear-facing surface of a manifold section 530 of the rotary device 500. In other embodiments, the central axle or shaft 501 may further extend through an opening 506 in the inlet 505.

The inlet 505 receives at least one fluid and supplies the fluid to the plurality of radial arms 510a-d through the manifold 530. In exemplary embodiments, the inlet 505, manifold 530 and arms 510a-d are unitary (e.g., one integrated piece), and the inlet 505 rotates radially around the central axle or shaft 505 along with the arms 510a-d. The inlet 505 may include a single conduit or path. The manifold 530 effectively splits the conduit or path in the inlet 505 into openings of the plurality of radial arms 510a-d. Alternatively, the inlet 505 may be fixed, and the manifold 530 and radial arms 510a-b are fixed to and rotate around the central axle or shaft 505. The central axle or shaft 501 may be joined, fastened and/or secured to the inlet 505, the manifold 530 and/or the radial arms 510a-d by conventional techniques. In addition, a funnel or other fluid-feeding and/or -capturing device (not shown) may be secured or connected to the opening 506 to the inlet 505.

FIG. 5A shows radial arms 510a and 510b that extend from the manifold 530 and that spin or rotate around the central axle or shaft 501. A fluid (e.g., water or air) is fed to the radial arms 510a-b by the manifold 530. The radial arms 510a-b may be welded and/or connected by bolts, clamps or screws to the manifold 530, or formed integrally with the manifold 530. Dimensions of the inlet 505 and the radial arms 510a-b can be optimized for a certain rotation rate, and it is within the ability of one skilled in the art to determine such dimensions (e.g., for a particular application). Preferably, the rotary device 500 has an even number of radial arms 510a-b (e.g., 2, 4, 6, 8, etc.). However, the number of radial arms 510a-b may be 3, 5, 9, or any other positive integer by which 360 can be divided to give an integer or a regular fraction. Evenly-spaced, identical radial arms (e.g., 510a-510d, FIG. 5B) may increase the efficiency and balance of the rotary device 500.

In exemplary embodiments, each rotating arm 510a-d includes a nozzle 515a-d (see, e.g., FIG. 5B). The nozzle 515a on rotating arm 510a is not shown in FIG. 5A because it faces away from the viewer (FIG. 5A is the cross-section of FIG. 5B along the B-B' line, viewing the cross-section in the direction of the arrows). The nozzles 515a-d are configured to expel the fluid and provide a rotation thrust and/or force to rotate the radial arms 510a-d around the central axle or shaft 501. In the present rotary device, the centrifugal effect of the spinning radial arms 510a-b advantageously provides additional force or velocity to the fluid rushing out of the nozzles 515a-b, further increasing the rotational thrust and/or force on the radial arms 510a-b and/or the central axle or shaft 501, and reducing the force(s) opposing entry of the fluid into the inlet 505, positively reinforcing the flow of the fluid through the device 500 by a type of "self-amplification" mechanism.

In various embodiments, the device 500 may include aerodynamic surfaces 520a-b on or over the radial arms 510a-b. The aerodynamic surfaces 520a-b are configured to reduce the air resistance of the radial arms 510a-b during rotation. The aerodynamic surfaces 520a-b may include a disc or sheet having a circular or other shape optimized for aerodynamic function(s). The aerodynamic surface 520a may be the same as or different from the aerodynamic surface 520b. For example, the aerodynamic surfaces 520a-b may have a relatively sleek or angled shape that minimizes air resistance. The discs or sheets 520a-b may be attached or connected to the manifold 530 and/or arms 510a-d and may cover the spaces between the arms 510a-d (e.g., to form a disc), or be formed integrally with the manifold 530 and/or arms 510a-d. In some embodiments, the aerodynamic surfaces 520a-b cover the entire radial arms 510a-b, including the nozzles 515a-b. In other embodiments, the aerodynamic surfaces 520a-b may cover only part of the radial arms 510a-b. Dimensions of the aerodynamic surfaces 520a-b may vary, depending on the dimensions of the radial arms 510a-b and/or the desirability of minimizing air resistance.

In exemplary embodiments, fluid is received in an opening 506 of the inlet 505. As shown in FIG. 5B, the inlet 505 is a single conduit. The fluid passes through the radial arms 510a-d and rotates the radial arms 510a-d around the central axle or shaft 501, and is expelled out the nozzles 515a-d as thrust. The curved shape of the radial arms 510a-d (e.g., from the manifold 530 to nozzle 515) reduces the counter-force or back-pressure of the radial arms 510a-d onto the fluid entering the radial arms 510a-d.

Generally, the nozzles 515a-d can have a variety of shapes, including, but not limited to, circular, oval, curved, constricted, flared, combinations thereof, etc. Each of the nozzles 515a-d may be permanently or detachably connected to a corresponding rotating arm 510a-d or formed integrally with the rotating arm 510a-d. Nozzles 515a-d may be attached to the rotating arm 510a-d by various methods, including, but not limited to, welding, shrink fitting, gluing, screwing/threading, and/or compression fitting.

Each nozzle 515a-d is configured to expel the fluid from the corresponding arm 510a-d and provide a rotation thrust and/or force to rotate the radial arms 510a-d around the central axle or shaft 501. For example, the smaller the nozzle 515a-d, the greater the force exerted on or by the fluid expelled out of the nozzle. The nozzles 515a-d may have an angle of from about 45° to about 120° relative to a line at which the corresponding rotating arm 510a-d extends from the inlet 505 and/or manifold 530 to provide the rotational thrust and/or force. The nozzles 515a-d at the distal end of each rotating arm 510a-d has an opening facing away from the direction of rotation of the radial arms 510a-d. In various embodiments, the opening or outlet of the nozzles 515a-d face or point in a direction perpendicular to an imaginary straight line between the central axle or shaft 501 and the opening of the nozzle 515a-d, thus providing the rotational thrust and/or force.

The centrifugal force from the rotational movement of the radial arms 510a-d accelerates the fluid down the arms 510a-d, which accelerates the expulsion of the fluid from the nozzles 515a-d. The fluid leaving the nozzles 515a-d functions as a propellant, which in turn causes and/or speeds up the rotational movement of the arms 510a-d around the central axle or shaft 501, increasing the amount of fluid being transported and/or energy being converted and positively reinforcing the rotational speed of the radial arms 510a-d.

When the direction of each nozzle 515a-d is perpendicular or substantially perpendicular to the corresponding rotating arm (e.g., an angle of 60-120°, and in one example, about 90°), the force acting on the rotating arm 510a-d and the rotation speed are maximized according to Newtonian mechanics. The centrifugal force from the rotational movement accelerates the fluid down the arms 510a-d, which accelerates the expulsion of fluid, which acts as a propellant. The centrifugal force on the fluid/propellant increases as the rotation speed increases, which in turn increases the rotational force/thrust and the amount of fluid being transported and/or energy being converted. As the rotational thrust and/or force increases, the rotation speed of the radial arms 510a-d also increases. This is a self-amplifying, controllable chain reaction (or positive reinforcement) that enables the thrust to reach supersonic speeds and many times beyond, without the burden of excess fuel consumption and/or expensive mechanical parts. As a result, the fluid exiting the nozzles 515a-b has considerable dynamic energy. However, a limit to the chain reaction and/or positive reinforcement may be reached when the fluid in the inlet 505 exerts a positive back-force on the fluid proximate to the inlet 505, but not yet in the device 500, although even then, the chain reaction or positive reinforcement functions to reduce the forces that oppose rotation of the radial arms 510a-d.

Figure 6A:
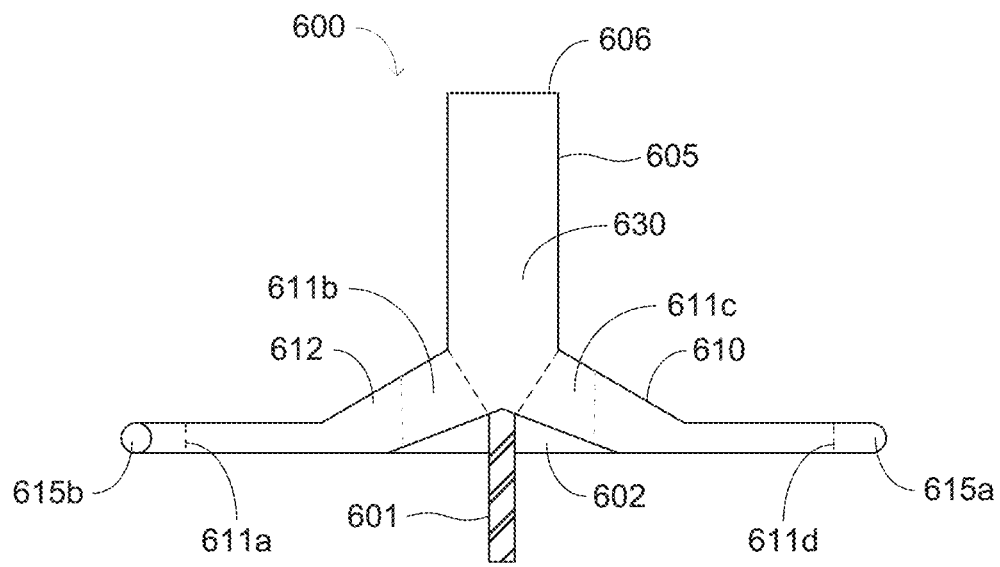
FIGS. 6A-B are diagrams showing an exemplary rotary device according to one or more embodiments of the present invention.

FIG. 6A shows a cross-sectional view of an exemplary rotary device (e.g., rotary or cyclone jet) 600 according to one or more embodiments of the present invention. The rotary device 600 generally comprises a central axle or shaft 601, an inlet (e.g., a fluid inlet or straight round pipe) 605 configured to receive at least one fluid (e.g., a flowable fluid), a rotary disc 610 that extends radially from the inlet 605, and nozzles 615a-b at a distal end or edge of the rotary disc 610. The inlet 605 includes a round hole or opening 606 at a top center of the inlet 605 and extends to the center of the disc 610 to enable rotation of the disc 610. Fluid is dispersed into a hollow space 612 in the disc 610, then the fluid moves to the distal end or edge of the disc 610 due to rotational force, and is expelled through the nozzles 615a-b. The nozzles 615a-b may be evenly distributed around the circumference of the disc 610 and may be positioned perpendicular to the radius of the disc 610 so that the thrust from the fluid causes rotation of the disc in a direction opposite the thrust. As a result of this thrust, the device 600 rotates and/or starts spinning.

The radial disc 610 may be joined to the inlet 605 by a flared (e.g., a conical or bell-shaped) section. The radial disc 610 is configured to rotate when the fluid enters the inlet 605 and passes through the nozzles 615a-b, or when a rotational force is applied to the central axle or shaft 601. In addition, each nozzle 615a-d (FIG. 6B) has an opening that faces away from the direction of rotation of the radial disc 610.

In various embodiments, the rotary disc 610 may include a depression or indentation 602 therein. As shown in FIG. 6A, the depression or indentation 602 surrounds the central axle or shaft 601 between the central axle or shaft 601 and the inlet 605. The depression or indentation 602 may reduce the amount of fluid in the rotary disc 610 and/or facilitate fluid flow through the rotary disc 610, either or both of which may increase the thrust or rotational force of the rotary jet 600.

Figure 6B:
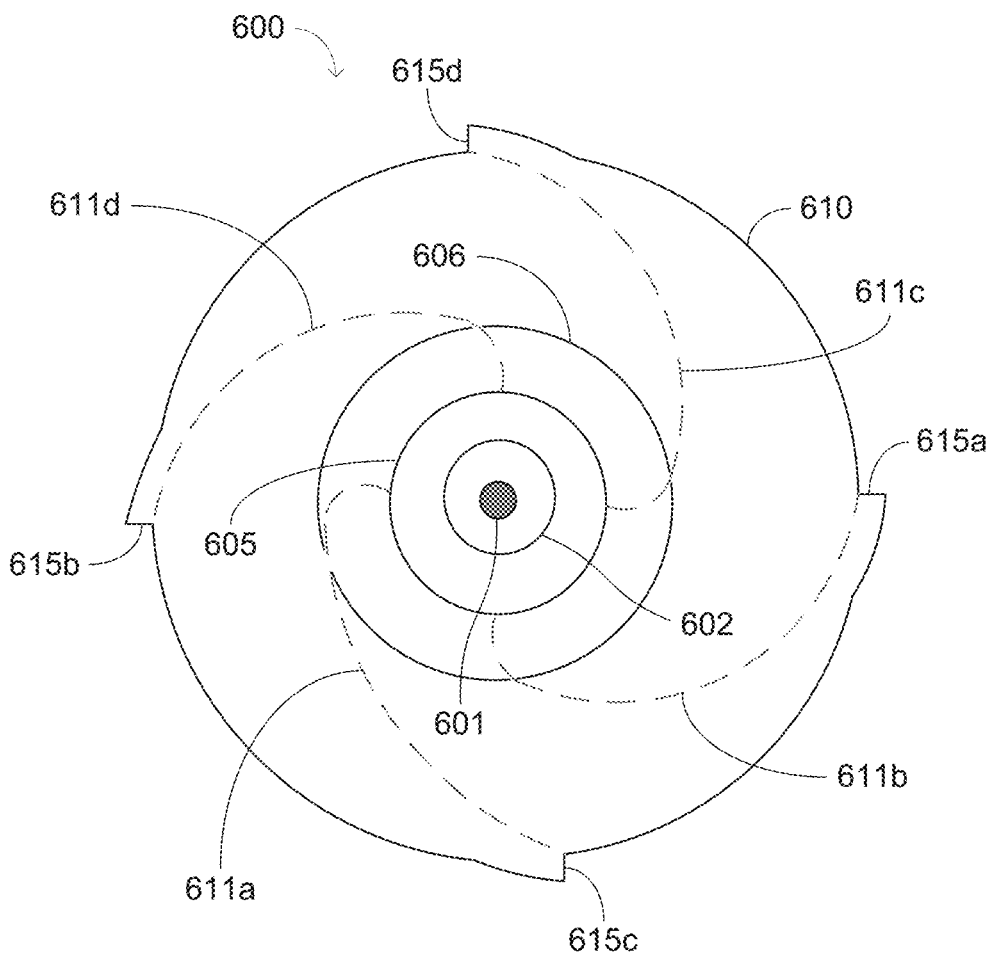

FIG. 6B is a cross-sectional view of the exemplary rotary jet 600. The central axle or shaft 601 is positioned along a central axis of the rotary jet 600 and thus may define a rotation axis of the rotary disc 610. In some embodiments, the central axle or shaft 601 extends through a lower or rear-facing surface of a manifold 630 of the rotary jet 600. In other embodiments, the central axle or shaft 601 may extend through an opening 606 in the inlet 605. In further embodiments, the central axle or shaft 601 extends through both the opening 606 and the manifold 630.

The inlet 605 receives at least one fluid and supplies the fluid to the radial disc 610 through the manifold 630. In exemplary embodiments, the inlet 605, manifold 630 and disc 610 are unitary (e.g., one integrated piece), and the inlet 605 rotates radially around the central axle or shaft 605 along with the disc 610. The inlet 605 may include a single conduit or path. Alternatively, the inlet 605 may be fixed, and the manifold 630 and radial disc 610 are fixed to and rotate around the central axle or shaft 605. In such a case, the manifold 630 and radial disc 610 may be sealingly joined to the inlet 605 using a bearing (not shown). The central axle or shaft 601 may be joined, fastened and/or secured to the inlet 605, the manifold 630 and/or the radial disc 610 by conventional techniques.

A fluid (e.g., water or air) is funneled through the radial disc 610 by the manifold 630. The radial disc 610 may be welded and/or connected by bolts, clamps or screws to the manifold 630, or formed integrally with the manifold 630. Dimensions of the inlet 605 and the radial disc 610 can be optimized for a certain rotation rate, and it is within the ability of one skilled in the art to determine such dimensions (e.g., for a particular application). A set of vertical dividers 611a-d may be included in the rotary disc 610 to guide the fluid flow. The dividers 611a-d may comprise a straight or curved plate or baffle extending from the inlet 605 or manifold 630 to the circumference of the radial disc 610 (e.g., along a radius of the radial disc 610). In addition, such dividers 611a-d may be applied to other devices (e.g., the rotary devices of FIGS. 11 and 16-19).

The nozzles 615a-d are configured to expel the fluid and provide a rotational thrust and/or force to rotate the radial disc 610 around the central axle or shaft 601. In the present rotary jet 600, the centrifugal effect of the spinning radial disc 610 advantageously provides additional force or velocity to the fluid rushing out of the nozzles 615a-d, further increasing the rotational thrust and/or force provided by the radial disc 610 and/or the central axle or shaft 601, and reducing the force(s) opposing entry of the fluid into the inlet 605, positively reinforcing the flow of the fluid through the device 600 by a "self-amplification" mechanism.

Figure 7A:
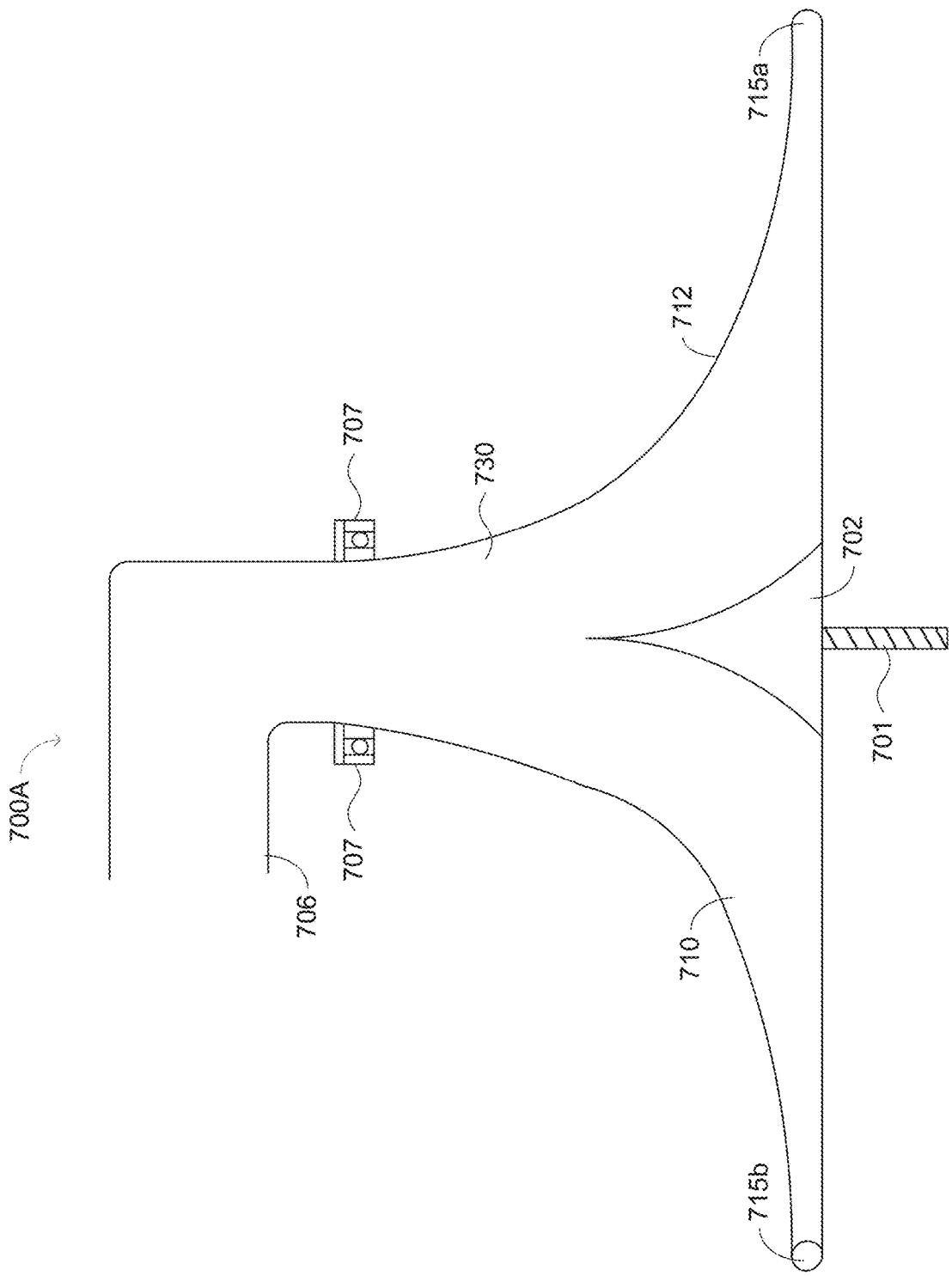

Similar to the device 600 of FIG. 6A, FIG. 7A shows a device 700A that generally comprises a central axle or shaft 701, an inlet (e.g., a fluid inlet or straight round pipe) 706 configured to receive at least one fluid (e.g., air or water), a rotary disc 710 that extends radially from the inlet 706, and nozzles 715a-b at a distal edge of the rotary disc 710. The axle or shaft 701 extends into and is joined to the disc 710 and optionally to the manifold 730, as discussed above. In addition, the rotary disc 710 may have an aerodynamic (e.g., flared, bell-shaped or conical) surface 712 as shown in FIG. 7A. The rotary disc 710 may also include a depression or indentation 702 therein. The surface 712 and the depression or indentation 702 may be curved, so the rotary disc 710 may be configured to reduce resistance, friction and/or turbulence of the fluid flow.

In various embodiments, the inlet 706 may be angled. For example, the inlet 706 may have an arc or angle of from 90° to 180°, depending on the application of the device 700A. Furthermore, the device 700A may include a bearing 707 and a joint or fitting (not shown) between the stationary inlet 706 and the rotating manifold 730. As shown, in FIG. 7A, at least two nozzles 715a-b are at the edge 712 of the disc 710. In general, the device may have an even number of nozzles 715a-b (e.g., 2, 4, 6, 8, etc.). However, the number of nozzles 715a-b may be 3, 5, 9, or any other positive integer by which 360 can be divided to give an integer or a regular fraction. Evenly-spaced, identical nozzles (e.g., 715a-b) may increase the efficiency and balance of the device 700A. In various embodiments, the nozzles 715a-b can have any of a variety of shapes, including, but not limited to, circular, oval, curved, constricted, flared, combinations thereof, etc., as discussed above. The nozzles 715a-b may also represent or be in the form of an augmenter, which may have an annular, concentric, or ring-like shape, as discussed herein. Fluid is expelled out of the nozzles 715a-b, which causes rotation of the disc in the opposite direction and creates a rotational force.

FIG. 7B shows a cross-sectional of a rotary pulse detonation engine 700B similar to the rotary device 700A of FIG. 7A, but further having a detonation and/or combustion chamber 750 configured to boost power generation (e.g., in aviation application). Similar to the device 700A of FIG. 7A, the device 700B generally comprises a central axle or shaft 701, an inlet (e.g., a fuel inlet) 751 configured to receive fuel, a rotating manifold 730, a rotary disc 710 that extends radially from manifold 730 and nozzles 715a-b at a distal edge of the rotary disc 710. Fuel is provided to the combustion chamber 750 by the fuel inlet 751. In addition, the rotary engine 700B may have an inlet 740 for introducing compressed air or other oxygen-containing gas. There may be a valve between the inlet 740 and the detonation and/or combustion chamber 750 in the rotary pulse detonation engine 700B that opens to enable compressed air or other gas to enter the detonation and/or combustion chamber 750 when it is not detonating or combusting the fuel and closes to prevent the detonating/combusting fuel and expanding compressed air/gas from entering the inlet 740 during detonation and/or combustion of the fuel. Furthermore, the device 700B may include a bearing 707 and a joint or fitting (not shown) between the stationary inlet 740 and the rotating manifold 730, as discussed above.

A comparison between the present rotary device/engine and a conventional turbine is presented in the table below:

| Present Device/Engine | Conventional Turbine |
|---|---|
| Principles: | Principles: |
| Centrifugal force | Reaction Force |
| Action | Impulse |
| Reaction | Combination |
| Combination | |
| $M \times W^2 \times r$ (Powerful) | Power generated depends on the input |
| Mass × (rotation speed)$^2$ × radius | Kinetic energy + heat → rotation force + thrust force |
| Simple design | Components require precision manufacturing and system operation requires highly trained personal |
| Easy manufacture | |
| Low cost | |
| Light weight | |
| It may perform as a "multiplier" | |

To increase energy and power generation, devices may use a spinning tool or motion. In the present rotary device (e.g., a rotary jet), a rotary disc may perform as a multiplier, and may enhance or multiply the amount of energy and power generation by 3-4 times or more.

Key principles and/or forces that may be involved in determining the energy transferred by the present rotary jet include (1) the angular kinetic energy, (2) the moment of inertia, (3) torque, (4) Bernoulli's principle, and (5) centrifugal force. Key forces that adversely affect energy transfer using the present rotary device may include the aerodynamic drag force, friction, and centripetal force. In a rotation environment, a centrifugal field is self-created with the center of rotation having the highest potential. Particles in the rotation environment will move upon application of centrifugal force and gain kinetic energy under its influence. As a comparison, objects on the planet Earth are in a gravitational field, an object released from a high point will gain kinetic energy and accelerate down to the face of earth. When the particles exit out of the rotation system and the centrifugal field, the particle reaches its highest speed, which is contrary to the conventional water turbine, where exhaust water has less kinetic energy than that of the water entering the turbine. In the present rotary device, the nozzles may point in a direction perpendicular to an imaginary line to the center of rotation. The rotational speed may increase based on Newton's laws of motion. The next particles entering the inlet may be influenced by a stronger centrifugal field as the rotational speed increases, and gain a higher speed than the earlier particles. This is considered to be a self-amplifying effect and chain reaction. However, negative forces also increase as the rotation speed increases, until a balance point and speed are reached.

FIG. 8 shows a cross-sectional view of an exemplary rotary device 800. A sample trajectory 860 of the fluid flow as result of centrifugal force in a rotating device 800 is shown. The trajectory 860 of fluid flows in an arc from the center 801 of the rotating disc 800 (e.g., from an inlet), moving to a distal edge or surface 820 of the rotating disc 800, and being expelled out the nozzles 815*a-d*. As a result, the rotating disc 800 spins in a direction opposite from the direction of the expelled fluid.

Another Exemplary Rotary Device

FIG. 9 is a diagram showing another exemplary rotary device 900 according to one or more further embodiments of the present invention. Similar to the rotary device 400 of FIGS. 4A-B, the rotary device 900 generally comprises a central axle or shaft 920, an inlet (e.g., a fluid inlet) 921 configured to receive at least one fluid (e.g., a flowable fluid), a plurality of radial arms (e.g., rotating arms) 915*a-d* extending radially from the inlet 921, and nozzles 916*a-d* at distal ends of the rotating arms 915*a-d*. The rotary device 900 further includes a wheel or cylinder 912 and a plurality of buckets or cups 910 thereon. The radial arms 915*a-d* have an arc between the inlet 921 and the nozzles 916*a-d*, and the radial arms 915*a-d* are configured to rotate when the fluid enters the inlet 921 and passes through the arms 915*a-d*, or when a rotational force is applied to the central axle or shaft 920. Similar to the rotating arms 415*a-d*, each rotating arm 915*a-d* may be curved or rounded, and may have a tubular or substantially tubular cross-section. In addition, each nozzle 916*a-d* has an opening that faces away from the direction of rotation of the radial arms 915*a-d*.

In exemplary embodiments, the plurality of buckets or cups 910 are on an inner circumference of the wheel or cylinder 912. The plurality of buckets or cups 910 are configured to receive the fluid expelled from the nozzles 916*a-d*, capturing at least some of the kinetic energy from the fluid that is expelled out of the nozzles 916*a-d*. During operation, all the nozzles 916*a-d* expel fluid (e.g., air or water) simultaneously during the entire 360° of rotation, and therefore provide an effective mechanism to enhance the transfer or capture of kinetic and/or mechanical energy from the rotary device 900.

In various embodiments of the present invention, the buckets or cups 910 may be welded to the wheel 912 or connected by bolts, clamps and/or brackets. Alternatively, the buckets or cups 910 may be enclosed within a sub-housing (not shown), or may be integral with the wheel 912. In some embodiments, there may be an even number of buckets or cups 910 to provide balance and stability to the wheel. However, the number of buckets or cups 910 may be an odd number or any positive integer by which 360 can be divided to give an integer or a regular fraction. Generally, the buckets or cups 910 are evenly-spaced. As shown in FIG. 9, twenty (20) buckets or cups 910 may be evenly spaced on the inner circumference wheel of the wheel 912 to provide balance and stability to the wheel 912. However, another number of buckets or cups 910 may be present (e.g., a positive integer by which 360 can be divided to give an integer or a regular fraction). Generally, the buckets or cups 910 may have an opening at a location and/or angle configured to receive a maximum amount of fluid expelled from the nozzles 916*a-d* that is directed at the buckets or cups 910.

The center of the wheel 912 is also the center of the rotary device 900. However, the rotation direction for the device 900 and the rotation direction of the wheel 912 are opposite to each other. As a result, the device 900 and the wheel 912 cannot share a common axis. Thus, for example, the central axle or shaft 920 rotates with the radial arms 915*a-d*, and a second axle or shaft (not shown) is rotated by the wheel 912.

Typically, the circumference of the wheel 912 is large enough to allow the radial arms 915*a-d* to fit inside the wheel 912 and rotate. The material of wheel 910 may include a metal such as steel, aluminum, or copper, a plastic, a ceramic, wood, a combination thereof, etc. As shown in FIG. 9, the wheel 910 is circular. However, the wheel 910 may be cylindrical, elliptical, or another shape in accordance with the design criteria for a given application.

Figure 10A:
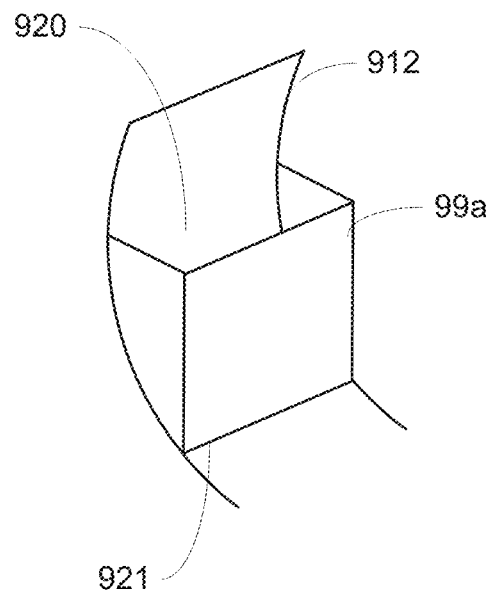
FIGS. 10A-B are diagrams showing exemplary buckets on the rotating wheel of the exemplary rotary devices of FIGS. 8 and 9 according to one or more embodiments of the present invention.

FIG. 10A shows a first exemplary bucket or cup 910*a* on a portion of the wheel 912. The bucket or cup 910*a* may have an opening 920 to receive the fluid. As shown in FIG. 10A, the bucket or cup 910*a* may have a polygonal shape, in which the lowermost surface or edge 921 directly contacts the wheel 912. The bucket or cup 910*a* may be welded and/or or sealed to the wheel 912 to sufficiently receive the flow of the fluid from the nozzles of the radial arms 910*a-d* or rotary disc 920 (FIG. 9 or 10, respectively) or otherwise capture, hold and/or carry the fluid.

Figure 10B:
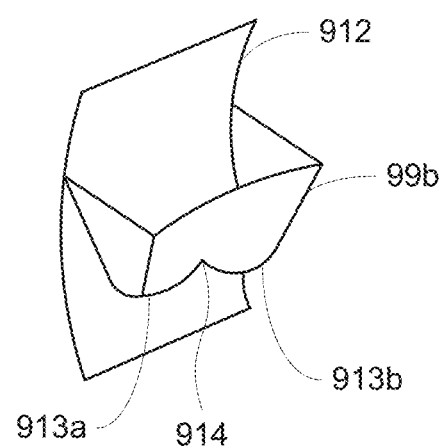

FIG. 10B shows a second exemplary bucket or cup 910*b* on a portion of the wheel 912. Typically, the material of the bucket or cup 910*b* may be the same as or different from that of the wheel (e.g., a metal such as steel, aluminum or copper, a plastic, a ceramic, a combination thereof, etc.). The buckets or cups 910*a-b* of FIGS. 10A-B may be secured to the inner circumference of the wheel 912 by welding, gluing/adhering, clasping, joining, inserting into a bracket, etc. Alternatively, the buckets or cups 910*a-b* may have a back surface matched with or mated to the inner surface of the wheel 912 and may be secured by gluing or adhering thereto. Generally, the back surface may be rectangular. In the embodiment of FIG. 10B, the bucket 910*b* may have at least two curved surfaces 913*a-b* at a bottom thereof and an apex 914 between the curved surfaces 913*a-b*. However, the bottom surface(s) of the bucket or cup 910*b* may have other shapes, including but not limited to a curved, cylindrical, oval, rectangular, square, or other polygonal shape.

Figure 11:
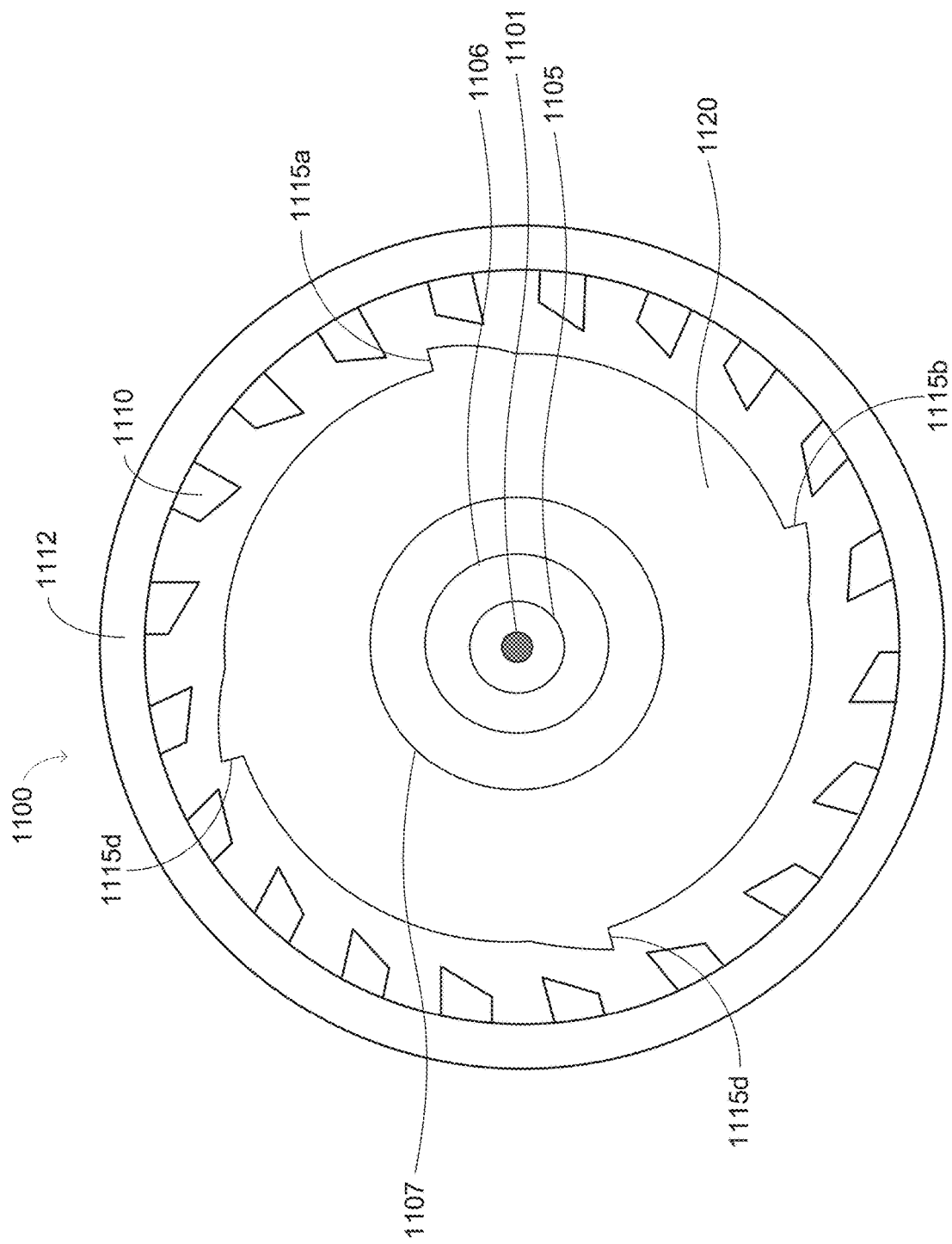
FIG. 11 is a diagram showing another exemplary rotary device according to one or more embodiments of the present invention.

FIG. 11 is a diagram showing another exemplary rotary device 1100 according to one or more further embodiments of the present invention. Similar to the rotary device 900 of FIGS. 9A-B, the rotary device 1100 generally comprises a central axle or shaft 1101, an inlet (e.g., a fluid inlet) 1106 configured to receive at least one fluid (e.g., a flowable fluid), and a rotary disc 1120 having nozzles 1115*a-d* at a distal end or edge thereof. In addition, the device 1100 of FIG. 11 comprises a wheel or cylinder 1112 and a plurality of buckets or cups 1110 thereon. The rotary disc 1120 is configured to rotate when the fluid enters the inlet 1106 and passes through the nozzles 1115*a-d*, or when a rotational force is applied to the central axle or shaft 1101. The inlet 1106 includes a round hole or opening 1105 to enable fluid to enter the rotary disc 1120. Fluid is dispersed into a hollow space 1107 in the disc 1120, then the fluid moves to the distal end or edge of the disc 1120 and is expelled through the nozzles 1115*a-d*. When the rotary disc 1120 is rotating, the fluid may flow to the distal end or edge of the disc 1120 at a faster rate due to centrifugal force being applied to the fluid. Similar to the rotary disc 610 of FIGS. 6A-B, the rotary disc 1120 may be circular and may have an indentation or depression in an underside thereof.

Each nozzle 1115*a-d* has an opening that faces away from the direction of rotation of the rotary disc 1120. The combination of the wheel 1112 (which may be the same as or substantially similar to the wheel 912 of FIG. 9) and the rotary disc 1120 as shown in FIG. 11 may have additional benefits for power generation.

In exemplary embodiments, similar to FIG. 9, the plurality of buckets or cups 1110 are on an inner circumference of the wheel or cylinder 1112. The plurality of buckets or cups 1110 are configured to receive the fluid expelled from the nozzles 1115*a-d*, capturing at least some of the kinetic energy from the fluid that is expelled out of the nozzles 1115*a-d*. During operation, all of the nozzles 1115*a-d* expel fluid (e.g., air or water) simultaneously during the entire 360° of rotation, and therefore provide an effective mechanism to enhance the transfer or capture of kinetic and/or mechanical energy from the rotary device 1100.

The buckets or cups 1110 of FIG. 11 may be attached to or formed on the wheel 1112, as discussed above in FIG. 9. Similarly, the number and spacing of buckets or cups 1110 provides balance and stability to the wheel 1112, as previously discussed. Generally, the buckets or cups 1110 may have an opening at a location and/or angle configured to receive a maximum amount of fluid expelled from the nozzles 1115*a-d* that is directed at the buckets or cups 1110, as previously discussed.

The center of the wheel 1112 is also the center of the rotary disc 1120. However, the rotation direction for the rotary disc 1120 and the rotation direction of the wheel 1112 are opposite to each other. As a result, the rotary disc 1120 and the wheel 1112 cannot share a common axis. Thus, for example, the central axle or shaft 1101 rotates with the rotary disc 1120, and a second axle or shaft (not shown) is rotated by the wheel 1112 (e.g., as shown in FIG. 12).

As discussed above in FIG. 9, the circumference of the wheel 1112 is large enough to allow the rotary disc 1120 to fit inside the wheel 1112 and rotate. The wheel 1112 is substantially the same or similar to the wheel 912 of FIG. 9.

Figure 12:
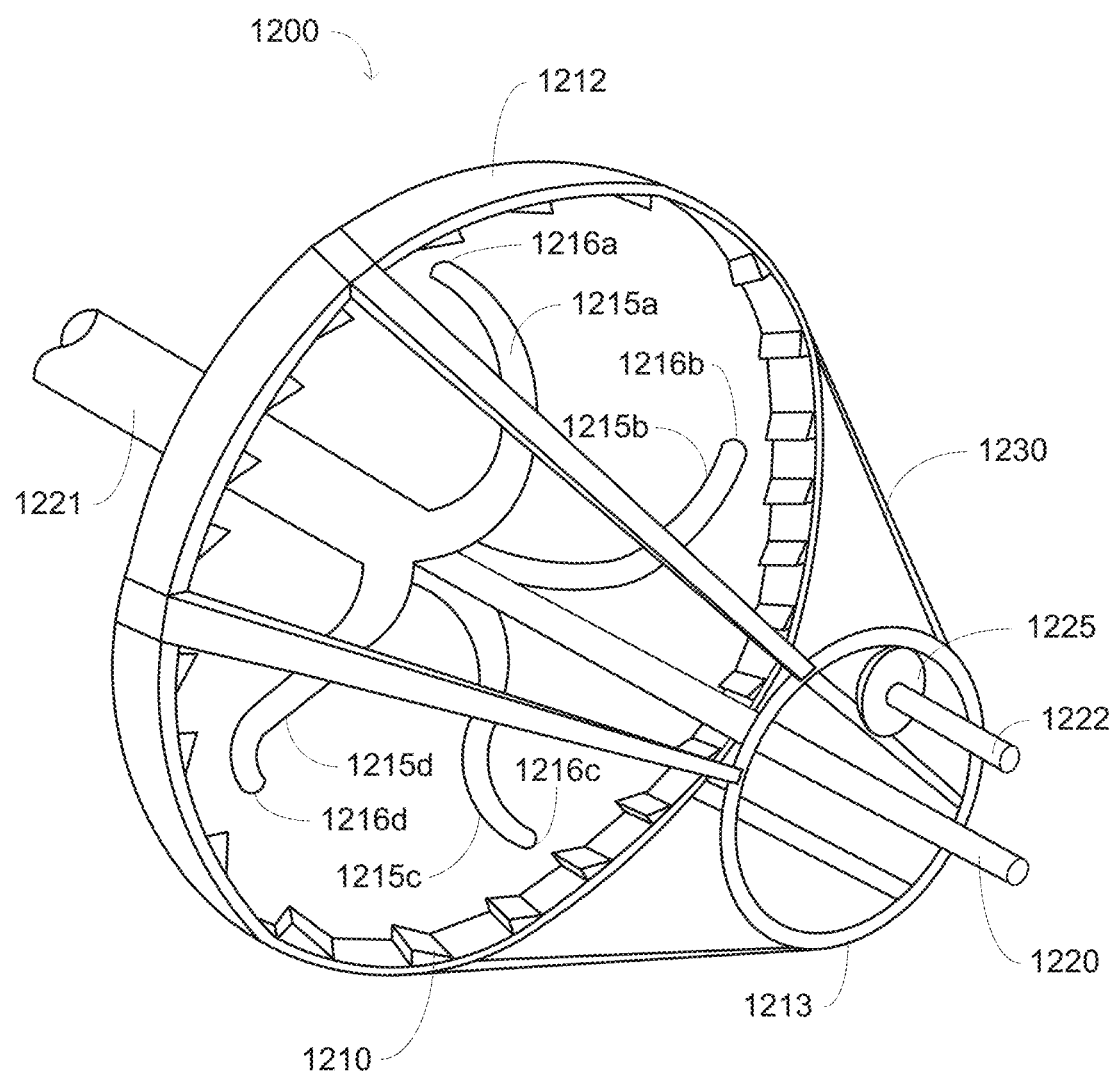
FIG. 12 is a perspective view of an exemplary rotary device having a support rim according to one or more embodiments of the present invention.

FIG. 12 is a diagram showing another exemplary rotary device 1200 according to one or more embodiments of the present invention. Similar to the rotary device 900 of FIG. 9, the rotary device 1200 generally comprises a central axle or shaft 1220, an inlet (e.g., a fluid inlet) 1221 configured to receive at least one fluid (e.g., a flowable fluid), a plurality of radial arms (e.g., rotating arms) 1215*a-d* extending radially from the inlet 1221, nozzles (not shown) at a distal end of each radial arm 1215*a-d* or rotary disc (not shown), and a plurality of buckets or cups 1210 on a wheel or cylinder 1212. In addition, the rotary device 1200 of FIG. 12 may include a circular or support rim 1213 that may support the wheel 1212. The support rim 1213 may be attached to the wheel 1212 by support brackets or ribs 1230. Furthermore, the rotary device 1200 of FIG. 12 may include a gear 1225 inside the rim 1213 to which a second axle or shaft 1222 is connected.

As shown in FIG. 12, there are six support brackets or ribs 1230. Preferably, the rotary device 1200 has an even number of support brackets or ribs 1230 (e.g., 2, 4, 6, 8, etc.). However, the number of support brackets or ribs 1230 may be 3, 5, 9, or any other positive integer by which 360 can be divided to give an integer or a regular fraction. Evenly-spaced, identical support brackets or ribs 1230 may increase the efficiency and improve the stability of the rotary device 1200.

Rotation of the wheel 1212 rotates the support rim 1213 in the same direction as the wheel 1212. The gear 1225 transfers the rotational force from the wheel 1212 and the support rim 1213 to the second axle or shaft 1225. To change the rotation direction of the axle or shaft 1222, the gear 1225 may be on the outside of the support rim 1213. In the latter embodiment, the support ribs or brackets 1230 may connect to the inner surface of the support rim 1213. Alternatively or additionally, the support rim 1213 may have a greater diameter than that of the wheel 1212.

As shown in FIG. 12, the radial arms 1215*a-d* have an arc between the inlet 1221 and the nozzles 1216*a-d*, and the radial arms 1215*a-d* are configured to rotate when the fluid enters the inlet 1221 and passes through the arms 1215*a-d*, or when a rotational force is applied to the central axle or shaft 1220. Each rotating arm 1215*a-d* may be curved or rounded and may have a tubular or substantially tubular cross-section. In addition, each nozzle 1216*a-d* has an opening that faces away from the direction of rotation of the radial arms 1215*a-d*.

In exemplary embodiments of the present invention, the plurality of buckets or cups 1210 are on an inner circumference of the wheel or cylinder 1212. The plurality of buckets or cups 1210 are configured to receive the fluid expelled from the nozzles 1216*a-d*.

As shown in FIG. 1212, the central axle or shaft 1220 is at the center of the wheel 1212, which is also the center of the rotary device 1200. However, the rotation direction for the device and the rotation direction of the wheel 1212 are opposite to each other and cannot share a common axis. For example, the central axle or shaft 1220 rotates the radial arms (or vice versa), and a second axle or shaft 1222 is rotated by the wheel 1212 using the rim 1213 and the gear 1225.

Figure 13:
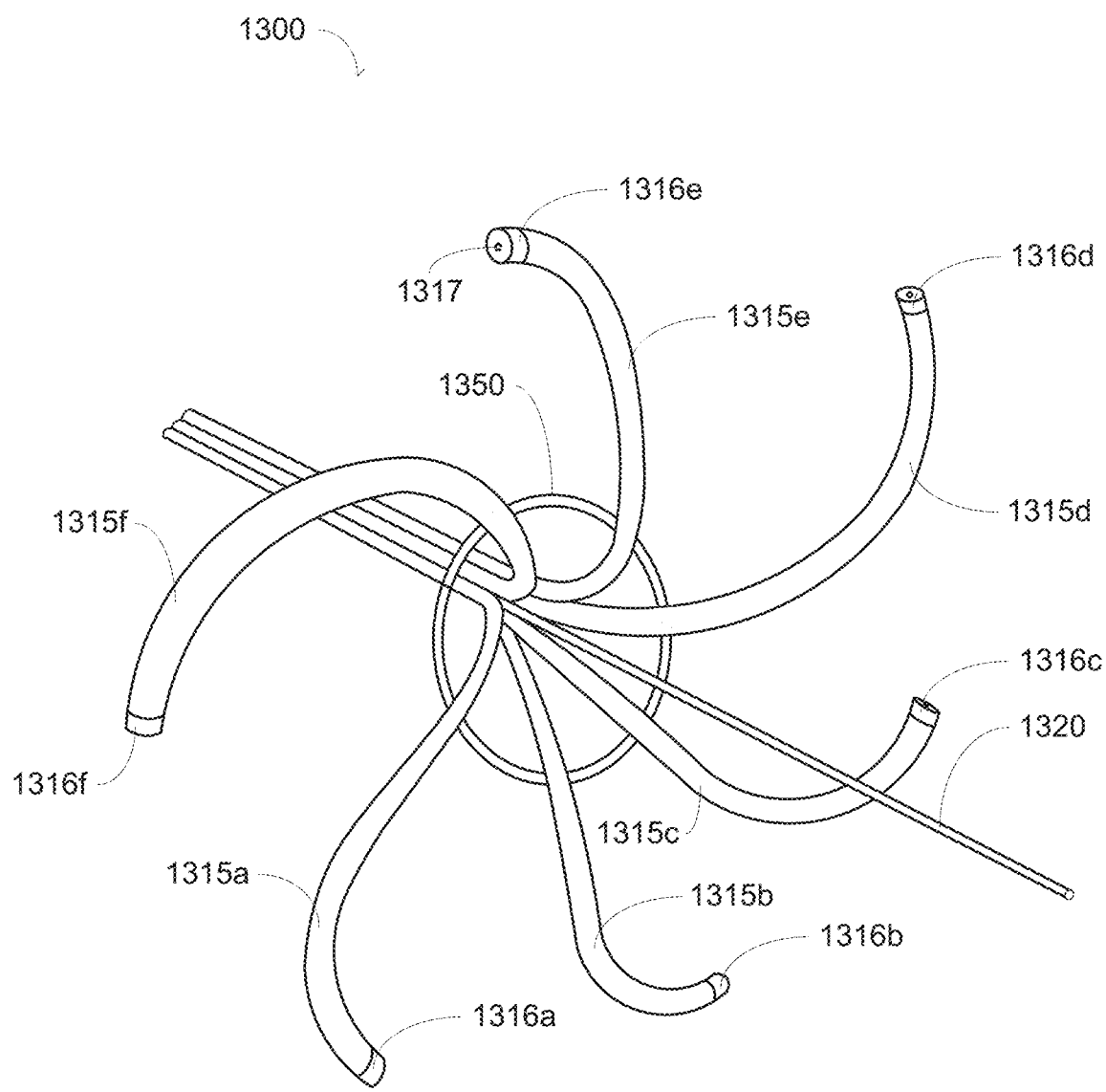
FIG. 13 is a diagram of yet another rotary device according to one or more embodiments of the present invention.

FIG. 13 is a diagram showing a further exemplary rotary device 1300 according to one or more embodiments of the present invention. Similar to the device 500 of FIGS. 5A-B and the rotary device 1300 generally comprises a central axle or shaft 1320, an inlet (e.g., a fluid inlet; not shown) configured to receive at least one fluid (e.g., a flowable fluid), a plurality of radial arms (e.g., rotation arms) 1315*a-f* extending radially from the inlet 1320, and nozzles 1316*a-f* at a distal end of the rotating arms 1315*a-f*. Nozzles 1316*a-f* may have an opening 1317, configured to expel fluid from the radial arms 1315*a-f*. In addition, the engine of FIG. 13 may include an alternative circular or support rim 1350 that may support the radial arms 1315*a-f*.

Figure 14:
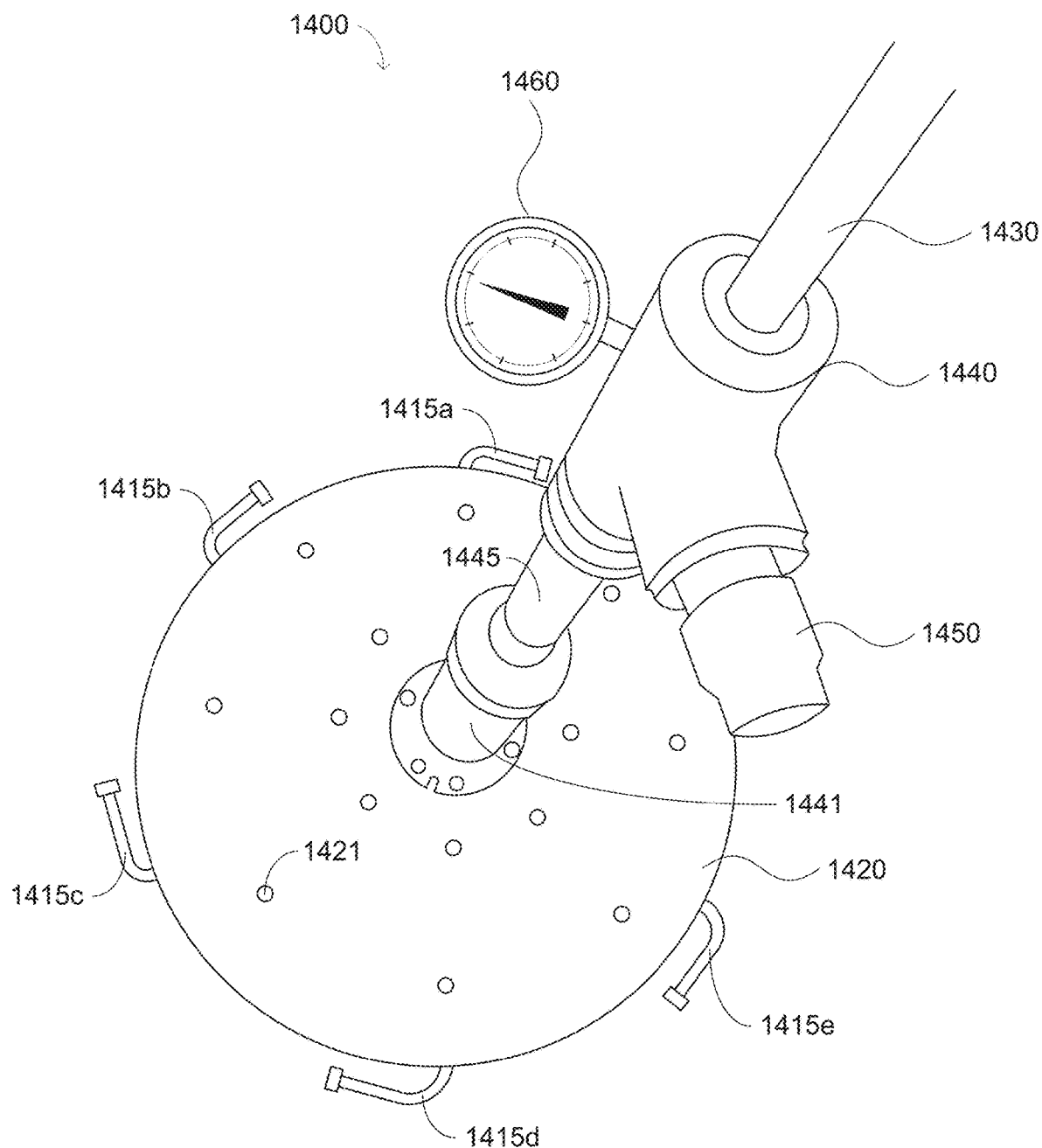
FIGS. 14-15 are drawings depicting a prototype of the present rotary device according to one or more embodiments of the present invention.

FIG. 14 is a drawing depicting a prototype 1400 of the present rotary device. The rotary device 1400 (e.g., a "rotary jet") includes a central axle or shaft 1430, an inlet 1441 configured to receive at least one fluid (e.g., water), a rotary disc 1420 having nozzles 1415*a-e* at the distal end or edge (e.g., along the circumference) thereof, a T-connector 1440, a hose 1450 and a gauge 1460. The rotary jet 1400 may also have a pipe or tube 1445 that houses the central axle or shaft 1430 and allows water to flow from the T-connector 1440 to the inlet 1441. The rotary disc 1420 is configured to rotate when the fluid enters the inlet 1441 and passes through the rotary disc 1420, or when a rotational force is applied to the central axle or shaft 1430. Similar to the rotary disc 610 of FIGS. 6A-B, the rotary disc 1420 may be circular and have a hollow space between upper and lower plates. However, the rotary disc 1420 may be cylindrical, elliptical, or another shape in accordance with the design criteria for a given application.

As shown in FIG. 14, the rotary disc 1420 may have two plates or discs separated by a space for the fluid to flow. The diameter of the plates or discs may be from about 10 inches (25 cm) to about 50 inches (125 cm), although other dimensions are also suitable. For example, the plates or discs in the prototype 1400 have a diameter of 32 inches (81.3 cm). The rotary disc 1420 may include two aluminum discs having a space or opening therebetween. The space or opening between the discs in FIG. 14 may be about one inch (2.5 cm). However, the distance between the discs 1420 may vary from 0.5 cm to 30 cm or more, depending on the application of the device. The discs in the rotary disc 1420 in FIG. 14 are welded to a ring at the circumference, and a number of bolt-and-nut fasteners 1421 further secure the plates of the disc 1420 together. In the absence of the bolt-and-nut fasteners 1421, the aluminum discs may bulge due to the pressure of the fluid (e.g., water) in the rotary disc 1420. However, when the fluid is a gas (e.g., air) or the discs are made of steel or another metal with a tensile strength higher than that of aluminum, the bolt-and-nut fasteners 1421 may not be necessary. Alternatively, if the rotary disc 1420 comprises a thermoplastic or thermoset polymer, the discs may be fastened to each other by complementary snap-type or interlocking fittings, or integral column-, disc- or rod-like connections may be formed by injection molding.

The inlet 1441 connects to the top of the rotary disc 1420 at the center, and a plurality of nozzles 1415*a-e* are located at the edge or along the circumference of the rotary disc 1420. Although there are 5 nozzles 1415*a-e* shown in FIG. 14 (a sixth nozzle is hidden behind the hose 1450), any number of nozzles may be present. The nozzles are generally evenly spaced (e.g., 360°/n apart, where n equals the number of nozzles), as discussed above. The exemplary rotary device 1400 may be powered using fluid (e.g., water) from a fluid source (e.g., a storage tank, a river, a waterfall, or from behind a dam) at a location higher than the present device. Alternatively, the fluid source may be located below the present device or at any remote location, in which case the fluid may be pumped or otherwise transported or delivered to the present device.

The prototype 1400 of FIG. 14 weighs 20 kg and is operated at ambient temperature. The fluid may be channeled through the inlet 1440-1441 (e.g., a 2-inch or 5-cm inlet). The material for the inlet 1440-1441 may include polyvinyl chloride (PVC) pipes, although other materials (e.g., polycarbonate, aluminum, or steel pipes) and other dimensions are acceptable. The gauge 1460 (e.g., a pressure gauge) may be connected to the inlet 1440. At 10 psi of pressure at the inlet 1440, the rotary disc 1420 stably rotated at a rate of 280 rpm.

Figure 15:
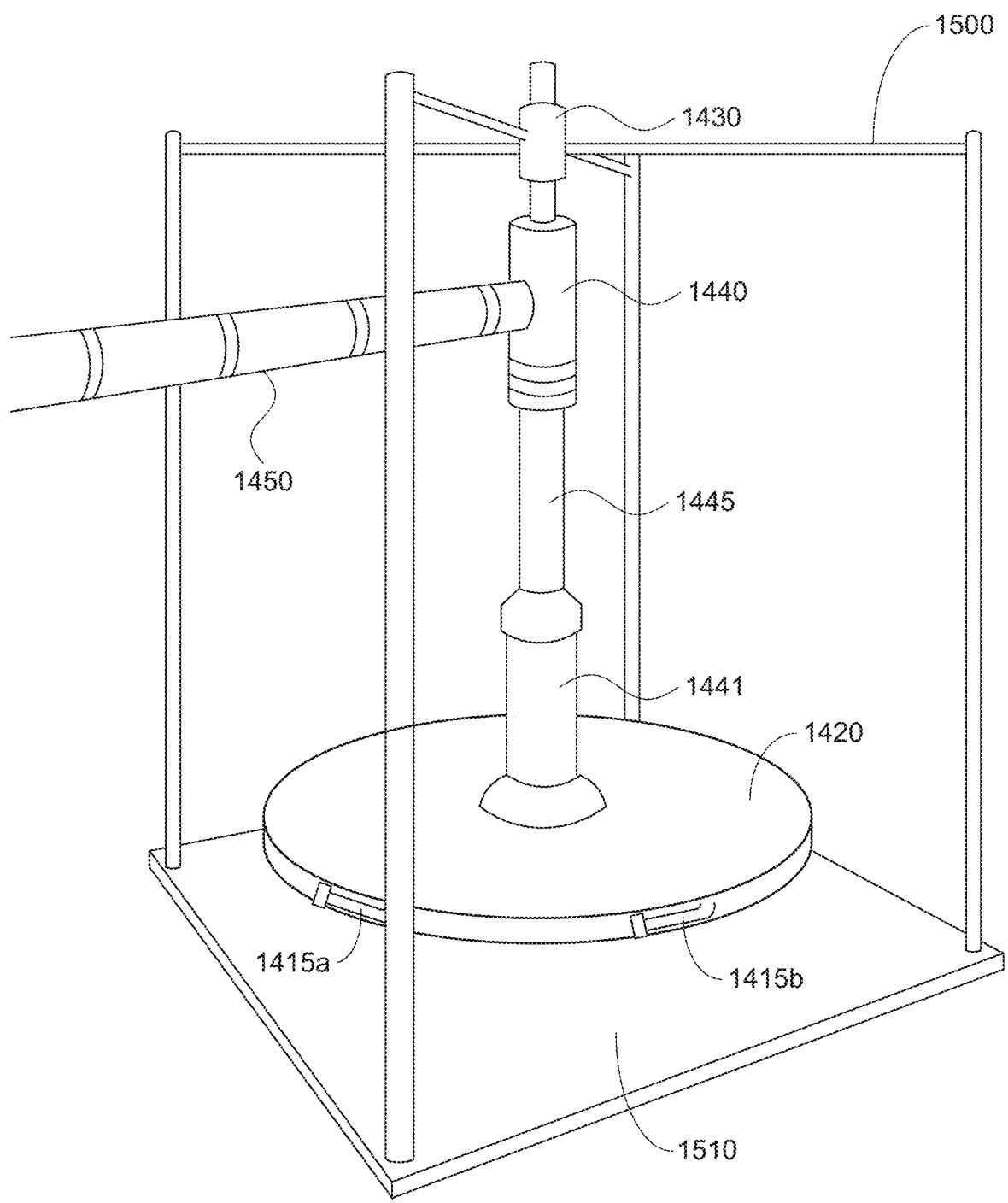

FIG. 15 shows the prototype 1400 of FIG. 14 mounted on a platform 1510 having a frame 1500 secured thereto. The prototype 1400 is held in place by the frame 1500 to reduce or prevent wobble or other imbalance(s) in the prototype 1400 during operation. The platform 1510 may have dimensions enabling easy transportation of the prototype 1400. A PVC pipe 1450 provides or supplies the fluid (e.g., water) to the rotary disc 1420 and exhaust water is expelled through the nozzles 1415*a-f*. The expelled water is sprayed or disbursed radially from the nozzles 1415*a-f*.

In a further experiment, air was forced into the inlet pipe 1450 at a pressure of about 5 psi. The rotation rate of the rotary disc 1420 reached 1000 rpm. An electricity generator (not shown) was connected to the axle 1430, and 150 watts of power was generated.

Various applications of the present device are possible. For example, in hydraulic power generation, the present rotary jet/device may replace current water turbine technology in hydroelectric plants. In gas turbine power generation, steam power generation and geothermal power generation, the present rotary jet/device may replace current technologies.

For wind power generation, the present rotary device (e.g., device 600 of FIGS. 6A-B) may include additional components. For example, a set of turbine wheels 1621*a-c* in a housing 1630 as shown in FIG. 16A may be used to funnel or extract the incoming wind flow and compress the air provided to the present device at a higher pressure (e.g., >5 psi, such as at least 10 psi, 15 psi, 20 psi or more) in order to increase the rotation rate of the rotary disc 1610 and/or the velocity of the air expelled out of the nozzles 1615*a-b* to a power wheel unit 1680 that is adjacent to the nozzles 1615*a* and 1615*b*. The power wheel unit 1680 includes buckets or cups 1684*a-b* on an outer circumference of a wheel or cylinder 1682, the buckets or cups 1684*a-b* receive exhaust from the nozzles 1615*a-d*, and subsequently transmits rotational power to an external generator, work unit or engine (not shown). In addition, the power wheel unit 1680 may supply electrical and/or mechanical energy to other devices, such as propellers, pumps, lights, monitors, etc. and/or compressors that provide air or fluid supply to the inlet of subsequent rotary devices. The housing 1630 may have a shape that may increase the efficiency of funneling the incoming air to the present device. A top turbine wheel or plate 1621*a* may have a conical or curved structure 1620 to provide an even fluid flow and/or distribution. The turbine wheels 1621*a-c* may be commercially available. The housing 1630 may have a funnel- or bell-shaped structure, as shown in FIG. 16A. However, other shapes (e.g., conical) may also be used. The turbine wheels or plates 1621*a-c* decrease in diameter from the top turbine wheel or plate 1621*a* to a bottom turbine wheel or plate 1621*c*, in which the smallest turbine wheel or plate 1621*c* is at the bottom end of the housing 1630, which is connected to the present rotary disc 1610 via a central axle or shaft 1602 and an inlet 1611. The cone 1620 is configured to increase the aerodynamics of the present rotary jet/device 1600A. The central axle or shaft 1602 may be connected to an electrical generator or other work unit or engine 1601 (e.g., a magnetic drive pump). The number of turbine wheels or plates 1621*a-c* may be determined by performance and/or test results or by simulation and/or calculations.

In the rotary jet/device 1600A, a first stage receives air flow (e.g., wind) and starts a rotation motion to compress the air in the channel defined by the housing 1630. The compressed air passes through the disc 1610 and out of the nozzles 1615*a-b* to start the rotation motion of the disc 1610. Thereafter, additional air is pulled into the housing 1630 since the rotary disc 1610 shares the same rotation axis with the turbine 1621*a-c*. The centrifugal force of the rotary disc 1630 accelerates the flow of air through the device 1600A, effectively multiplying the fluid flow speed and expelling air through the nozzles 1615*a-b* at a relatively high velocity. This thrust force may generate a reaction force to rotate the rotary disc 1610 at a higher rotation rate or speed. At the same time, a low-pressure zone created at the inlet 1611 by the rotary disc 1610 pulls the air flow from the first stage. The second stage (i.e., the rotary disc 1610) works in sync with the first stage and provides a strong rotation force for turning or rotating the electricity generator 1601 and/or to a power wheel unit 1680 to supply electrical and/or mechanical energy to other devices. Furthermore, the rotary jet 1600A may include a bearing 1660 and a joint or fitting (not shown), as discussed above.

Figure 16C:
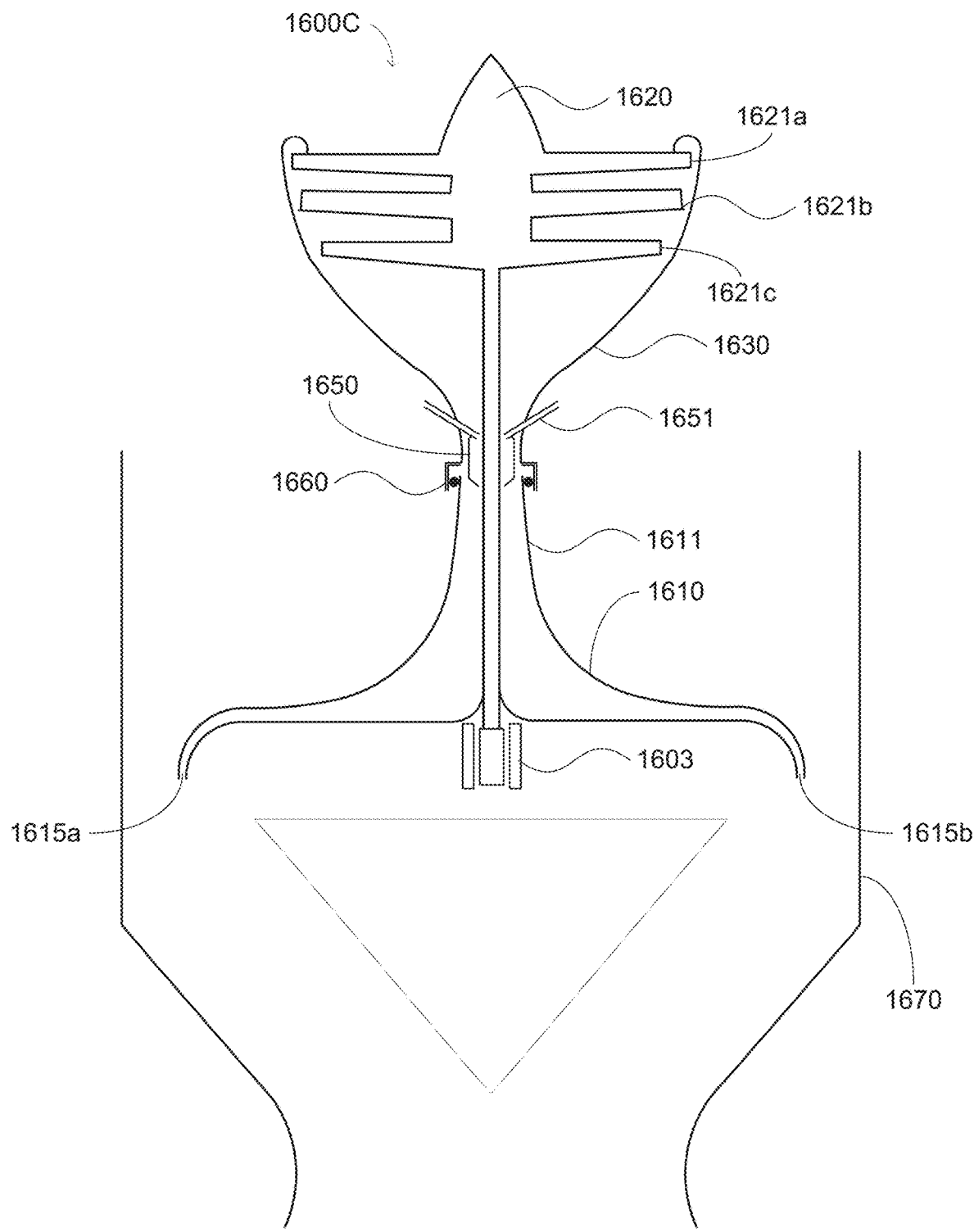

The above two-stage device can become a three-stage device by adding a combustion chamber 1650 at the one end of the first stage in the inlet 1611, as shown in FIG. 16B. FIGS. 16B-C are diagrams showing exemplary pulse detonation engines/jets 1600B-C including the present rotary device or rotary jet according to embodiments of the present invention. The rotary pulse detonation engine 1600B of FIG. 16B is similar to the rotary device 1600A of FIG. 16A, but further having a detonation and/or combustion chamber 1650 configured to boost power generation (e.g., in aviation application). The exemplary pulse detonation engine 1600B may also include fuel inlets 1651 to provide fuel to the combustion chamber 1650. Similar to conventional gas power generators, the input power and flow rate is fortified by the combustion chamber 1650.

Similar to the device 1600A of FIG. 16A, the rotary pulse detonation engine 1600B generally comprises a central axle or shaft 1602, an inlet 1611, a rotary disc 1610 that extends radially from the inlet 1611, nozzles 1615*a-b* at a distal edge of the rotary disc 1610, turbine wheels 1621*a-c* having a cone 1620 and a housing 1630, a power wheel unit 1680 having a plurality of buckets or cups 1682*a-b* on a wheel or cylinder 1684 and an electrical generator or other work unit or engine 1601, as discussed above. However, the rotary pulse detonation engine 1600B further comprises a combustion chamber 1650 and one or more fuel inlets 1651.

Fuel is provided to the combustion chamber 1650 by the fuel inlet(s) 1651. In addition, the rotary engine 1600B may have an additional inlet (not shown) for introducing compressed air or other oxygen-containing gas into the combustion chamber 1650, as may be discussed elsewhere herein. There may be a valve (not shown) between the additional inlet (not shown) and the detonation and/or combustion chamber 1650 that opens to enable compressed air or other gas to enter the detonation and/or combustion chamber 1650 when it is not detonating or combusting the fuel and closes to prevent the detonating/combusting fuel and expanding compressed air/gas from expanding into the additional inlet during detonation and/or combustion of the fuel. Furthermore, the engine 1600B may include a bearing 1660 and a joint or fitting (not shown) that allows the rotary disc to rotate while the housing 1630 remains stationary, as may be discussed herein.

To provide an efficient and/or light-weight design, the present device and/or system may find utility in the transportation and aviation industries. Modifications may be made to the design of the nozzles 1615*a-b* and the engine 1670, as shown in FIG. 16C, so that the thrust acts as downward propulsion power. In such a case, the rotary pulse detonation engine/jet 1600C may further include a magnetic drive pump 1603 configured to rotate the central axle or shaft 1602 (and thus, the rotary disc 1610 and the turbine wheels 1621*a-c*). Alternatively, the nozzles 1615*a-d* may first arc or bend in a direction opposite that of the rotation of the rotary disc 1610 before the nozzles 1615*a-d* bend or arc away from the combustion chamber 1650 and turbine 1621*a-c*, which may cause rotation of the rotary disc 1610. Similar to the device 1600B of FIG. 16B, the rotary pulse detonation engine/jet 1600C generally comprises the central axle or shaft 1602, the rotary disc 1610 that extends radially from an inlet section 1611, nozzles 1615*a-b* at the distal edge of the rotary disc 1610, the turbine wheels 1621*a-c*, a cone 1620, and a housing 1630, as discussed above.

The expanding gas flow from the detonation/combustion chamber 1650 passes through the inlet 1611 to the rotary disc 1610. The centrifugal force of the rotary disc 1610 acts upon the gas(es) from the inlet 1611 to accelerate the gas(es) towards the distal edge of the rotary disc 1610. The fluid is expelled through the nozzles 1615*a-b* at a relatively high speed. The high-speed thrust from the nozzles 1615*a-b* may be parallel or substantially parallel with the central axle or shaft 1602, which provides propulsion power for the device (e.g., the rotary jet). The present engines/jets 1600B-C provide a forward force instead of negative force(s). As a result, the net forward force may be more than 51,230 lbs.

(e.g., 11,980 lbs.+39,250 lbs.), which is over four (4) times the net forward force of a similar conventional device.

FIG. 16D shows a cascading rotary pulse detonation engine/jet 1600D that is similar to the rotary pulse detonation/jet 1600C of FIG. 16C. The engine/jet 1600D generally includes a central axle or shaft 1602, a compressor (turbine) wheels 1621a-c having a cone 1620, a housing 1630, a combustion chamber 1650, one or more fuel inlets 1651, and bearing(s) 1660, as discussed above. Modifications may be made to the engine 1670, as shown in FIG. 16D, so that the thrust acts as downward propulsion power, as discussed above. The engine/jet 1600D further includes rotary discs 1610a-c, inlets 1611a-c from which the rotary discs 1610a-c extend radially, nozzles 1618a-f at a distal edge of the rotary disc 1610a-c, power wheel units 1680a-d adjacent to the nozzles 1618a and 1618c (or 1618b and 1618d), and generators 1690a-d connected to the power wheel units 1680a-d.

In exemplary embodiments of the present invention, the engine/jet 1600D may include a plurality of rotary discs 1610a-c. For example, the engine/jet 1600D, as shown in FIG. 16D has three rotary discs 1610a-c. However, the engine/jet 1600D may include any number of rotary discs (e.g., 2, 3, 4, 5, 6 or any other positive integer) in stages. The engine/jet 1600D recycles the exhaust of the previous stage to perform work. For example, the exhaust of a first rotary disc 1610a feeds into an inlet 1611b of a second rotary disc 1610b and the exhaust of the second rotary disc 1610b feeds into the inlet 1611c of a third rotary disc 1610c. Each rotary disc 1610a-c includes a set of nozzles (e.g., 1618a-b, 1618c-d or 1618e-f) at the distal end of the rotary disc 1610a-c. Each set of nozzles may include at least two nozzles. For example, the first rotary disc 1610a includes nozzles 1618a-b, the second rotary disc 1610b includes nozzles 1618c-d and the third rotary disc 1610c includes nozzles 1618e-f. In addition, the nozzles 1618e-f of the third rotary disc 1610c may bend or arc away from the combustion chamber 1650 to provide forward thrust. Discs 1610a-b are joined or affixed to the shaft 1602, which causes rotation of the compressor blades 1621a-c and the rotary disc 1610c (which are also joined or affixed to the shaft 1602).

The power wheel units 1680a-d include buckets or cups (not shown) that receive exhaust from the nozzles 1618a-d, similar to the power wheel unit 1680 of FIGS. 16A-B, and subsequently transmit rotational power to the generators 1690a-d. The generators 1690a-d and generators 1690a-d may include electrical generators or other work units or engines. In addition, the power wheel units 1680a-d may supply electrical and/or mechanical energy to other devices, such as propellers, pumps, lights, monitors, etc., and/or compressors that supply air or fluid supply to the inlet of a subsequent rotary device (e.g., the next stage).

Each set of nozzles 1618a-b, 1618c-d and 1618e-f expels exhaust to one or more power wheel units 1680a-d, which in turn transmit rotational power to a respective generator 1690a-d. Each stage may have (i) a disc 1610a-b with nozzles 1618a-b or 1618c-d that exhaust gas in a same plane as the disc 1610a-b and (ii) at least two power wheels 1680a-b and 1680c-d. Generally, the power wheels are equally spaced apart around the rotary disc (e.g., by 360°/n, where n equals the number of power wheels). For example, first and second power wheel units 1680a-b receive exhaust from the nozzles 1618a-b, and transmit rotational power to generators 1690a-b. Third and fourth power wheel units receive exhaust from the nozzles 1618c-d, and transmit rotational power to generators 1690c-d. Having a plurality of rotary devices 1610a-b advantageously increases the efficiency of the conversion of mechanical energy into the engine/jet 1600D to rotational power to the generators 1690a-d.

Figure 16E:
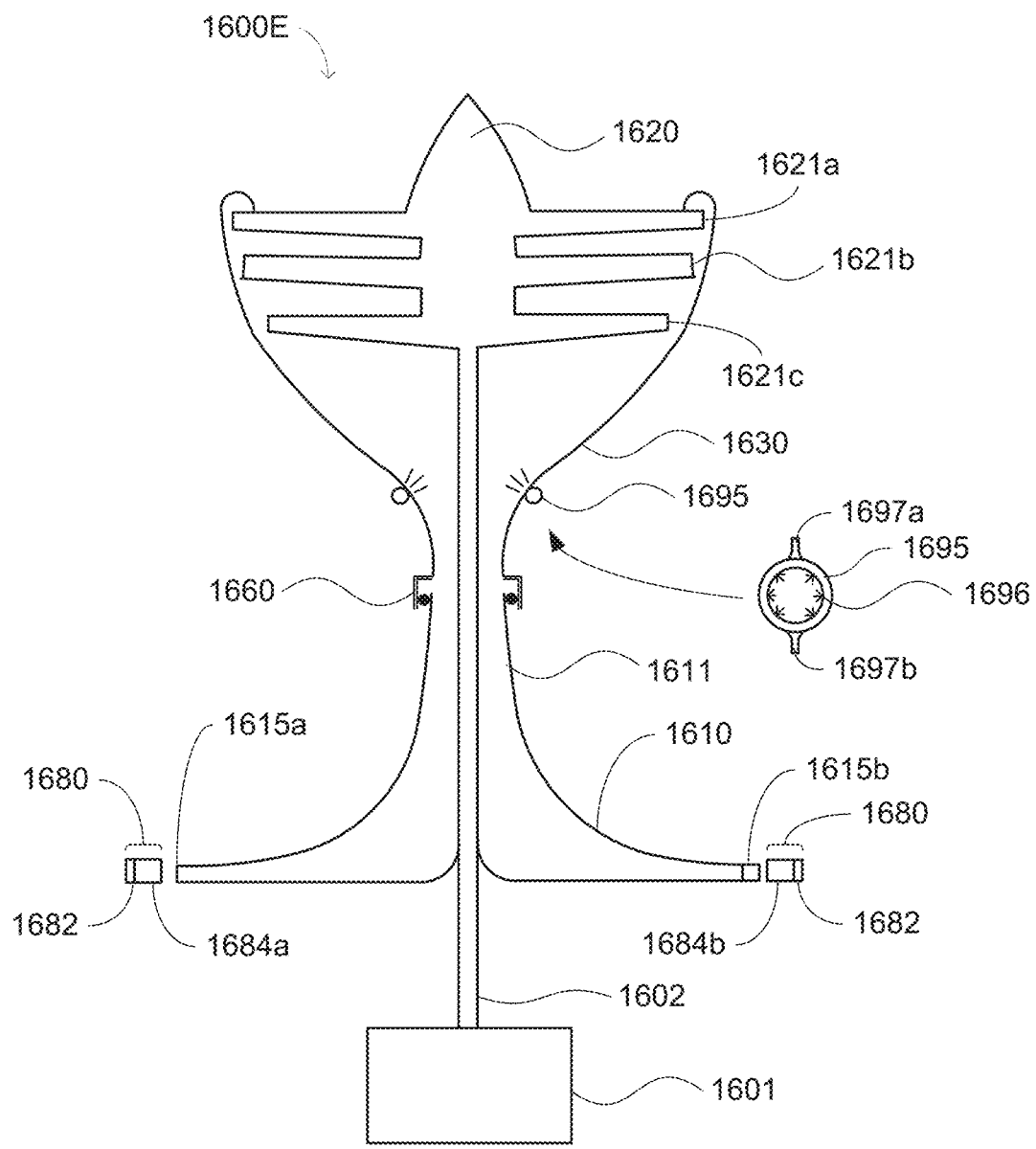

FIG. 16E shows a rotary engine/jet 1600E that is similar to the rotary engine/jet 1600A of FIG. 16A. The rotary engine/jet 1600E includes a shaft 1602, a rotary disc 1610, an inlet 1611, nozzles 1615a-b, a cone 1620, turbine wheels 1621a-c, a housing 1630, a power wheel unit 1680 having a plurality of buckets or cups 1682a-b on a wheel or cylinder 1684 and a generator 1601, as discussed above. The rotary engine/jet 1600E further includes a spray tube 1695 that adds water (e.g., mist) or another liquid to the compressed gas at one or more holes 1696 in the spray tube and in the housing 1630. Water may be supplied to the spray tube 1695 through at least one inlet 1697a or 1697b connected to one or more water sources (e.g., through a hose or pipe). The spray tube 1695 may have a toroidal or ring shape and a cross section that is oval or circular, but is not limited thereto. Since water has a density about 1000 times greater than the density of air, the total mass of the fluid passing through the rotary engine/jet 1600E may increase significantly when mist is added to the fluid passing through the rotary disc 1610. Therefore, the total output of the system may increase.

Figure 17:
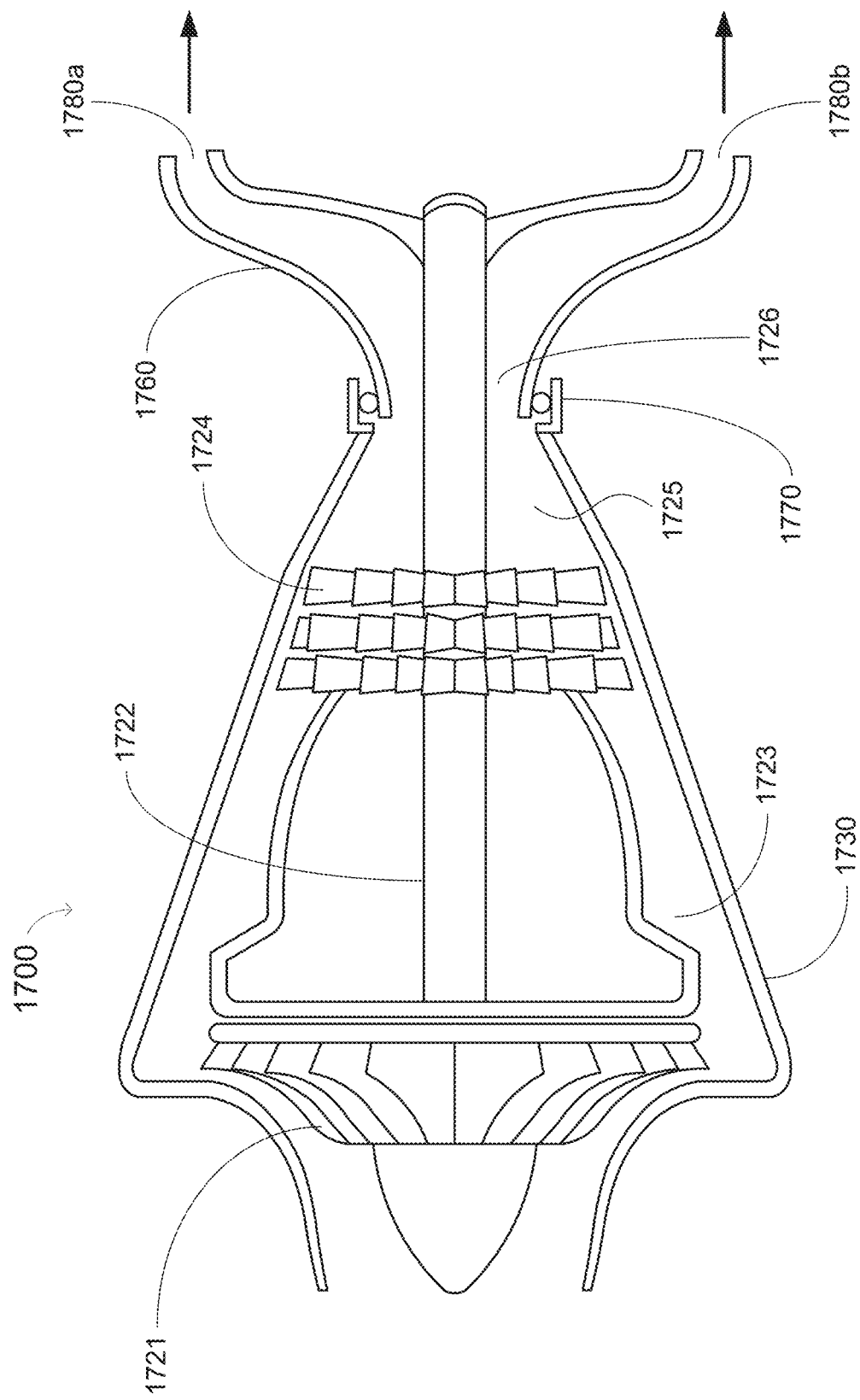
FIG. 17 is a diagram showing an engine having an exemplary rotary device according to one or more embodiments of the present invention.

FIG. 17 shows an exemplary engine 1700 having a compressor 1721, a shaft 1722, a combustion chamber 1723, bearing(s) 1770, a turbine 1724, a nozzle 1725, an inlet 1726, and an exemplary rotary disc 1760 having nozzles 1780a-b at the distal ends of the rotary disc 1760. The rotary disc 1760 is similar to the rotary disc 1610 of FIG. 16C. For example, the nozzles 1780a-b may bend or arc away from the combustion chamber 1723 and turbine 1724 to provide forward thrust. Rotation of the turbine 1724 and shaft 1722 causes rotation of the rotary disc 1760, which is joined or affixed to the shaft 1722. The compressor 1721 may include a centrifugal impeller, as shown in FIG. 17. The bearing 1770 allows the rotary disc 1760 to rotate as the housing 1730 remains fixed in place. The exhaust from the nozzles 1780a-b may amplify or increase the net thrust produced by the engine 1700, as described above. When the rotary disc 1760, as shown in FIG. 17, is coupled with a conventional jet engine, and the rotating shaft 1722 of the jet engine and the rotary disc 1760 are shared, the exhaust from the jet engine is pulled from the nozzle 1725 into the inlet 1726 of the rotary disc 1760 due to the centrifugal force of the rotating disc 1760. Furthermore, if the rotary disc 1760 is constructed with an aerodynamic design, air resistance may be minimized. Thus, the net thrust of the engine may be amplified or increased by the rotary disc 1760.

Figure 18:
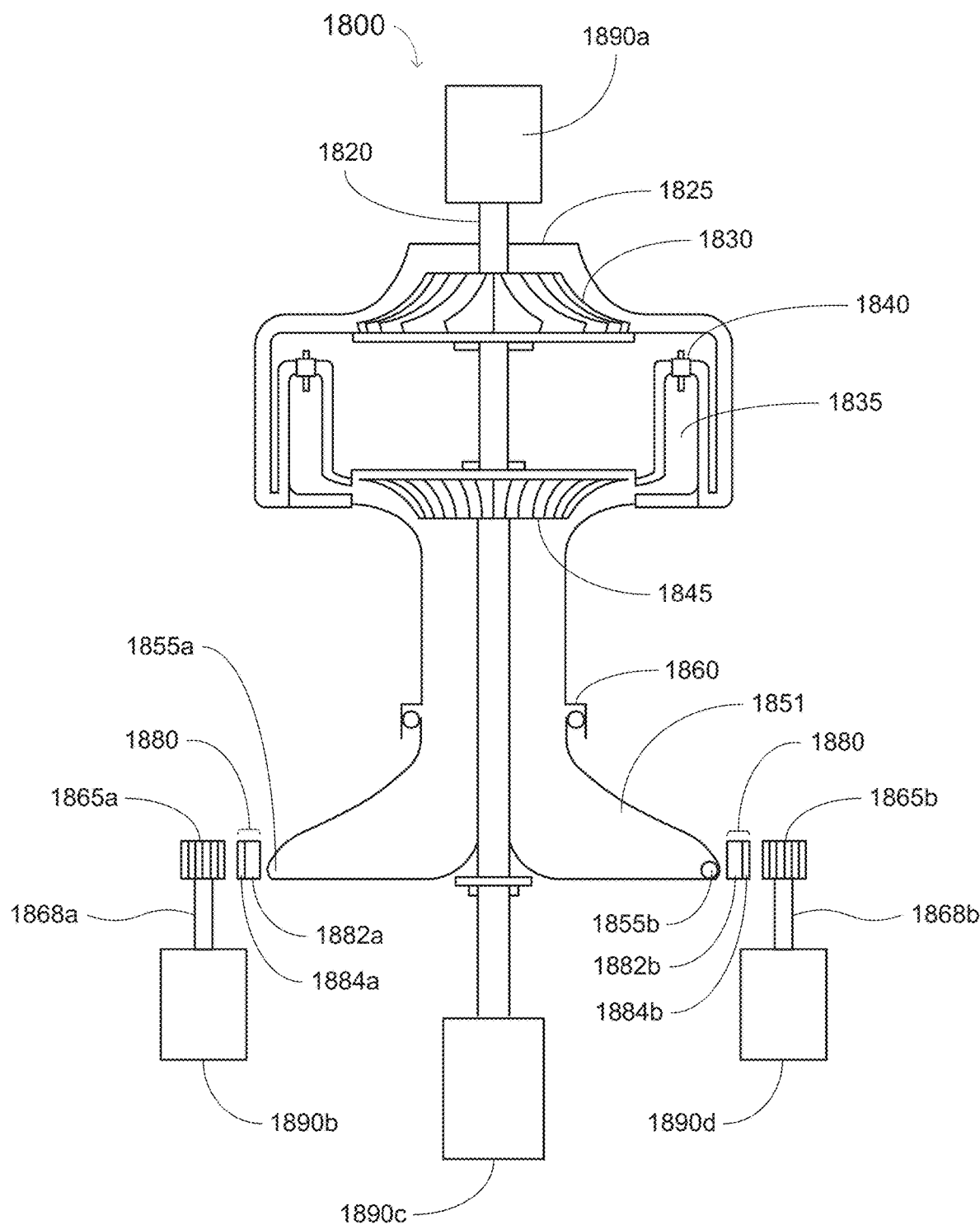
FIG. 18 is a diagram showing a gas turbine having an exemplary rotary device according to one or more embodiments of the present invention.

The concept of an engine having a rotary disc in the exhaust mechanism or section may be applied to an internal combustion or other fossil fuel-based engine (e.g., a natural gas- or methane-powered engine). When the engine has a rotary disc (e.g., similar to the coupling of a jet engine and a rotary disc described above), the exhaust may be captured or used to amplify or increase the net thrust. For example, FIG. 18 shows an exemplary gas engine 1800 that may include a shaft 1820, an air inlet 1825, a compressor 1830, a combustion chamber 1835, a fuel and ignition package 1840, a turbine 1845, a bearing 1860, and a rotary disc 1851 having nozzles 1855a-b. The nozzles 1855a-b exhaust a gas that is captured by a wheel 1880 having buckets 1882a-b and gears 1884a-b (e.g., a transmission gear) thereon. The gears 1884a-b drive mating gears 1865a-b on shafts 1868a-b that deliver rotational energy to generators 1890b and 1890d.

The shaft 1820 is rotated by the turbine 1845 and rotary disc 1851, and transmits the rotational energy directly to generators 1890*a* and 1890*c*. The wheel 1880 receives exhaust ejected from the nozzles 1855*a-b* and transmits rotational energy to the gears 1865*a-b* when engaged therewith. The gear ratio between the gear on the wheel 1880 and each of the gears 1865*a-b* may vary or differ to provide various amount of rotational energy to the generators 1865*b* and 1865*d*. In alternative embodiments, each of the generators 1890*a-d* may be another rotational device (e.g., a crankshaft, a compressor, a motor, etc.). The engine 1800 may engage with more than two (e.g., three to twelve, or any integer by which 360 is divisible to give another integer or a regular fraction) gears 1865*a-b*, each of which may drive a generator 1890, as shown in FIG. 18.

By connecting both axes (e.g., the axes of the rotary disc 1851 and the turbine 1845) with a single shaft 1820, the "self-amplifying chain reaction" effect of the rotary device 1851 may enhance the output and/or efficiency of the turbine 1845. Therefore, by coupling the turbine 1845 and the rotary device 1851, the thrust of the engine 1800 may be increased or multiplied.

Figure 19:
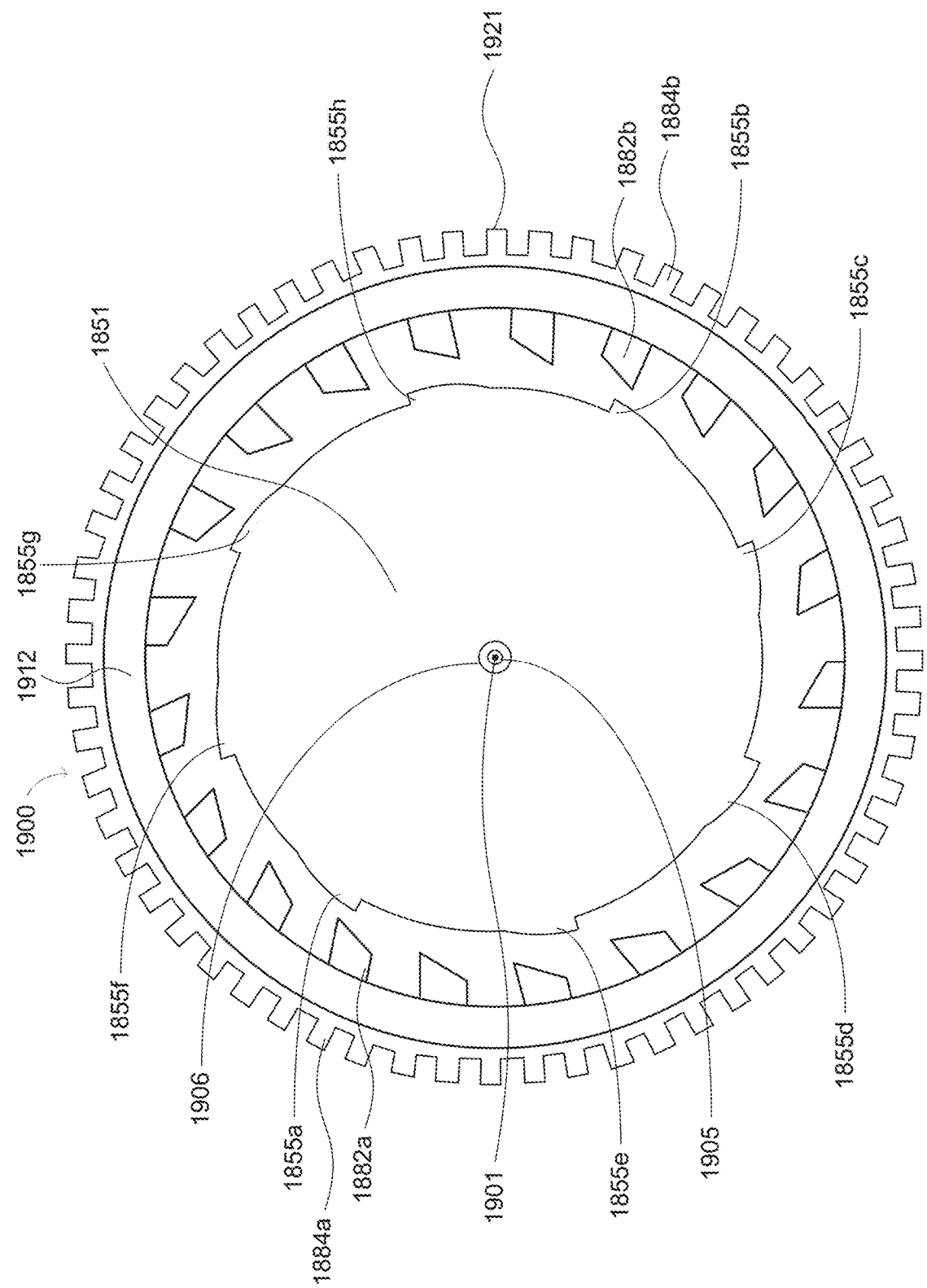
FIG. 19 is a diagram showing another exemplary rotary device according to one or more embodiments of the present invention.

FIG. 19 is a diagram of a wheel 1900 similar to the device 1100 of FIG. 11 and suitable for use as the wheel 1680 in FIG. 16B or 16E, wheels 1680*a-d* of FIG. 16D, or wheel 1880 of FIG. 18. The wheel 1900 includes a transmission gear 1921. The transmission gear 1921 generally extends completely around the wheel 1900, and may be configured to engage with one or more gears fixed to an axle or shaft (e.g., gears 1865*a-b* in FIG. 18) that rotate in a direction opposite that of the wheel 1900, and which in turn may drive an electricity generator or other work unit (such as an engine, a compressor, etc.). The wheel 1900 generally comprises a central wheel 1912, a plurality of buckets or cups 1882 *a-b* thereon, and the transmission gear 1921. The rotary disc 1851 is joined or affixed to a central axle or shaft 1901, and includes an inlet (e.g., a fluid inlet) 1906 having an opening 1905 configured to receive at least one fluid (e.g., a flowable fluid). The wheel is coupled to a rotary disc 1851 having nozzles 1855*a-h* at a distal end or edge thereof. The buckets or cups 1882*a-h* on the wheel 1900 receive the exhaust expelled from the nozzles 1855*a-h* and thus the impulse thrust from the exhaust, as discussed above. The transmission gear 1921 of FIG. 19 (e.g., 1884*a-b* of FIG. 18) provides additional and/or auxiliary power for electricity generation, as shown in FIG. 18. Combining with the coherent operation and the power generation of the rotary disc 1851 as discussed above, the wheel 1900 with buckets/cups 1882*a-h* and gear 1921 advantageously provides an even higher total efficiency.

Figure 20:
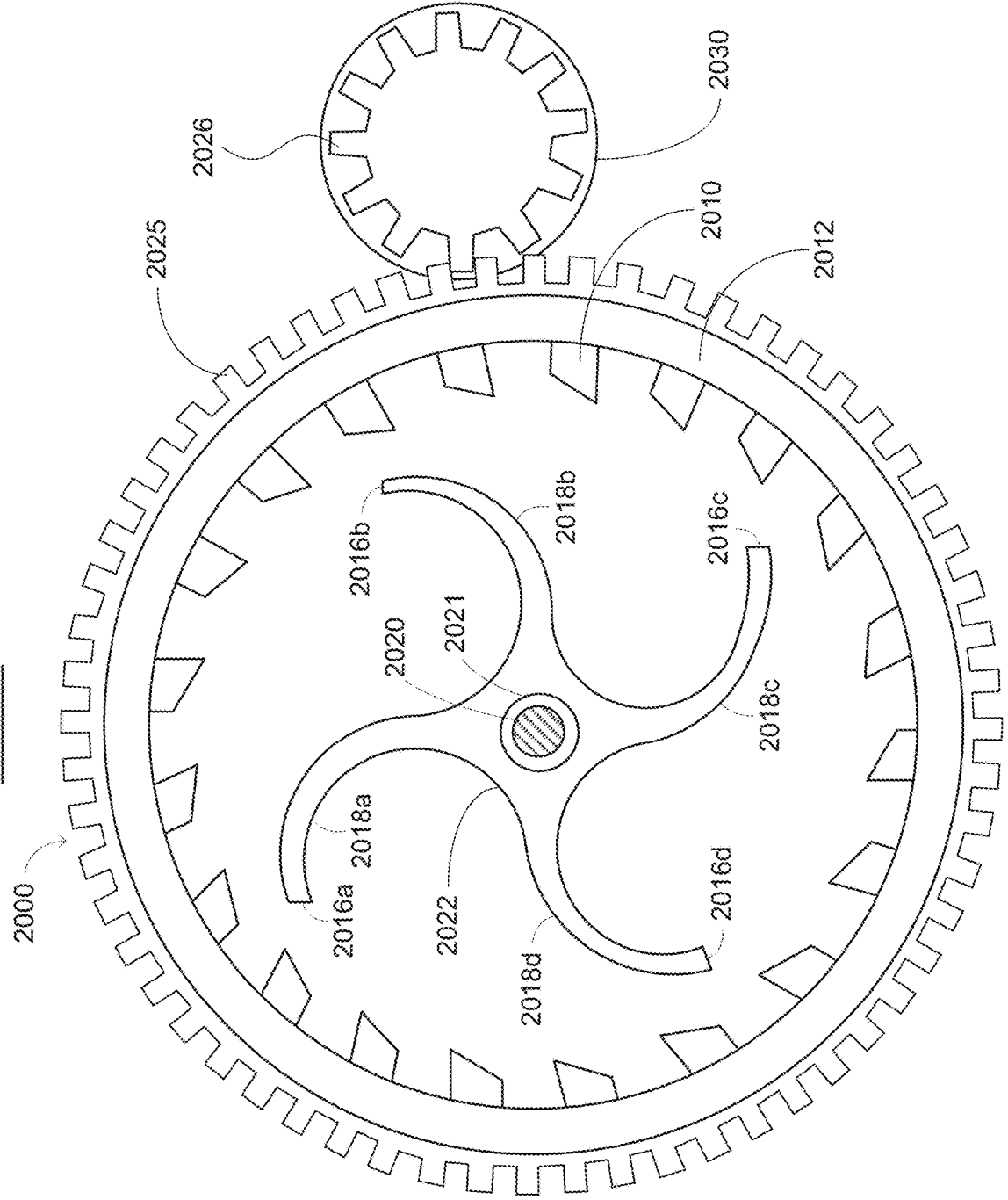
FIG. 20 is a diagram showing yet another exemplary rotary device according to one or more embodiments of the present invention.

FIG. 20 is a diagram of a device 2000 similar to the device 900 of FIG. 9, except that the device includes a transmission gear 2025. The transmission gear 2025 generally extends completely around the wheel or cylinder 2012, and may be configured to engage with one or more gears (e.g., complementary gears) 2026 fixed to an axle or shaft (not shown) that rotates in a direction opposite that of the rotary device 2000, and which in turn drives an electricity generator or other work unit 2030 (such as a generator, an engine, a compressor, etc.). The device 2000 generally comprises a central axle or shaft 2020, an inlet (e.g., a fluid inlet) 2021 configured to receive at least one fluid (e.g., a flowable fluid), a manifold 2022, and a plurality of radial arms (e.g., rotating arms) 2018*a-d* having nozzles 2016*a-d* at a distal end thereof. The rotary device 2000 further includes a wheel or cylinder 2012 and a plurality of buckets or cups 2010 thereon, as shown in FIG. 20. The radial arms 2018*a-d* have an arc between the manifold 2022 and the nozzles 2016*a-d*. The radial arms 2018*a-d* rotate when the fluid is expelled from the nozzles 2016*a-d* or when a rotational force is applied to the central axle or shaft 2020, as discussed above. The transmission gear 2025 of FIG. 20 provides a force that rotates the gear 2026 that provides power for electricity generation. Multiple gears 2026 (and associated shafts and work units 2030) may surround the wheel 2012, and each such gear 2026 may have a same or different gear ratio with regard to the transmission gear 2025.

Figure 21:
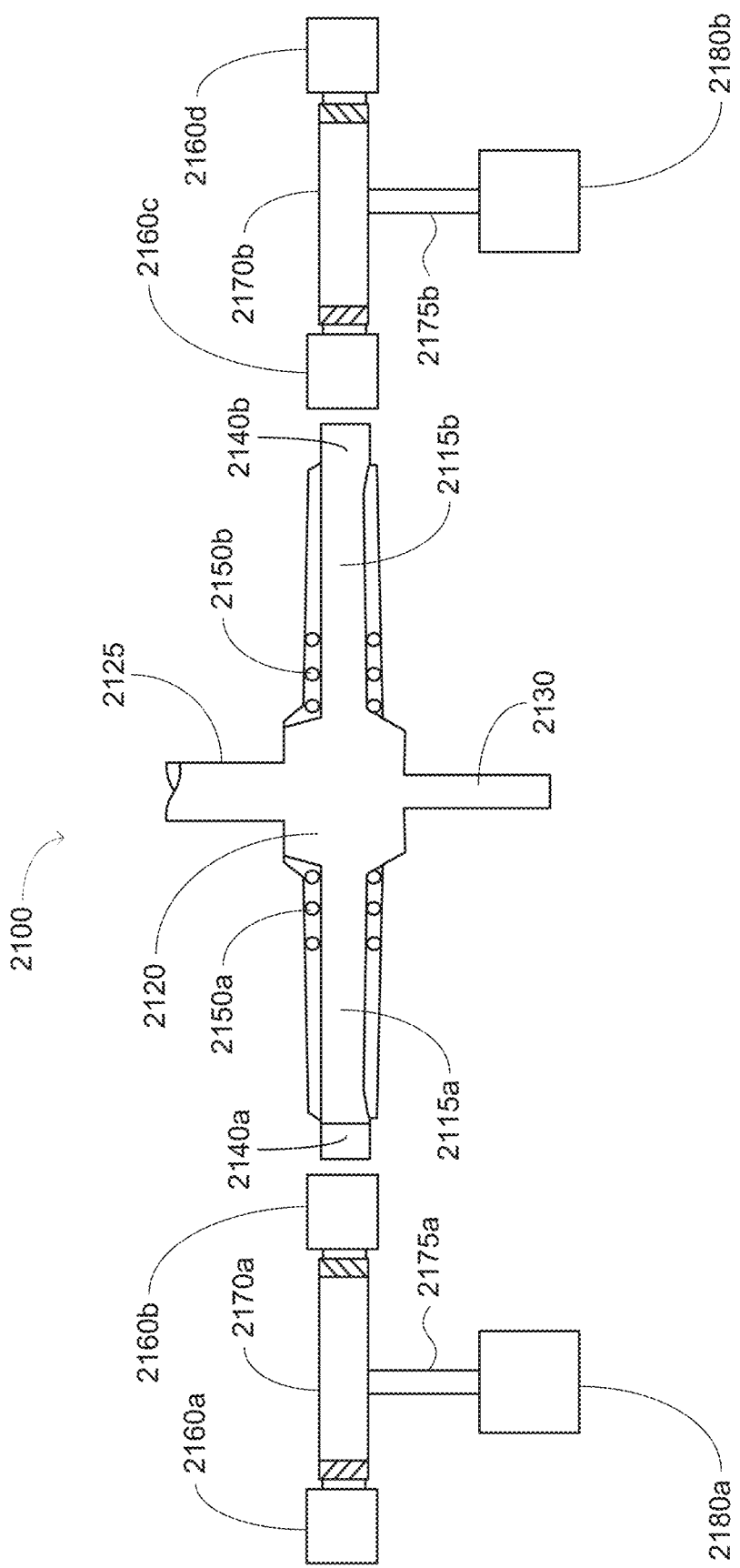
FIG. 21 is a diagram showing a further exemplary pulse/combustion rotary engine according to one or more embodiments of the present invention.

FIG. 21 is a cross-sectional view of an exemplary engine 2100, similar to engine 400 of FIG. 4A, including rotating arms 2115*a-b*, a shaft 2130, cooling coils 2150*a-b*, a combustion chamber 2120, and nozzles 2140*a-b* at a distal end of the rotating arms 2115*a-b*. In addition, the exemplary engine 2100 includes a fluid or fuel inlet 2125. The inlet 2125 supplies a fluid, such as compressed air and fuel to the detonation and/or combustion chamber 2120, as discussed above, and may supply water to the cooling coils 2150*a-b*. In some embodiments, the inlet may include a single conduit or path that supplies a mixture of the fuel and air to the detonation and/or combustion chamber 2120, or separate conduits or paths, as discussed above. In some embodiments of the present invention, the engine 2100 may include an ignition device (not shown) that ignites or detonates the fuel in the detonation and/or combustion chamber 2120, and an ignition cable or wire (e.g., an electronic wire) to the ignition device.

The exemplary engine 2100 may be coupled to at least two wheels 2170*a-b* with buckets thereon 2160*a-d*, which transfer rotational power or energy to one or more generators 2180*a-b* through corresponding shafts 2175*a-b*, as discussed above, except that the buckets 2160*a-d* are on an outer circumference of the wheels 2170*a-b* to receive the fluid (e.g., exhaust) expelled from the nozzles 2140*a-b*. The buckets 2160*a-b* cause the wheel 2170*a* to rotate, and the buckets 2160*c-d* cause the wheel 2170*b* to rotate. The wheels 2170*a-b* are fixed to axles or shafts 2175*a-b* that rotate in a direction opposite that of the shaft 2130. In turn, the shafts 2175*a-b* drive the generators 2180*a-b* or other work units (e.g., compressors or motors). The wheels 2170*a-b* and the generators 2180*a-b* advantageously increase the efficiency of the engine 2100.

Overall, the present engine and/or rotary device is relatively simple and inexpensive to manufacture. In addition, high-precision components may not be necessary when manufacturing the present engine and/or rotary device. Furthermore, the present engine and/or rotary device advantageously results in relatively high efficiency and/or improved performance. Also, the present engine and/or rotary device is not limited to use of water as a fluid. In fact, the present rotating pulse detonation engine and other engines can have their power and for efficiency enhanced by using such a rotary device (e.g., for receiving exhaust and optionally cooling fluid gases through the inlet).

An Exemplary Method of Converting Fuel into Energy

Figure 22:
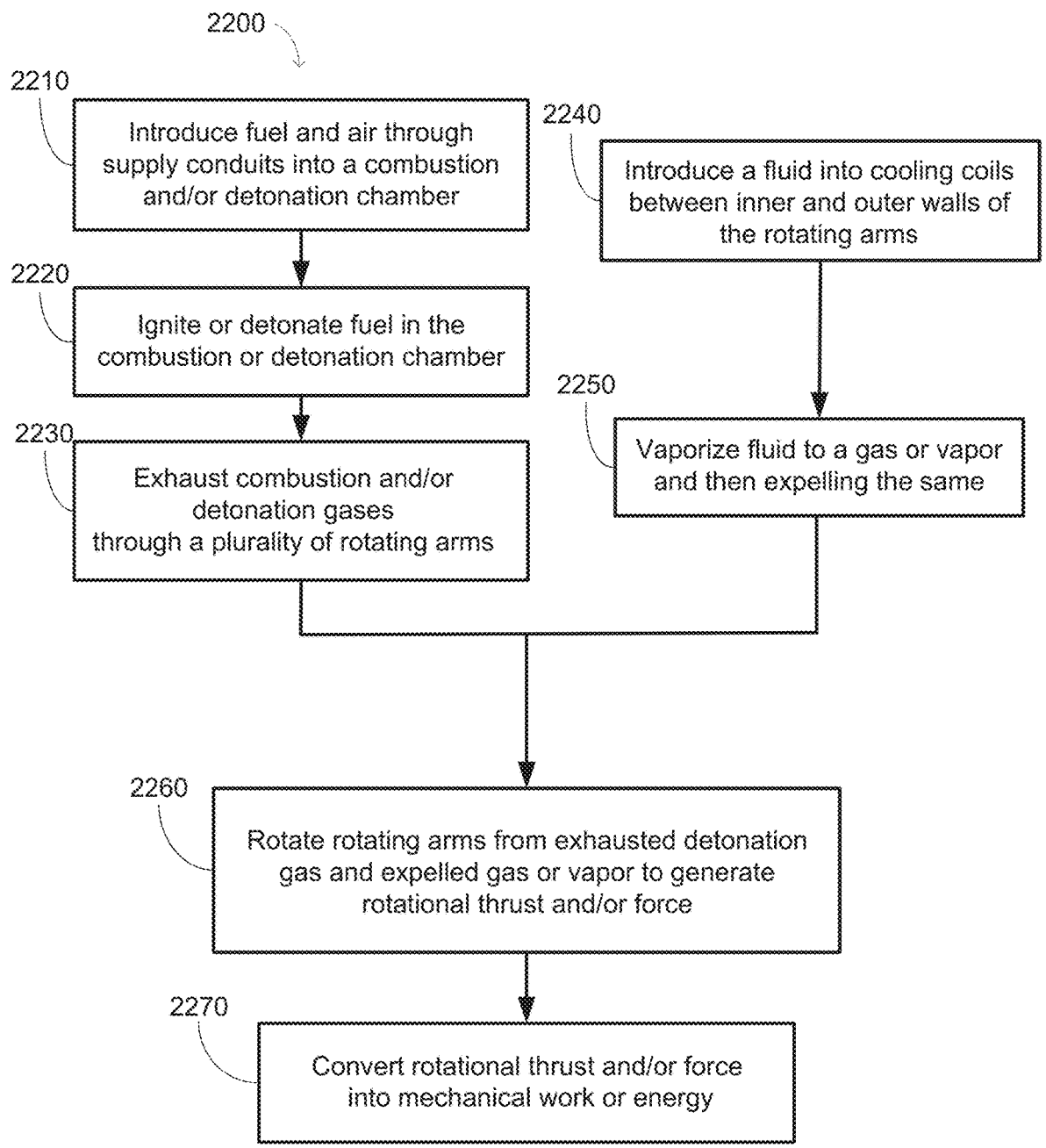
FIG. 22 is a flow chart showing steps of an exemplary method of converting fuel to energy according to one or more embodiments of the present invention.

FIG. 22 is a flow chart 2200 showing steps of an exemplary method of converting fuel and a fluid (e.g., gas or vapor) into mechanical energy according to one or more embodiments of the present invention. The exemplary method generally includes introducing fuel and air into a detonation and/or combustion chamber through a fuel supply inlet, detonating the fuel in the detonation and/or combustion chamber, exhausting detonation gas(es) through a plurality of rotating arms extending radially from the detonation and/or combustion chamber and a nozzle at a distal end of each rotating arm, introducing the fluid into cooling coils around each rotating arm, vaporizing the fluid to form a gas or vapor, expelling the gas or vapor from a corresponding one of the nozzles, rotating the rotating arms from the exhausted detonation gas(es) and expelled gas or vapor to generate a rotational thrust and/or force, and converting the rotational thrust and/or force into the mechanical work or energy.

At step 2210, the fuel and air are introduced into one or more detonation and/or combustion chambers through one or more supply conduits, as described herein. In various embodiments of the method, the fuel is introduced into the detonation and/or combustion chamber through a fuel supply and/or inlet. The air (which may be compressed) is introduced into the detonation and/or combustion chamber through an air supply channel. When there is more than one combustion chamber, each combustion chamber may have its own fuel and air supply conduits. The air supply conduit(s) may supply compressed air from a reservoir. In a further embodiment, a first regulator connected to the reservoir introduces compressed air into a reservoir or tank, which directs the air to the detonation or combustion chamber through the air supply conduit. A second regulator may be connected to the reservoir and may release excess air from or reduce the pressure in the reservoir tank. The air or fuel may be introduced into the detonation and/or combustion chamber through one or more valves between the fuel and/or air supply conduits and the detonation and/or combustion chamber. The fuel and air supply conduits may be along a central shaft extending along a central axis normal to an outer surface of the detonation and/or combustion chamber (i.e., the rotational axis of the rotating arms and detonation and/or combustion chamber).

At 2220, the fuel is ignited or detonated in the detonation and/or combustion chamber. Preferably, an igniter (e.g., a spark plug) located in the detonation and/or combustion chamber ignites the fuel fed into the detonation and/or combustion chamber from the fuel supply conduit. In some embodiments, the fuel is ignited only during the initial detonation and/or combustion cycle(s) (e.g., the first 1-100 cycles). Thereafter, the fuel may auto-ignite (e.g., from residual heat in the detonation and/or combustion chamber), and the igniter can be turned off. Ideally, a single ignition is sufficient, but in some embodiments, more than one ignition (e.g., 2 or 3 ignitions) may be useful or necessary. At 2230, the exhaust detonation gases travel through a plurality of rotating arms from the combustion/detonation chamber.

At 2240, a fluid (e.g., water) is introduced into the coiling coils between the inner and outer walls of the rotating arms. The fluid may be introduced using fluid inlet adjacent to the central rotary shaft. In some embodiments, the fluid may be introduced to the cooling coils a number of detonation/combustion cycles after the initial ignition (e.g., 1-100 cycles after the first ignition, or any integer or range of integers therein).

At 2250, the fluid in the cooling coil is vaporized into gas or vapor. Once the fluid has evaporated and exited the cooling coils, the gas or vapor may travel down the rotating arms, absorbing additional heat from the rotating arms along the way. Subsequently, the gas or vapor is expelled from a corresponding nozzle.

At 2260, the rotation of the arms from exhausted detonation gas and expelled gas or vapor causes a central rotary shaft to rotate or spin, thereby providing a rotational force for motive power or mechanical work. In addition, the angle of the nozzles relative to the plane of rotation of the rotating arms can provide a thrust or force for motive power (e.g., for use in VTOL vehicles).

In exemplary embodiments of the present method, in addition to the method at 2270, the exhaust/detonation gases and the expelled gas or vapor from the nozzles are directed through at least one exhaust duct to a mechanical work unit (e.g., a turbine unit) in communication with or adjacent to the exhaust duct (e.g., outside of a housing containing the detonation and/or combustion chamber and rotating arms). The exhaust duct may extend from an opening in the housing. The exhaust gases may be directed from the exhaust duct(s) to the turbine unit using a reflector. The turbine may include one or more turbine fans that may be attached or affixed to a rod or shaft that may drive a compressor. The compressor takes in air from outside the engine, and supplies compressed air to the detonation and/or combustion chamber through the air supply channel. Alternatively, the exhaust/detonation gases and expelled gas or vapor from the nozzles may provide a thrust or force for motive power.

At 2270, rotational power or force may be transferred directly or indirectly from the rotating detonation and/or combustion chamber to another mechanical work unit, separate from that receiving the exhaust/detonation gases. For example, a generator, a pump, or a turbine may receive the rotational force from the central rotary shaft described herein, which may, for example, directly rotate or drive a wheel in the generator or pump, or directly drive a fan in the turbine. Alternatively, rotation from the central rotary shaft may drive a belt, piston, cam, or other rotary force-receiving mechanism in a motor, in the pump, or in another work-, power-, or electricity-generating device or apparatus.

Exemplary Methods of Converting Energy and Transporting a Fluid

Figure 23:
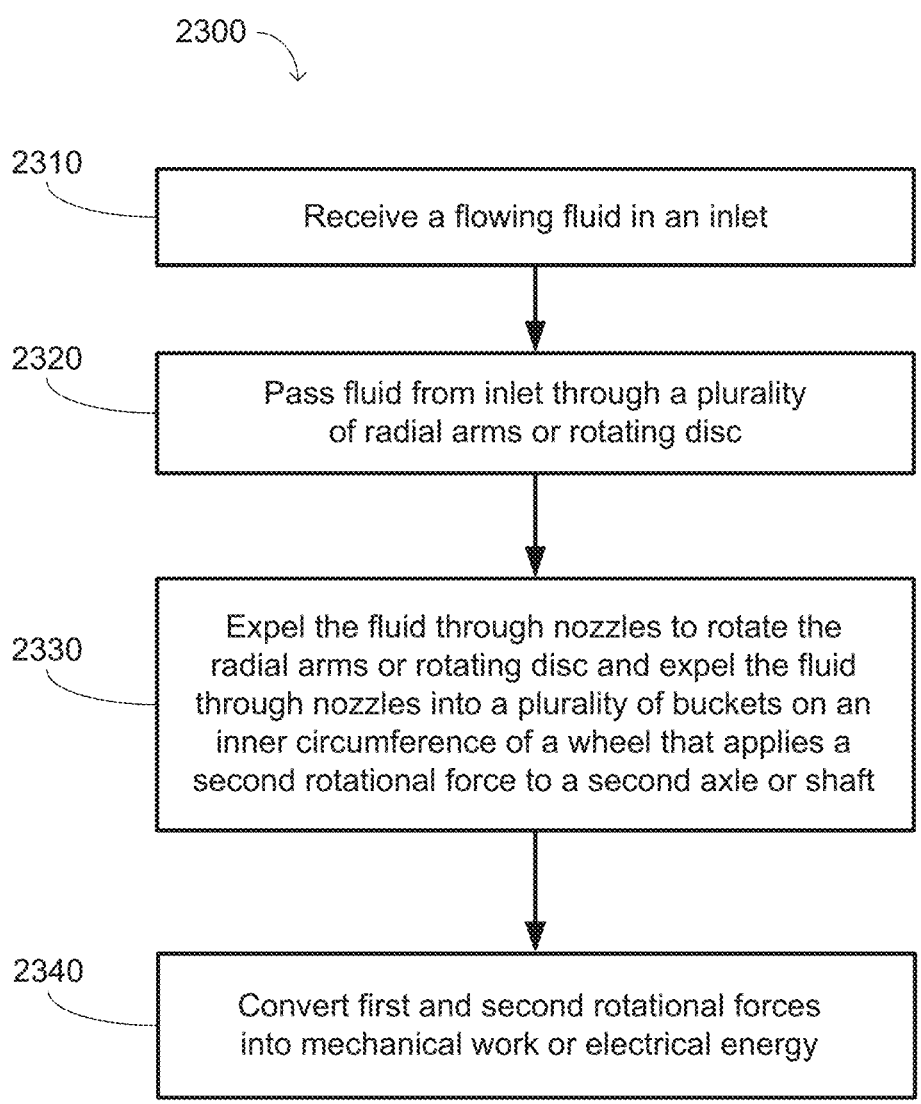
FIG. 23 is a flow chart showing steps of an exemplary method of converting energy and transporting a fluid according to one or more embodiments of the present invention.

FIG. 23 is a flowchart 2300 showing steps of an exemplary method of converting energy according to one or more embodiments of the present invention. The exemplary method generally includes receiving a flowing fluid in an inlet, passing the fluid from the inlet through a plurality of radial arms or a rotary disc, applying a first rotational force to a first central axle or shaft, and expelling the fluid through nozzles at a distal end of each radial arm or at a distal edge of the rotary disc, each nozzle having an opening facing away from a direction of rotation of the radial arms or the rotary disc to rotate the radial arms or the rotary disc, and the fluid being expelled into a plurality of buckets on an inner circumference of a wheel. The wheel applies a second rotational force to a second axle or shaft, and the method converts the first and second rotational forces into mechanical work or electrical energy.

At 2310, a fluid (e.g., liquid or gas such as steam, air, water, mixtures thereof, etc.) is received at the inlet of a rotary device. The fluid may comprise, for example, wind, water from a reservoir (e.g., behind a dam), gas from a combustion chamber, or steam from a boiler. Such fluids are energized with potential energy, heat and/or kinetic energy. The fluid goes through the inlet and into the rotary device.

At 2320, the fluid passes through radial arms or the rotary disc in the rotary device, picking up additional kinetic energy from the centrifugal force of the rotating arms or the rotary disc. An alternative method of transporting a fluid according to one or more embodiments of the present invention may include applying a rotational force to a central axle or shaft to which the rotary arms or the rotary disc are connected, drawing the fluid through the inlet into the radial arms or the rotary disc as the radial arms or the rotary disc rotate radially around the central axle or shaft, and expelling the fluid through a nozzle at a distal end of each radial arm or at a distal edge of the rotary disc. The plurality of radial arms or the rotary disc receive the fluid from the inlet (e.g., through a manifold) and rotate when (i)

the fluid is forced into the inlet or (2) the rotational force is applied to the central axle or shaft. Each nozzle may have an opening facing away from a direction of rotation of the radial arms or the rotary disc. Alternatively, the nozzles may expel the fluid in a direction parallel to the central axle or shaft.

At 2330, the fluid is expelled or thrust out the nozzles, acting as a propulsion force for the radial arms or the rotary disc and/or a rotary jet containing the radial arms or the rotary disc. In various embodiments, the direction of the nozzles is perpendicular to an imaginary line connecting the nozzles to the central axle or shaft. Alternatively, the direction of the nozzles is parallel to the central axle or shaft. In exemplary embodiments, the fluid is expelled or thrust out the nozzle into a plurality of buckets or cups on an inner circumference of a wheel, as described herein. The wheel then applies a second rotational force to a second axle or shaft. In various embodiments, a gear to which the second axle or shaft receives the rotational force from a rim coupled to the wheel and that rotates at the same rate as the wheel. The second axle/shaft rotates at a rate based on the gear ratio of the rim to the gear.

The force of the fluid expelled out of the rotating radial arms or rotary disc is thus captured by or transferred to the buckets or cups. The wheel may thus have some kinetic energy from the gas expelled from the nozzles and captured by the buckets or cups. At 2340, the first and second rotational forces may be converted into mechanical work or electrical energy. Thus, the efficiency of energy transfer may increase (e.g., at least double) as may the efficiencies of other devices receiving the transferred energy.

Figure 24:
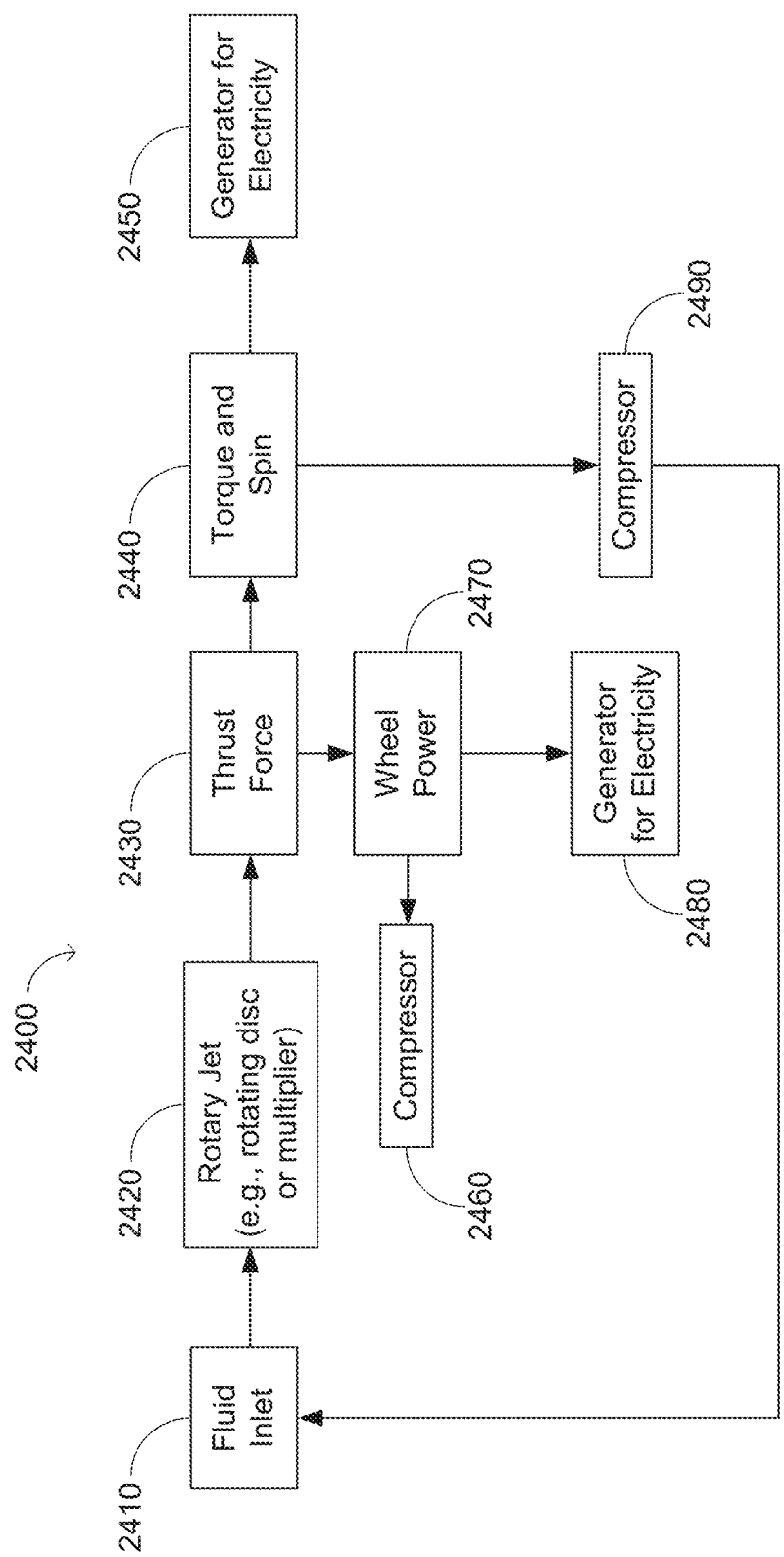
FIG. 24 is a block diagram of an exemplary electricity generator including the present rotary device according to embodiments of the present invention.

FIG. 24 is a block diagram of an exemplary electricity generator including the present rotary device/jet according to embodiments of the present invention.

At 2410, a fluid (e.g., liquid or gas such as steam, air, water, mixtures thereof, etc.) is received at the inlet of another rotary device according to one or more embodiments of the present invention. The fluid may comprise, for example, wind, water from a reservoir (e.g., behind a dam), gas from a combustion chamber, or steam from a boiler. Such fluids are energized with potential energy, heat and/or kinetic energy. The fluid goes through the inlet and into the rotary device.

At 2420, the fluid passes through a rotary disc (e.g., a multiplier) in the rotary device, picking up additional kinetic energy from the centrifugal force of the rotary disc. An alternative method of transporting a fluid according to one or more embodiments of the present invention may include applying a rotational force to a central axle or shaft to which the rotary disc is connected, drawing the fluid through the inlet into the rotary disc as the rotary disc rotates radially around the central axle or shaft, and expelling the fluid through one or more nozzle(s) at a distal edge of the rotary disc. The rotary disc receives the fluid from the inlet (e.g., through a manifold) and rotates when (i) the fluid is forced into the inlet or (2) the rotational force is applied to the central axle or shaft. Each nozzle may have an opening facing away from a direction of rotation of the rotary disc. Alternatively, the nozzles may expel the fluid in a direction parallel to the central axle or shaft.

At 2430, the fluid is expelled or thrust out the nozzles, acting as a propulsion or thrust force for the rotary disc and/or a rotary jet containing the rotary disc. In various embodiments, the direction of the nozzles is perpendicular to an imaginary line connecting the nozzles to the central axle or shaft. Alternatively, the direction of the nozzles is parallel to the central axle or shaft.

At 2470, the fluid is expelled or thrust out the nozzle into a plurality of buckets or cups on an inner circumference of a wheel, as described herein. The wheel then applies a second rotational force to a second axle or shaft. In various embodiments, a gear to which the second axle or shaft receives the rotational force from a rim coupled to the wheel and that rotates at the same rate as the wheel. The second axle/shaft rotates at a rate based on the gear ratio of the rim to the gear. The force of the fluid expelled out of the rotary disc is thus captured by or transferred to the buckets or cups. The wheel may thus have some kinetic energy from the gas expelled from the nozzles and captured by the buckets or cups. The rotational forces may be converted into mechanical work (e.g., a compressor at 2460) or electrical energy (e.g., a generator for electricity at 2480).

At 2440, the force of the fluid expelled out of the rotary disc provides torque and causes the rotary disc and/or the device having the rotary disc therein to spin. The rotational forces may be converted into mechanical work (e.g., a compressor at 2490) or electrical energy (e.g., a generator for electricity at 2450). Thus, the efficiency of energy transfer may increase (e.g., at least four times) as may the efficiencies of other devices receiving the transferred energy.

CONCLUSION/SUMMARY

The present invention provides an engine and/or a rotary device that can advantageously be integrated into conventional electricity power generation systems without special design changes or excessive costs. Additionally, the present engine and/or rotary device can be manufactured using materials and parts similar to those used in conventional engines and rotary devices, and thus the cost of manufacturing may be substantially the same as (or less than) that of conventional engines and rotary devices. Furthermore, the present engine and/or rotary device may more efficient and have less wear-and-tear than conventional combustion engines or rotary devices.

In addition, the present engine and/or rotary device is advantageously simpler and easier to manufacture and repair than conventional rocket engines, and the efficiency can be greatly improved. As a result, the present engine, rotary device and method(s) can contribute a relatively high proportion of the thrust towards rotational torque.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A rotary device, comprising:
   a) a first central axle or shaft;
   b) an inlet configured to receive at least one fluid;
   c) a first rotary disc comprising two plates or discs having a continuous space therebetween from an opening of the inlet to a circumference of the rotary disc, the two plates or discs being (i) sealed to each other at the circumferences of the two plates or discs and (ii) spaced apart at a first distance adjacent to the central axle or shaft and at a second distance at the circumference of the two plates or discs, the second distance being smaller than the first distance, wherein the inlet is in continuous fluid communication with the space between said two plates or discs, the first rotary disc is configured to rotate around the first central axle or shaft, and said first rotary disc has a plurality of nozzles at a distal edge thereof, said nozzles being oriented to expel the fluid in a predetermined direction; and d) a wheel or cylinder having a plurality of buckets or cups on an inner or outer circumference thereof, configured to receive the fluid expelled from the nozzles.

2. The rotary device of claim 1, wherein said plurality of nozzles comprises at least four nozzles.

3. The rotary device of claim 1, wherein said first rotary disc extends radially from the inlet.

4. The rotary device of claim 1, wherein said inlet includes a hole or opening at a top center of said inlet, and is configured to enable rotation of the first rotary disc.

5. The rotary device of claim 1, wherein said plates or discs are sealingly secured directly or indirectly to each other at a circumference of the plates or discs, and the first rotary disc further comprises a plurality of fasteners configured to secure the plates or discs together.

6. The rotary device of claim 5, wherein said plates or discs are welded to each other or to a ring, cylinder or other structure at the circumference of the plates or discs.

7. The rotary device of claim 1, wherein the wheel further comprises a transmission gear on the inner or outer circumference of the wheel other than that of the inner or outer circumference that the buckets or cups are located, and the transmission gear is configured to engage with one or more external gears configured to drive an external generator or work unit.

8. The rotary device of claim 1, further comprising a compressor at or in front of said inlet, configured to compress the at least one fluid in the inlet and/or first rotary disc.

9. The rotary device of claim 8, wherein said compressor comprises one or more fans joined or affixed to said first central axle or shaft.

10. The rotary device of claim 1, wherein the first rotary disc comprises a plurality of dividers.

11. An engine or jet, comprising the rotary device of claim 1 and at least one additional rotary disc in series with the first rotary disc.

12. A method of converting a fluid into mechanical work or energy using the rotary device of claim 1, comprising:
a) introducing the fluid into said first rotary disc through said inlet;
b) moving the fluid to said edge of the first rotary disc;
c) expelling said fluid through the nozzles;
d) rotating said first rotary disc from the expelled fluid to generate a rotational thrust and/or force; and
e) converting said rotational thrust and/or force into said mechanical work or energy.

13. The rotary device of claim 1, wherein the nozzles are evenly distributed around the circumference of the first rotary disc and are perpendicular to a radius of the first rotary disc.

14. The rotary device of claim 1, wherein each of the nozzles comprises an opening that faces away from the direction of rotation of the first rotary disc.

15. The rotary device of claim 1, wherein the first rotary disc comprises a hollow, continuous space between substantial entireties of the two plates.

16. The rotary device of claim 1, wherein the first rotary disc has a depression or indentation therein in an underside thereof, surrounding the central axle or shaft between the central axle or shaft and the inlet.

17. The rotary device of claim 16, wherein the depression or indentation is configured to reduce the amount of fluid in the first rotary disc and/or facilitate fluid flow through the first rotary disc.

18. The rotary device of claim 1, wherein the first rotary disc comprises a metal, a thermoplastic polymer or a thermoset polymer.

19. The rotary device of claim 1, wherein the central axle or shaft extends through the opening of the inlet.

20. The rotary device of claim 1, wherein the inlet and the first rotary disc are unitary.

21. The rotary device of claim 1, wherein the inlet consists of a single conduit or path.

\* \* \* \* \*